US008111968B2

(12) United States Patent
Chakmakjian et al.

(10) Patent No.: US 8,111,968 B2
(45) Date of Patent: Feb. 7, 2012

(54) OPTICAL DEVICES FOR GUIDING ILLUMINATION

(75) Inventors: Stephen H. Chakmakjian, Honeoye Falls, NY (US); Donald J. Schertler, Rochester, NY (US); Tasso Sales, Rochester, NY (US); G. Michael Morris, Victor, NY (US)

(73) Assignee: RPC Photonics, Inc., Rochester, NY (US)

( * ) Notice: Subject to any disclaimer, the term of this patent is extended or adjusted under 35 U.S.C. 154(b) by 0 days.

(21) Appl. No.: 12/460,964

(22) Filed: Jul. 27, 2009

(65) Prior Publication Data
US 2010/0027288 A1    Feb. 4, 2010

Related U.S. Application Data

(62) Division of application No. 11/351,699, filed on Feb. 10, 2006, now Pat. No. 7,593,615.

(51) Int. Cl.
| | |
|---|---|
| G02B 6/10 | (2006.01) |
| G02B 6/34 | (2006.01) |
| G02B 6/00 | (2006.01) |
| G02B 27/46 | (2006.01) |
| G02B 5/04 | (2006.01) |
| G02F 1/295 | (2006.01) |
| G02F 1/1333 | (2006.01) |
| G02F 1/1335 | (2006.01) |
| G01D 11/28 | (2006.01) |
| F21V 23/02 | (2006.01) |
| F21V 17/02 | (2006.01) |
| F21S 8/00 | (2006.01) |

(52) U.S. Cl. ............ 385/146; 385/6; 385/37; 385/129; 385/131; 385/147; 349/56; 349/61; 349/70; 349/95; 349/121; 359/559; 359/833; 362/26; 362/260; 362/268; 362/328; 362/347

(58) Field of Classification Search ............. 385/31, 385/36, 37, 39, 43, 129, 131, 146, 147, 901; 349/15, 56, 61, 62, 65, 66, 70, 95, 117, 121, 349/159; 359/559, 833, 834, 869; 362/19, 362/26, 31, 32, 260, 268, 328, 330–333, 362/339, 346, 347
See application file for complete search history.

(56) References Cited

U.S. PATENT DOCUMENTS 4,497,860 A    2/1985  Brady, Jr.
(Continued)

FOREIGN PATENT DOCUMENTS
DE           103 56 483           7/2005
(Continued)

OTHER PUBLICATIONS

Minano, J. et al., High-efficiency LED backlight optics designed with the flow-line method, Proc. of SPIE, vol. 5942, 2005.
(Continued)

*Primary Examiner* — Brian M. Healy
*Assistant Examiner* — Hung Lam
(74) *Attorney, Agent, or Firm* — Kenneth J. Lukacher

(57) ABSTRACT

Optical devices for guiding illumination are provided each having a body of optical material with staircase or acutely angled ramp structures on its top surface for distributing light inputted from one end of the device from the front exit faces of such structures along certain angular orientations, while at least a substantial portion of the light is totally internally reflected within the body until distributed from such front exit faces. Optical devices are also provided each have a body of optical material having a bottom surface with acutely angled ramp structures and falling structures which alternate with each other, such that light is totally internally reflected within the device until reflected by such ramp structures along the bottom surface to exit the top surface of the device or transmitted through the ramp structures to an adjacent falling structure back into the device. Acutely angled ramp structures may be provided on both top and bottom surfaces of optical devices for distributing light along such top surface. Illumination apparatuses are also provided using such optical devices.

38 Claims, 38 Drawing Sheets

U.S. PATENT DOCUMENTS

| | | | |
|---|---|---|---|
| 5,005,108 A | 4/1991 | Pristash et al. | |
| 5,136,480 A | 8/1992 | Pristash et al. | |
| 5,608,550 A | 3/1997 | Epstein et al. | |
| 5,613,751 A | 3/1997 | Parker et al. | |
| 5,618,096 A | 4/1997 | Parker et al. | |
| 5,876,107 A | 3/1999 | Parker et al. | |
| 5,894,539 A | 4/1999 | Epstein | |
| 5,914,760 A | 6/1999 | Daiku | |
| 5,921,652 A | 7/1999 | Parker et al. | |
| 5,949,933 A | 9/1999 | Steiner et al. | |
| 5,967,637 A | 10/1999 | Ishikawa et al. | |
| 6,002,829 A | 12/1999 | Winston et al. | |
| 6,027,220 A | 2/2000 | Arai | |
| 6,079,838 A | 6/2000 | Parker et al. | |
| 6,185,356 B1 | 2/2001 | Parker et al. | |
| 6,280,052 B1 | 8/2001 | White | |
| 6,312,787 B1 | 11/2001 | Hayashi et al. | |
| 6,335,999 B1 | 1/2002 | Winston et al. | |
| 6,341,872 B1 | 1/2002 | Goto | |
| 6,474,827 B2 | 11/2002 | Shinohara et al. | |
| 6,504,985 B2 | 1/2003 | Parker et al. | |
| 6,591,049 B2 | 7/2003 | Williams et al. | |
| 6,612,722 B2 | 9/2003 | Ryu et al. | |
| 6,612,723 B2 | 9/2003 | Futhey et al. | |
| 6,724,535 B1 | 4/2004 | Clabburn | |
| 6,773,126 B1 | 8/2004 | Hatjasalo et al. | |
| 6,775,460 B2 | 8/2004 | Steiner et al. | |
| 6,845,212 B2 | 1/2005 | Gardiner et al. | |
| 6,874,913 B2 | 4/2005 | Munro et al. | |
| 6,880,948 B2 | 4/2005 | Koch et al. | |
| 6,910,783 B2 | 6/2005 | Mezei et al. | |
| 6,948,832 B2 | 9/2005 | Saccomanno et al. | |
| 7,209,628 B2 | 4/2007 | Winston et al. | |
| 7,237,939 B2 * | 7/2007 | Kim et al. | 362/616 |
| 7,356,211 B2 | 4/2008 | Sugiura et al. | |
| 2002/0039287 A1 | 4/2002 | Ohkawa | |
| 2004/0246698 A1 * | 12/2004 | Shimizu et al. | 362/31 |
| 2005/0171408 A1 | 8/2005 | Parker | |
| 2006/0018623 A1 | 1/2006 | Yu et al. | |
| 2006/0092668 A1 * | 5/2006 | Sugiura et al. | 362/616 |

FOREIGN PATENT DOCUMENTS

| | | |
|---|---|---|
| EP | 1 016 817 A1 | 7/2000 |
| EP | 1 139 015 | 10/2001 |
| EP | 1 564 568 A1 | 8/2005 |

OTHER PUBLICATIONS

Reflexite Display Optics, Reflexite Collimating Film RCF90C Notebook Solution, Reflexite Corporation, 2004.

Reflexite Display Optics, Backlighting Components, Reflexite Display Optics, 2004.

* cited by examiner

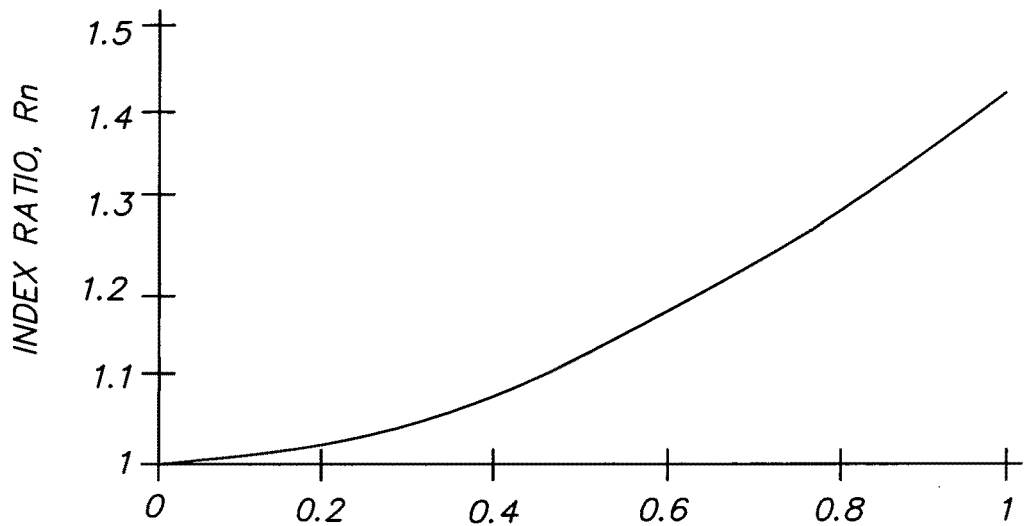
FIG. 3  NUMERICAL APERTURE OF INJECTED LIGHT IN AIR
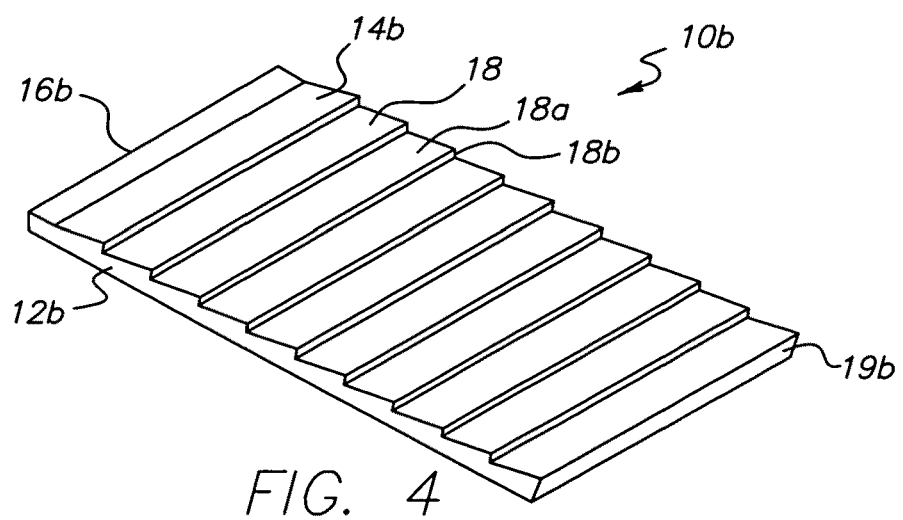
FIG. 4

OPTICAL DEVICES FOR GUIDING ILLUMINATION

This application is a divisional of U.S. patent application Ser. No. 11/351,699, filed Feb. 10, 2006, now U.S. Pat. No. 7,593,615.

FIELD OF THE INVENTION

The present invention relates to optical illumination guiding devices, such as lightguides, and relates particularly to optical devices for guiding illumination having stair-case or acutely angled ramp structures along their top surface, and/or acutely angled ramp structures along their bottom surfaces, for distributing light from their top surfaces, in which light is at least substantially totally internally reflected within the devices until distributed out of the devices by such structures. The optical devices of the present invention guide light through the process of total internal reflection to be efficiently delivered accordingly to predefined spatial and angular distribution. The optical devices of the present invention are useful for a variety of illumination applications, such as architectural illumination, displays, backlighting, solid-state lighting, signage, or consumer products. The present invention also relates to illumination apparatuses, referred to herein as luminaries, using such optical devices.

BACKGROUND OF THE INVENTION

A great many number of illumination applications use optical lightguides to deliver luminous radiation from a source to a specific target or region of space. For examples, light guides are used in backlight display systems, general illumination (e.g., luminaries), and medical devices, such as endoscopes. For example, see U.S. Pat. Nos. 6,775,460, 5,949,933, 6,474,827, 6,002,829, 6,948,832, 5,136,480, 5,613,751, and 6,910,783. The lightguides or light directing optical elements describe in these patents rely on either triangular or trapezoidal shaped surfaces, microprism or microlens arrays, undulating ribbon-like structures, prismatic surface indentations, or rounded notches, to extract light. Although useful with their respective light sources in their particular applications, these light directing optical elements do not efficiently use total internal reflection to deliver light such as realized from structures of the present invention.

SUMMARY OF THE INVENTION

Accordingly, it is an object of the present invention to provide optical devices for guiding illumination having structures on the top and/or bottom surfaces for extracting substantially all of the light injected into such devices in a manner where the light extracted from the optical devices exits through a desired surface and propagates in a prescribed direction.

It is another object of the present invention to provide optical devices for guiding illumination having structures on the top and/or bottom surfaces which may be utilized with light source(s) in a variety of illumination apparatuses and applications.

Briefly described, an optical device embodying the present invention has a body of optical material with a light input end and a top surface with multiple plurality of stair-case or acutely angled ramp structures each having a front exit face for distributing light from the front exit faces of such structures. All, or at least a substantial portion, of the light inputted is totally internally reflected within the body until distributed from the front exit surfaces.

The structures extend along the top surface in a direction parallel to the axis defining the length of the device. The bottom surface of the device may be substantially parallel to this axis. When such optical device has acutely angled ramp structures, the ramp structures each have a ramp (or rising) surface at an acute angle with respect to such axis, and the front exit face of each of the ramp structures represents a surface that is at an acute angle with respect to the normal of such axis. The front exit face of each ramp structure may either contact the start of the ramp surface of the next adjacent ramp structure, or each pair of adjacent ramp structures may be separated by a surface substantially parallel to the axis. The ramp structures may each successively taper away from the light input end towards the bottom surface, thereby gradually reducing the thickness of the device. The thickness at the other end of the device opposite the light input end may be substantially zero to enable substantially all of the light inputted into body to be distributed from the front exit face of the ramp structures.

The body of the optical device may have an input portion between the light input end and the first of the structures, which may be shaped to reduce the numerical aperture, and/or collimate along a dimension in the body along the width of the device.

The above-described optical illumination guiding device represents a topside structured device. The present invention further embodies an optical device for guiding illumination representing a bottomside structured device having a bottom surface with ramp structures and falling structures which alternate with each other along the bottom surface. Such ramp structures and falling structures extend along a dimension parallel to the axis of the device. The top surface of the body of the device is substantially parallel to this axis. Light when received from one end of the device's body is totally internally reflected within the body until distributed by reflection from one of the ramp structures to exit from the device's top surface or transmitted through one of the ramp structures back into the body via an adjacent one of the falling structures.

Each ramp structure of the bottomside structured device has a rising surface at an acute angle with respect to the device axis. Each falling structure has a falling surface at an acute angle with respect to the normal of the device axis, and then a surface substantially parallel to the top surface. The falling surface of each falling structure may be a prismatic surface to aid in deflecting light from ramp structures back into the optical device. The first flat surface of the falling structure may be lower than the back surface extending from the light input end of the device to the first of said ramp structure, and the flat surface of each of the falling structures after the first flat surface is a higher level than the previous flat surface along the length of the device, thereby reducing the thickness of the device. Optionally, ramp structures and falling structures increase in size proportionally with such reducing of thickness along the bottom surface. Further, the rising surface of each of the ramp structures may be segmented into multiple surfaces of progressive steeper angles, a single angled flat surface, or have a continuously varying slope.

The bottomside structured illumination guiding device may be a separate optical device, or part of the same body as the topside structured illumination guiding device to provide an optical device for guiding illumination having both top and bottom structured surfaces, as described above. Such combined optical device has a body having succession portions, where each successive portion receives light from the previous portion. At least one of such portions represents a topside structured optical illumination guiding device, and at least one other of such portions represents a bottomside structured optical illumination guiding device. Light not distributed by structures of one of the portions is received by the next successive portion of the body of the device, as so forth. Light distributed from the structured portions of the body can provide combined illumination from the top surface of the optical device.

The present invention further embodies an illumination apparatus, called herein a luminaire, having a light source and one of topside, bottomside, or both top and bottom sided optical device described above. For example, the light source may be a lamp, single light emitting diode (LED), an LED array, or a fiber optic light source. Such luminaire may be provided in a housing that is mountable on a surface in accordance with particular illumination application, such surface may represent a wall, step, floor, shelves, ceiling of a room or vehicle (e.g. automobile or aircraft), or other application where illumination is needed. The luminaire may also be provided with or without a housing, and mounted within a tool, equipment, worn on a person's body, such as wrist, article of clothing, such as hat, or be contained with a housing of another device, such as an LCD display. The housing, and components therein, may be sized and shaped in accordance with the particular illumination application.

DETAILED DESCRIPTION OF THE DRAWINGS

The foregoing objects, features and advantages of the invention will become more apparent from a reading of the following description in connection with the accompanying drawings, in which:

FIG. 3 is a plot of index ratio versus numerical aperture of injected light needed to support total internal reflection at the parallel unstructured regions of the front, back and side surfaces of the device of FIG. 1;

FIG. 4 is a perspective view of a second embodiment of the optical illumination guiding device of the present invention having acutely ramp structures along the top surface of the device;

Figure 6:
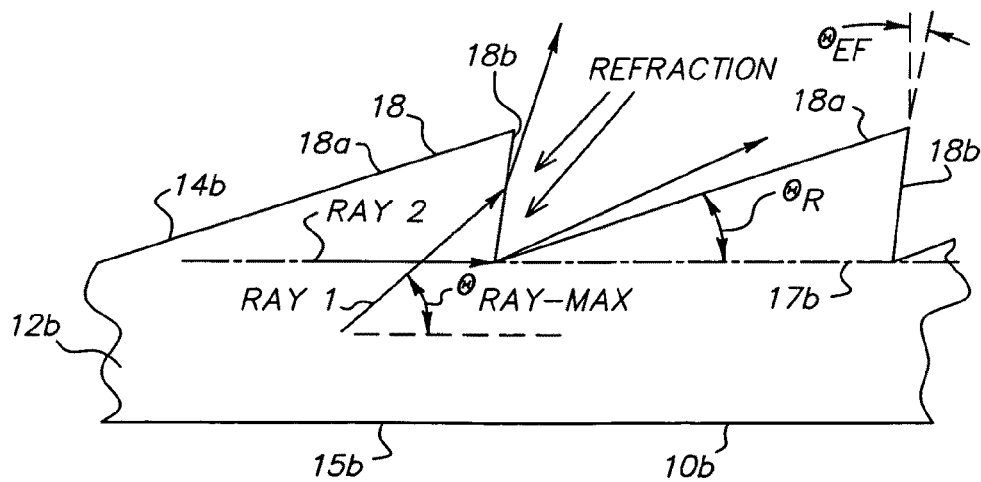
FIG. 6 is another partial cross-sectional view of the device of FIG. 4 showing a light ray diagram to illustrate two limiting refractive ray interactions, Rays 1 and 2, at the front surface of the device.
Figure 14:
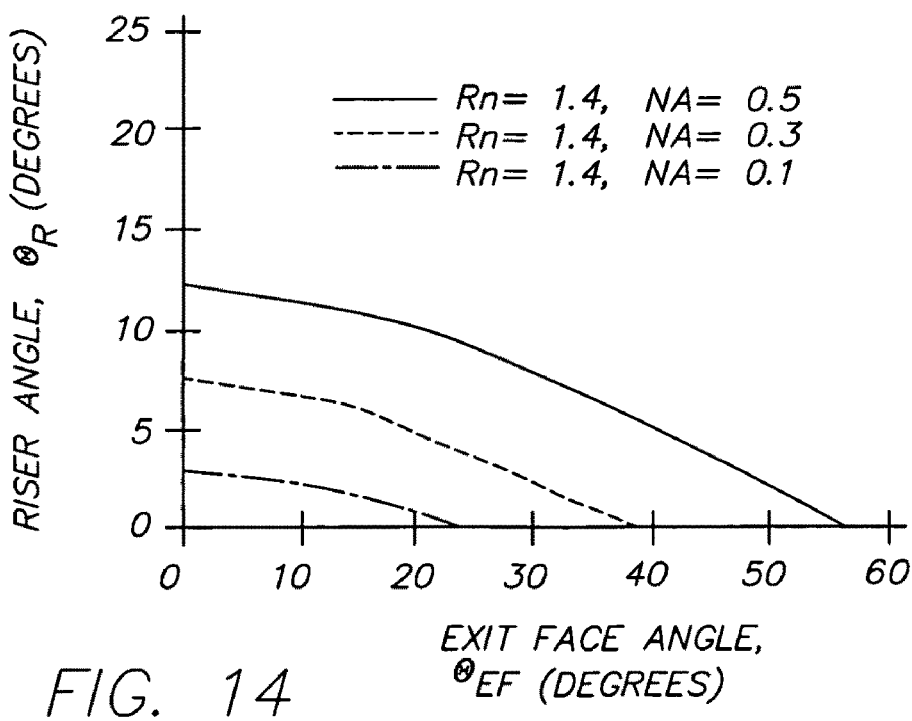
Figure 15:
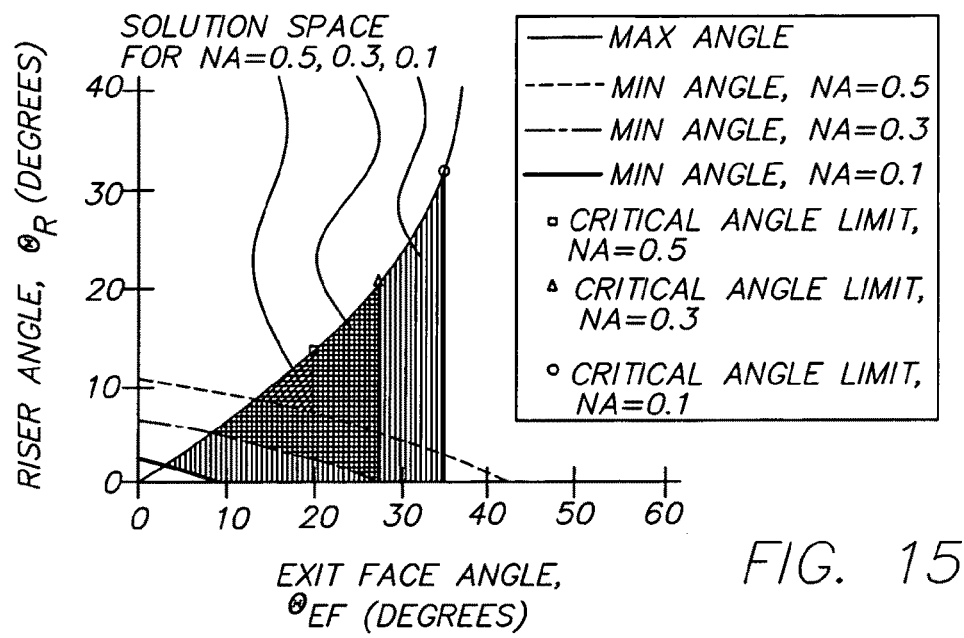
Figure 16:
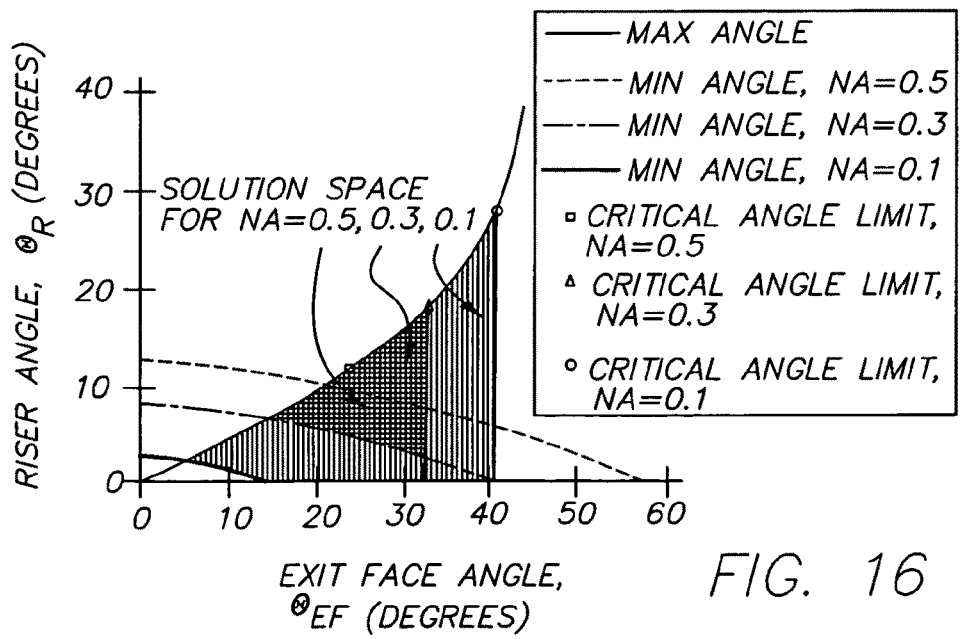
Figure 17:
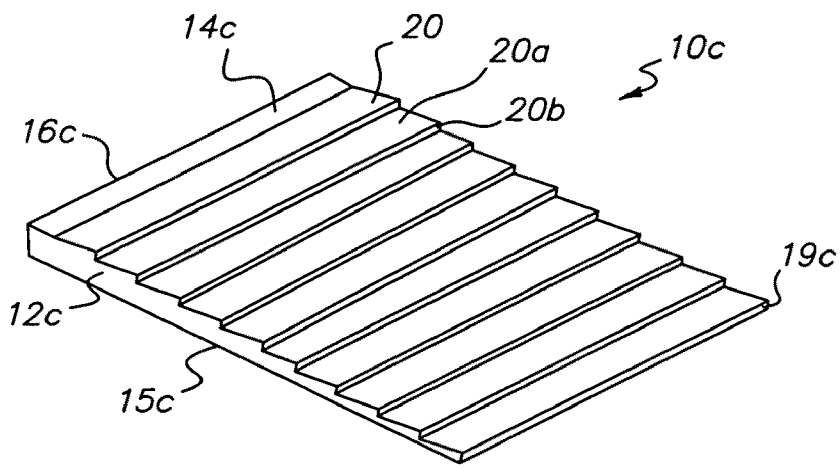
Figure 18:
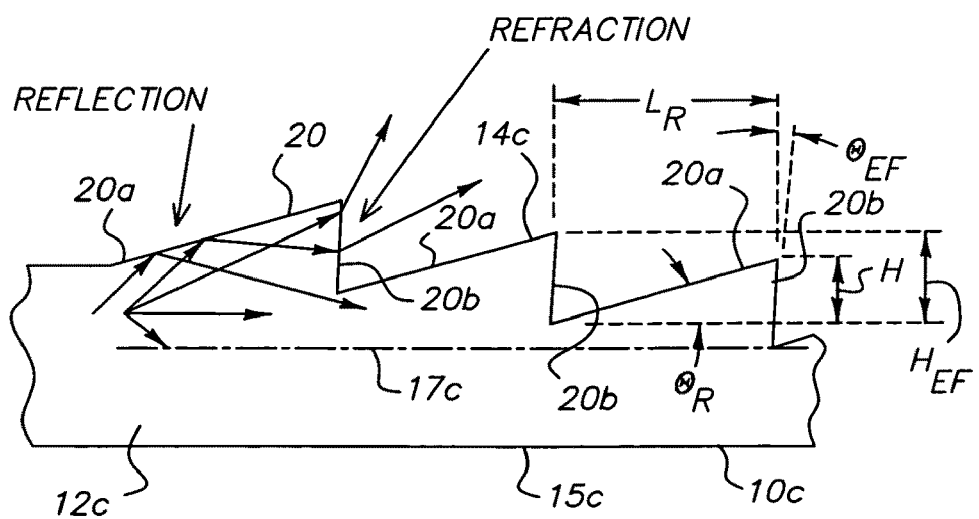
Figure 19:
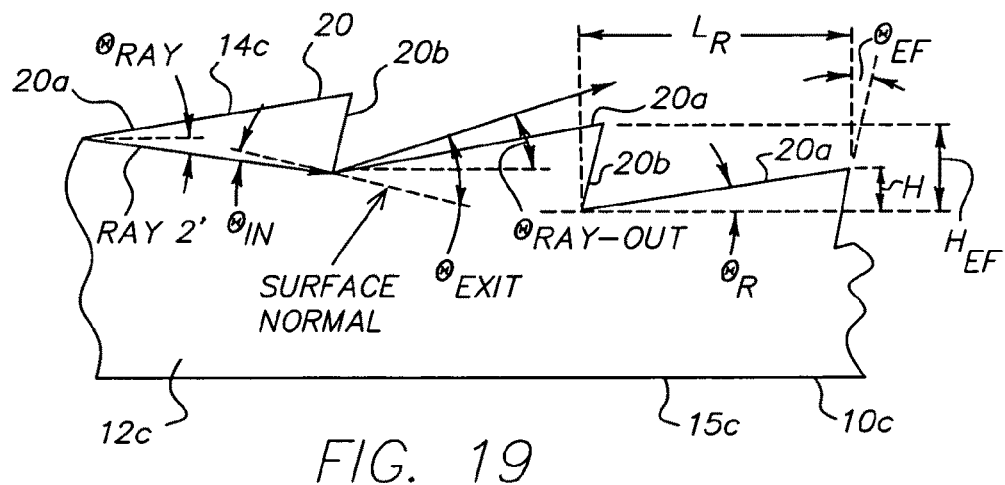
Figure 20:
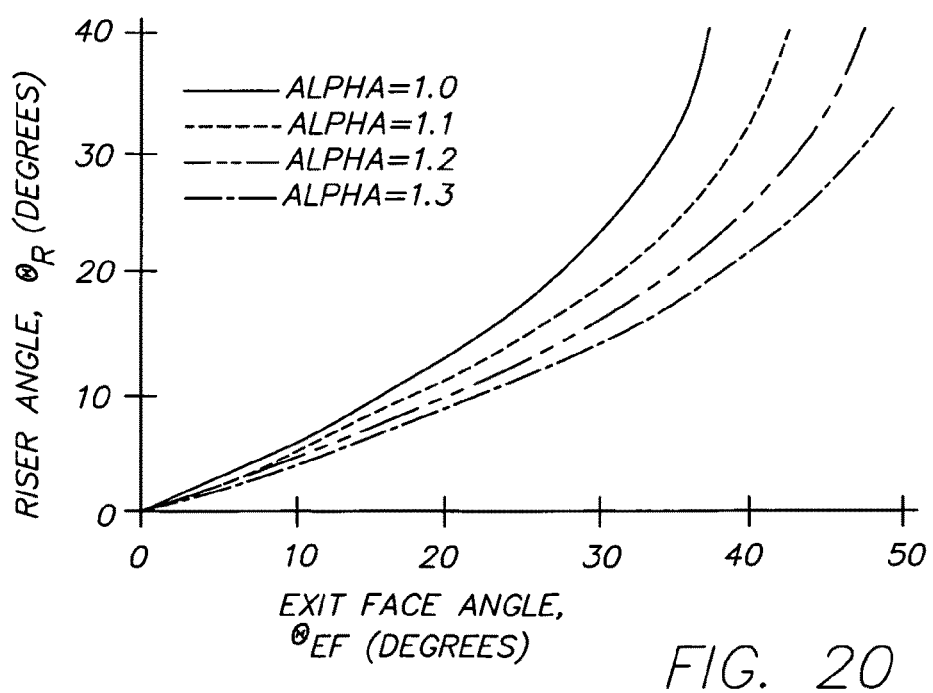
Figure 21:
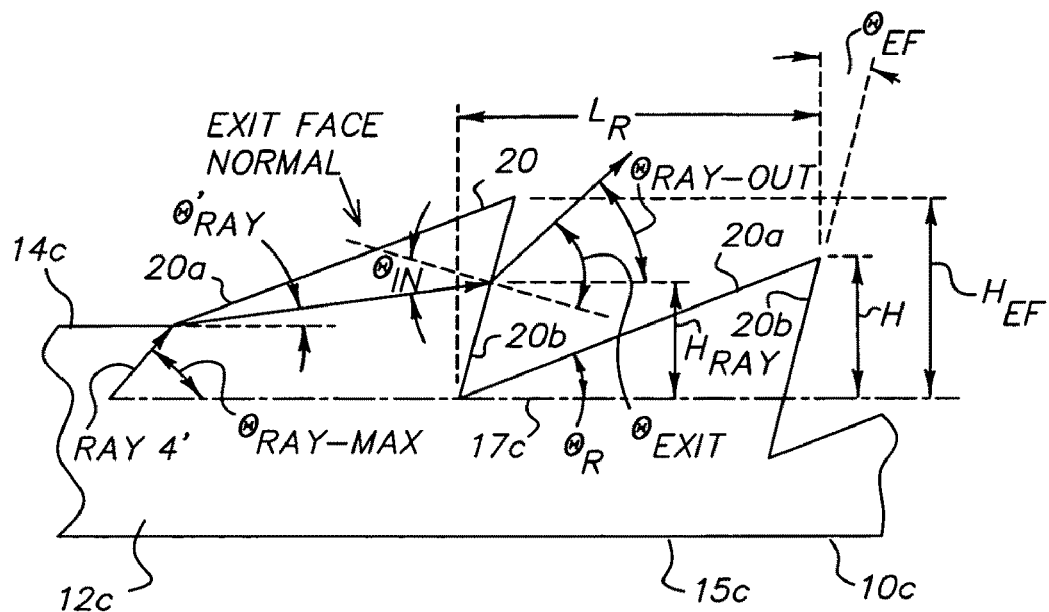
Figure 22:
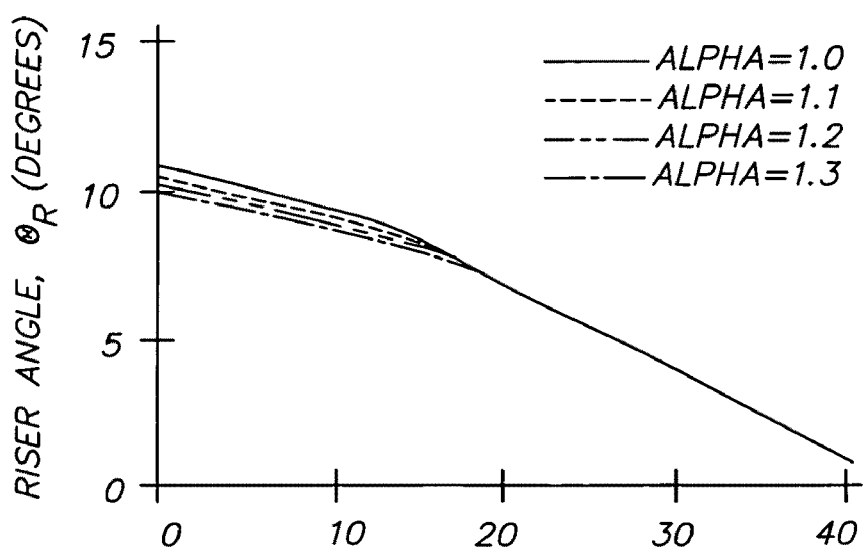
Figure 23:
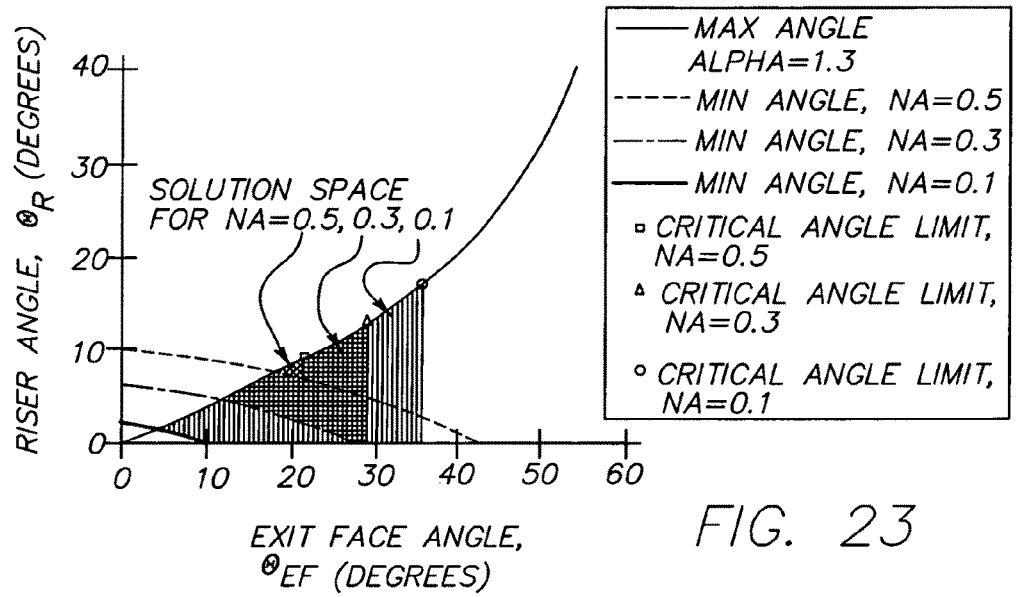
Figure 24:
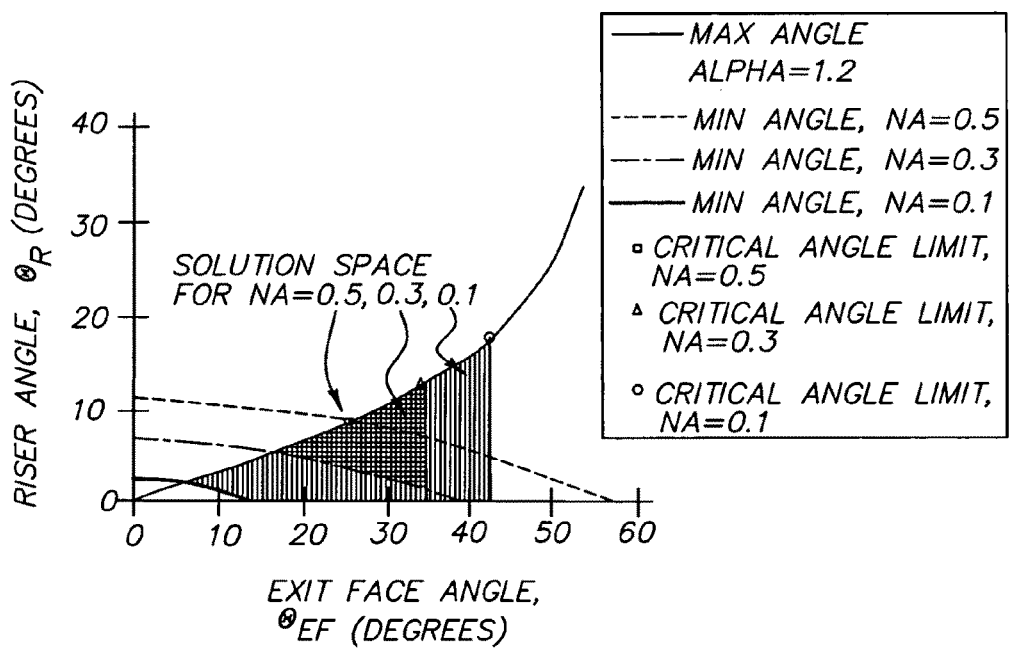
Figure 25:
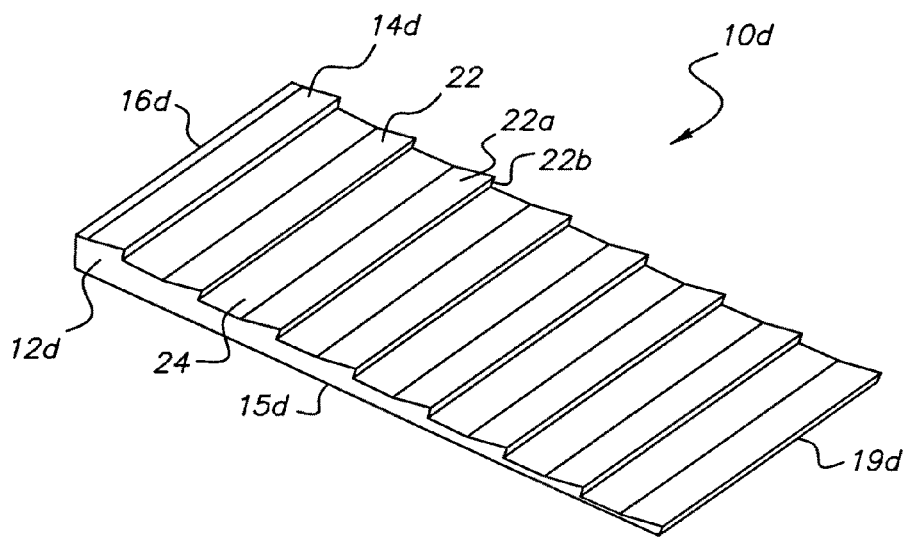
Figure 26:
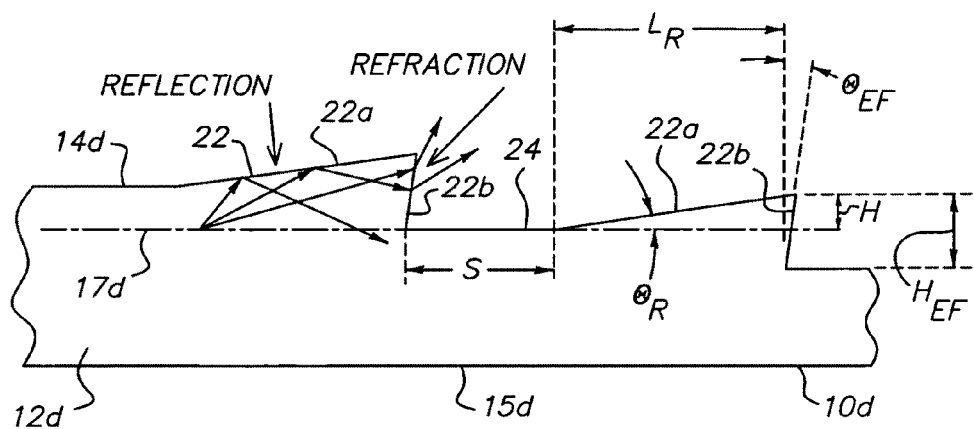
Figure 27:
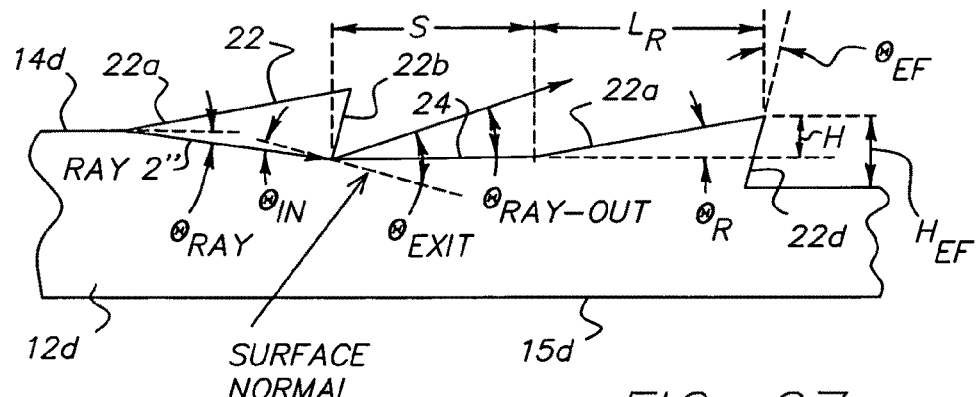
Figure 28:
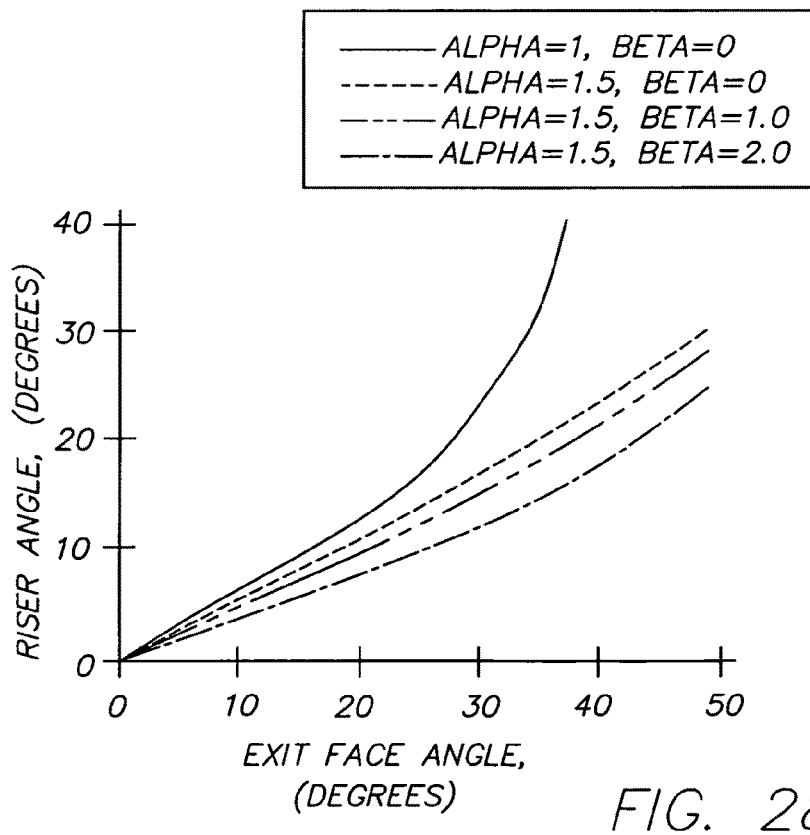
Figure 29:
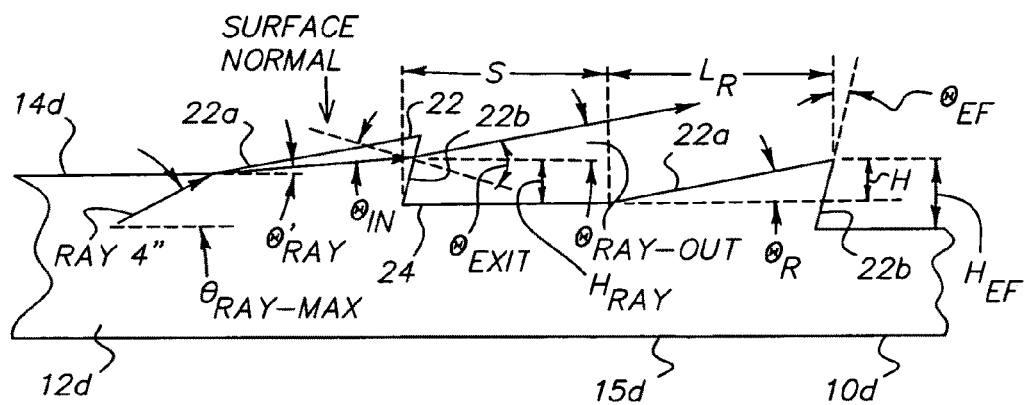
Figure 30:
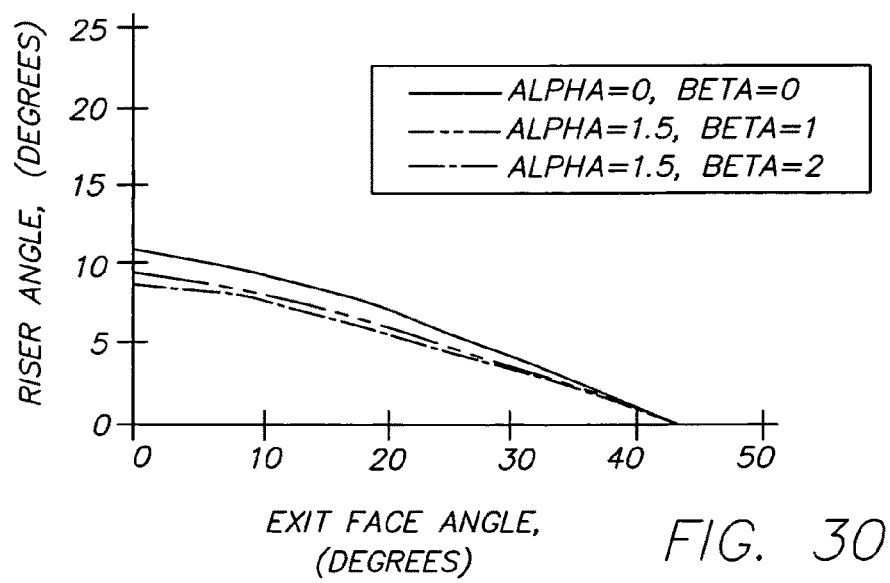
Figure 31:
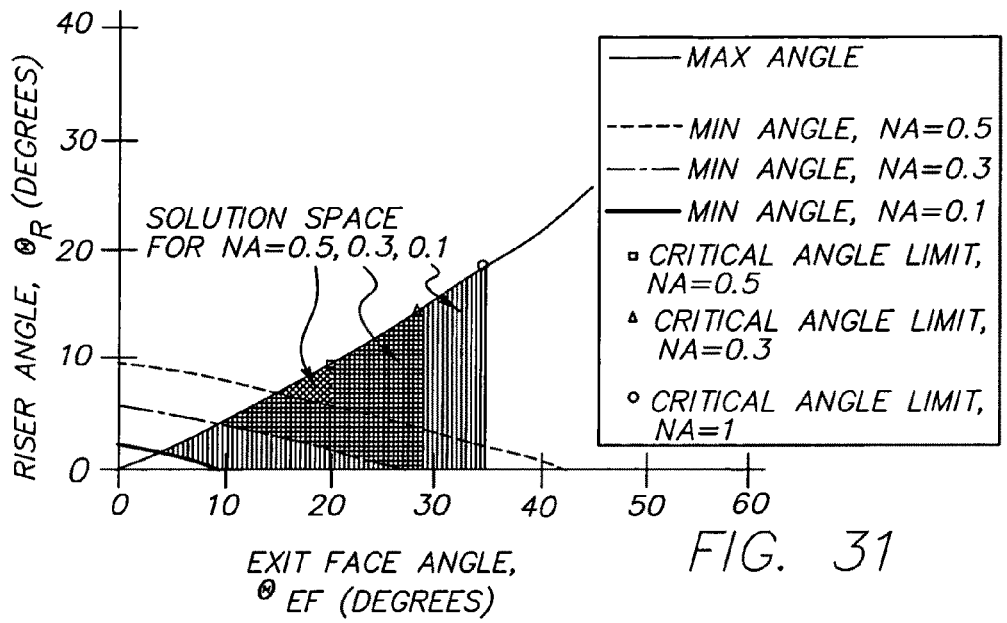
Figure 32:
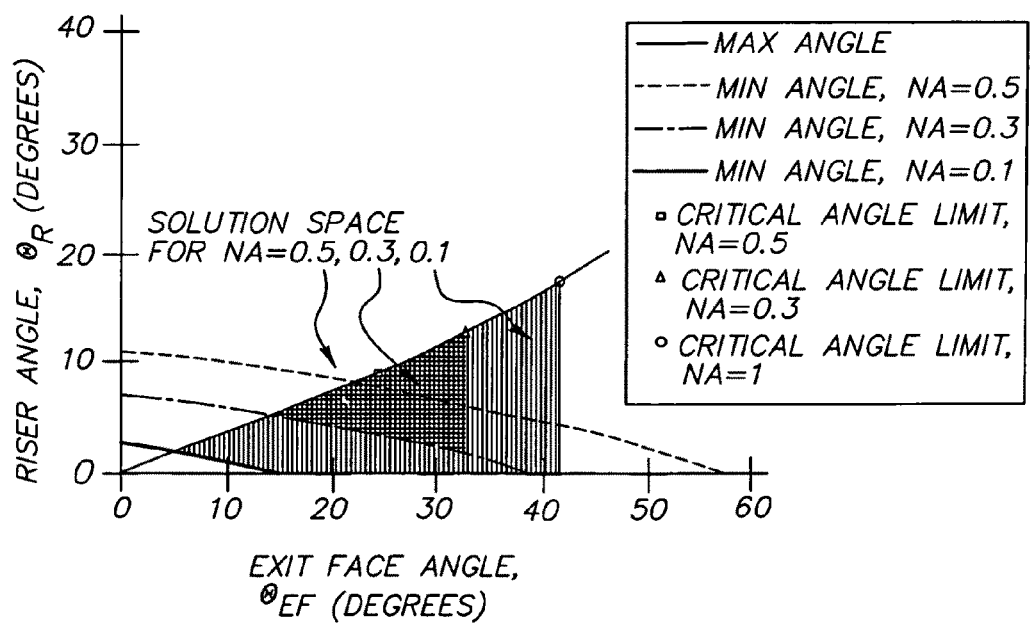
Figure 33:
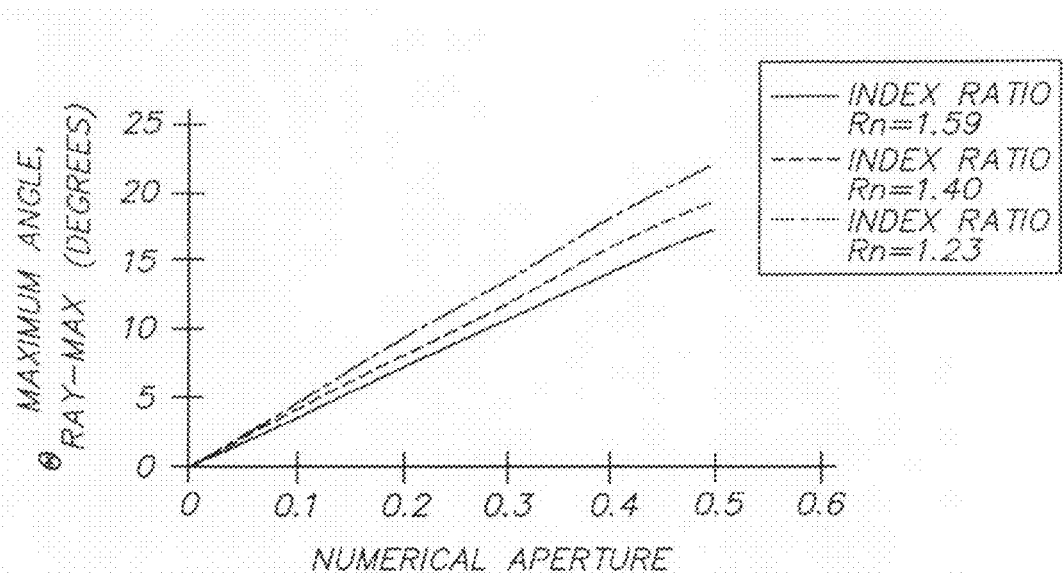
Figure 34A:
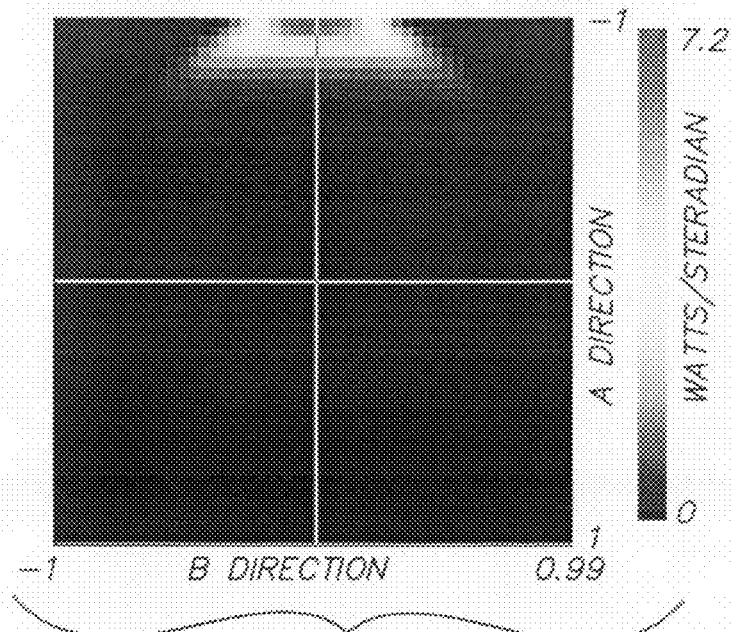
Figure 34B:
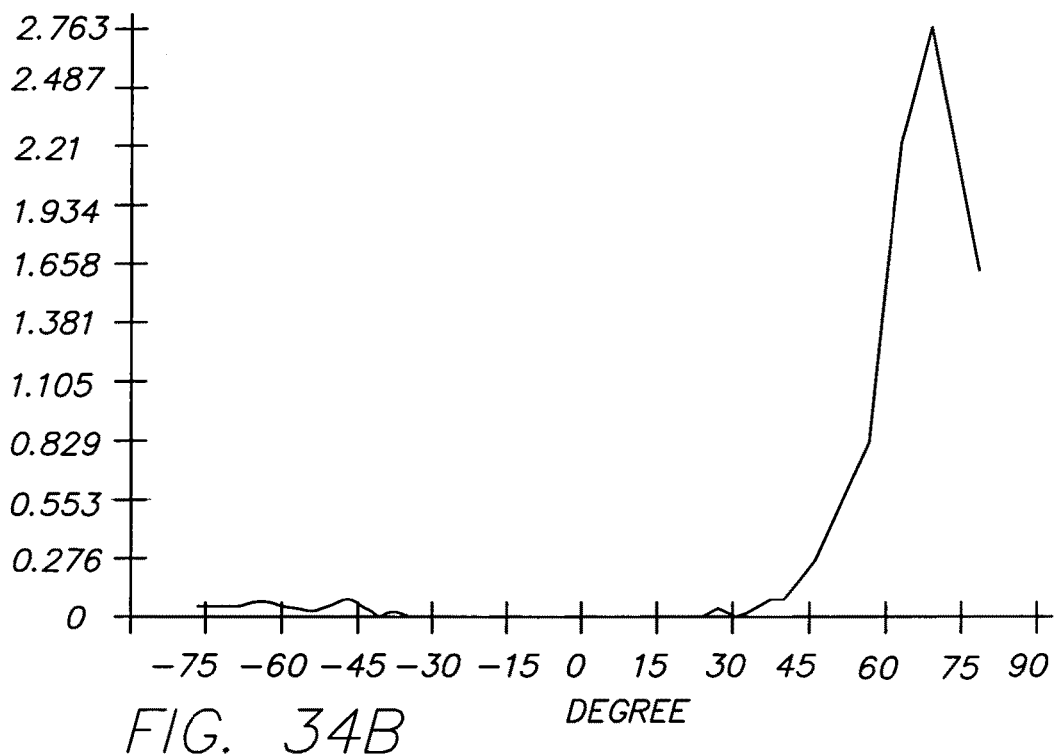
Figure 35A:
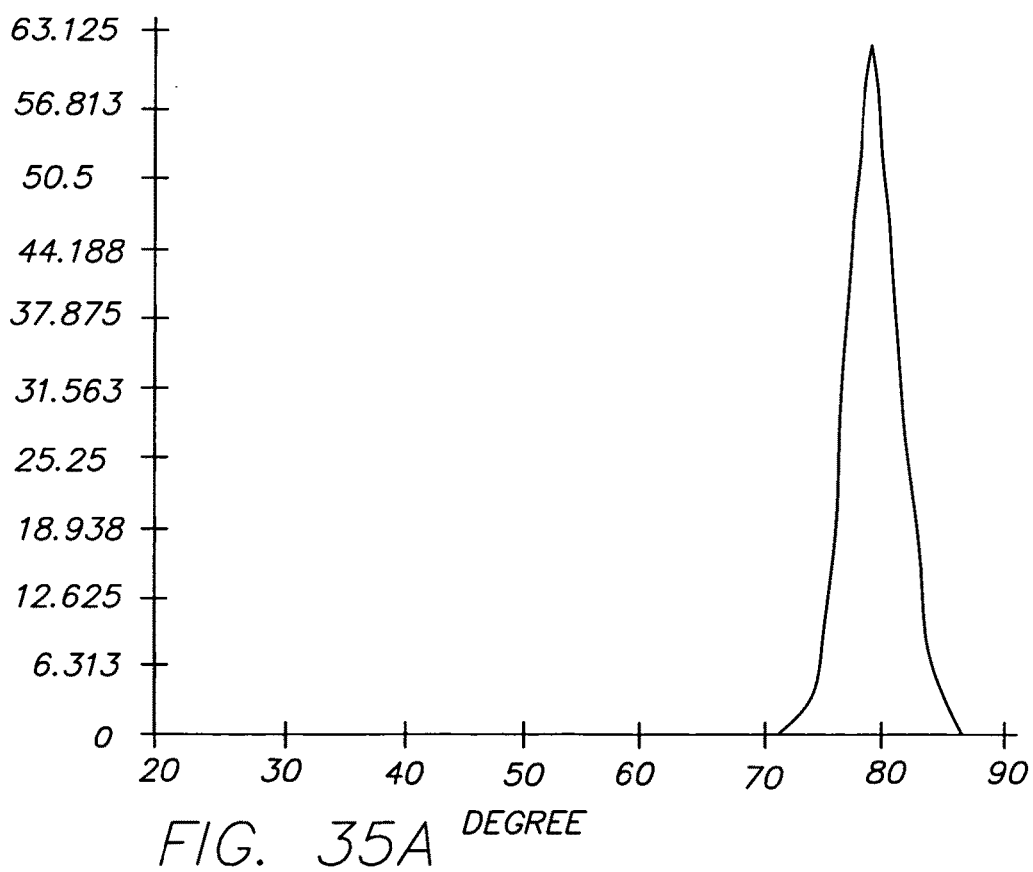
Figure 35B:
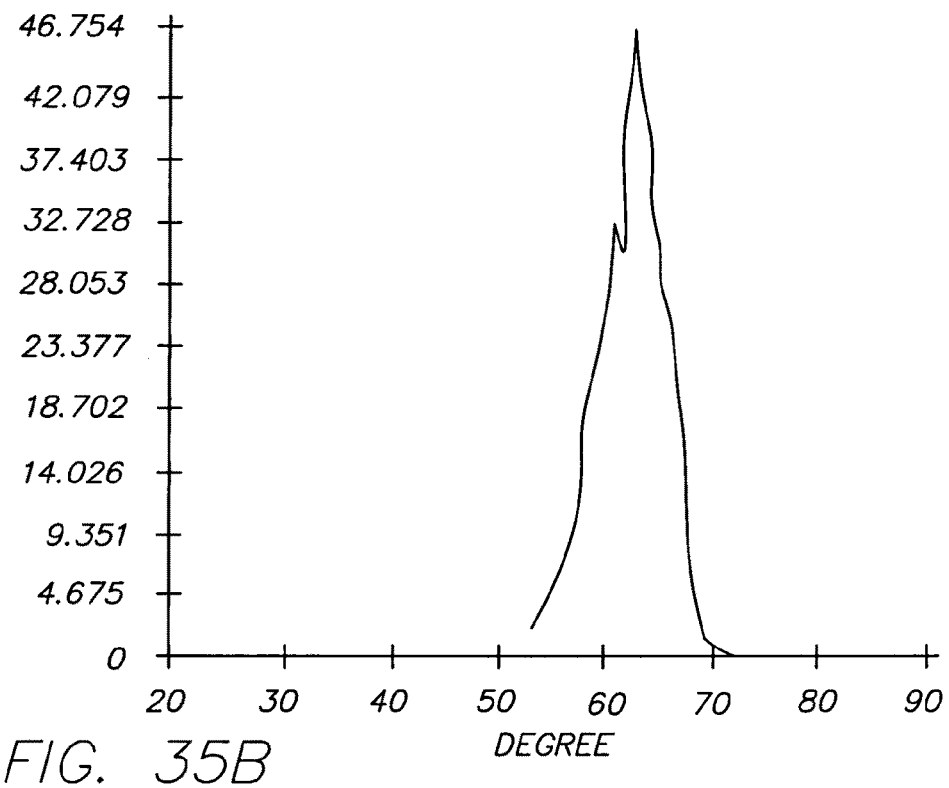
Figure 36:
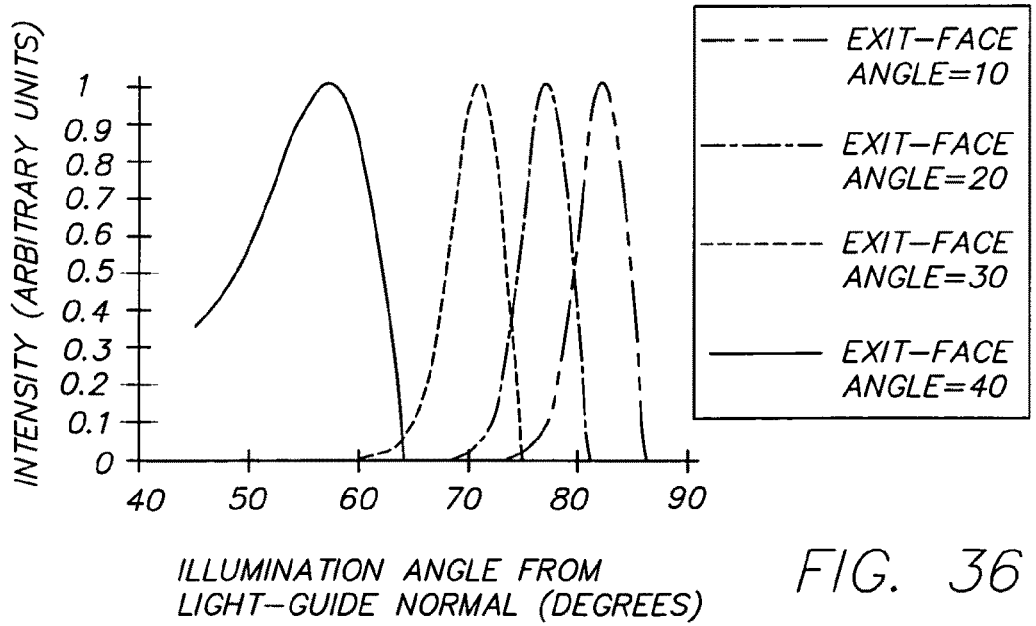
Figure 37:
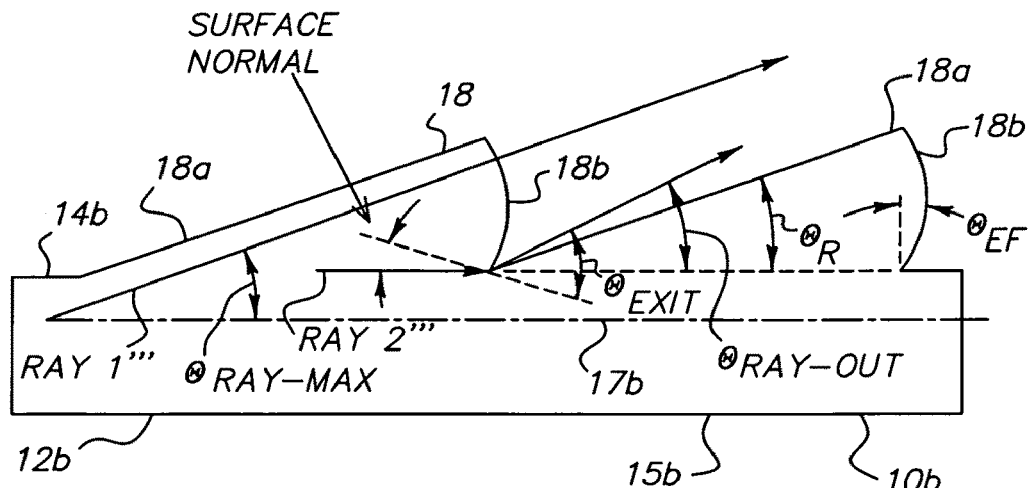
Figure 38:
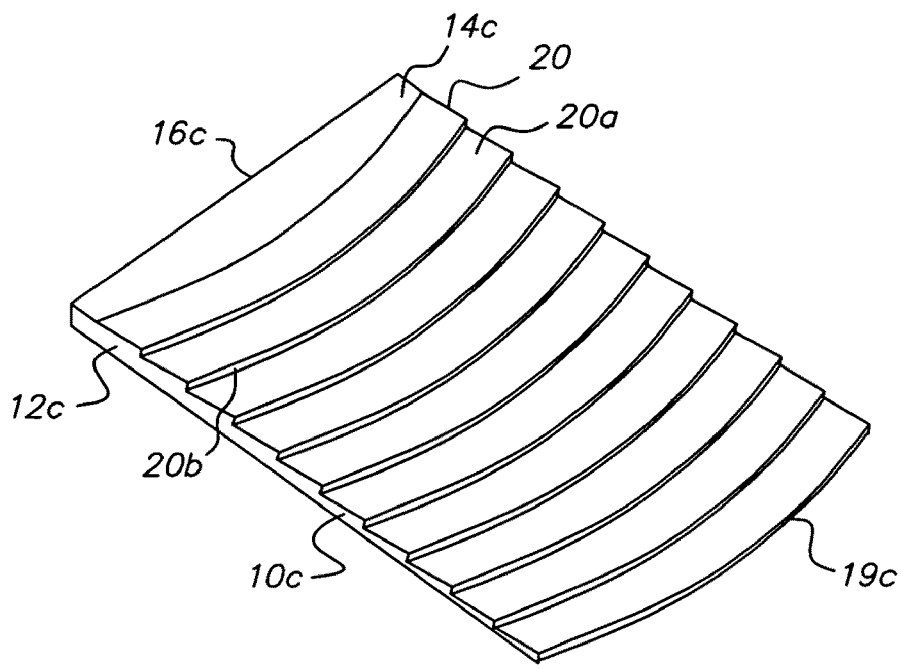
Figure 39:
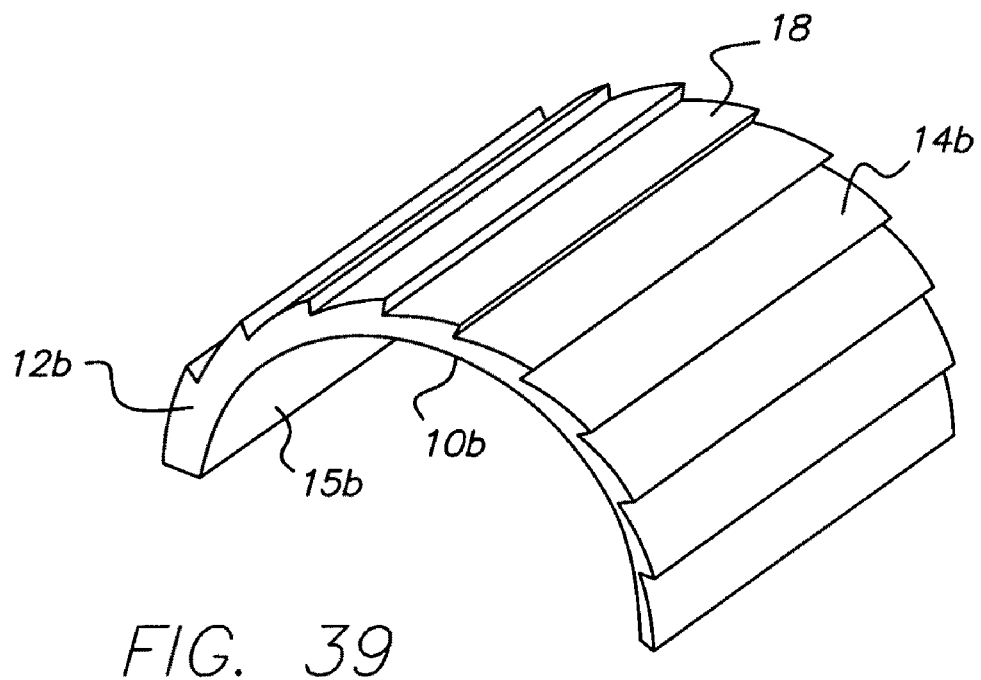
Figure 40:
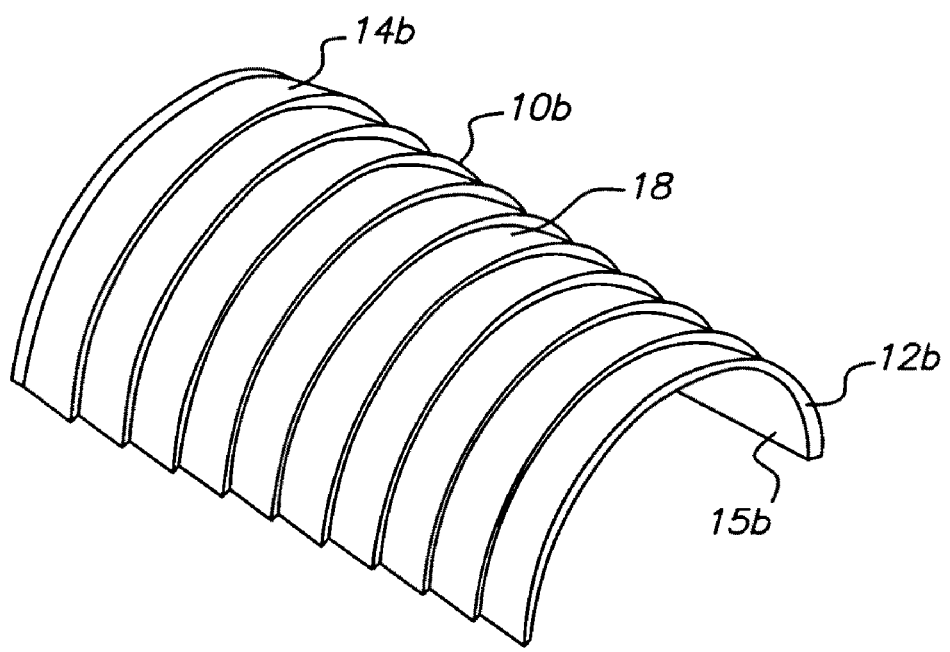
Figure 41:
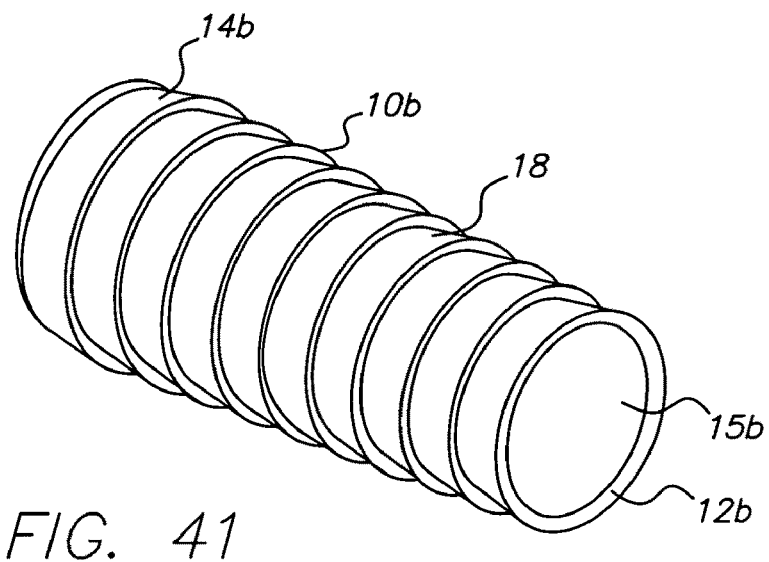
Figure 42:
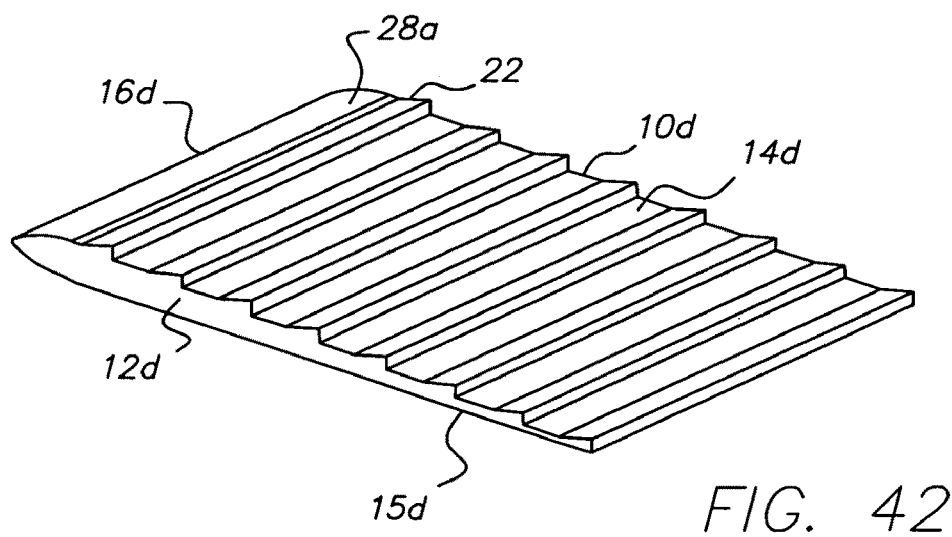
Figure 43:
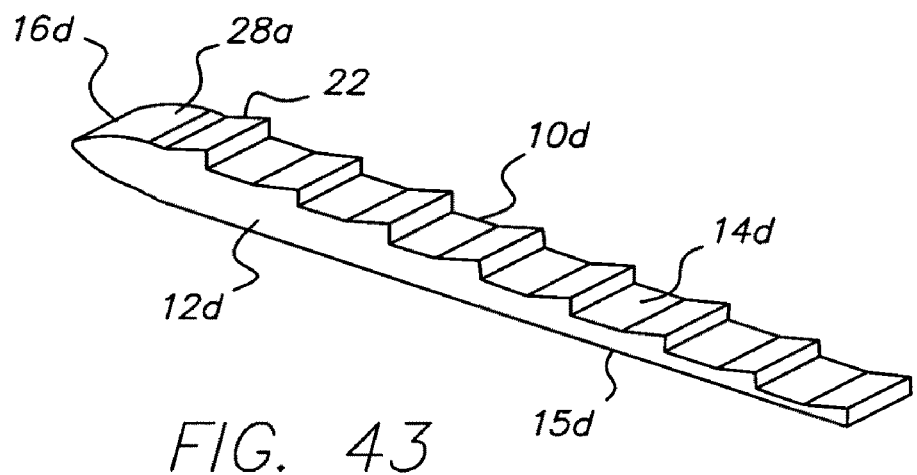
Figure 44:
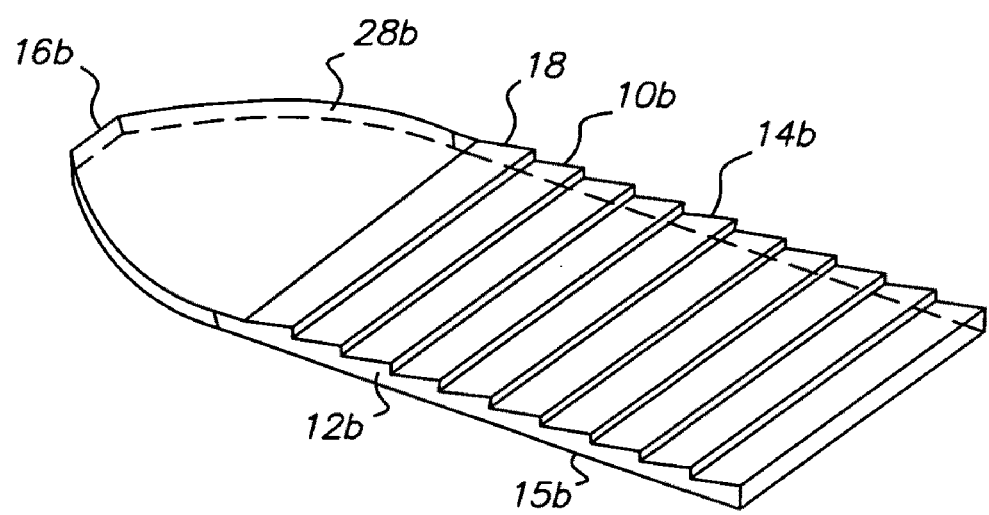
Figure 45:
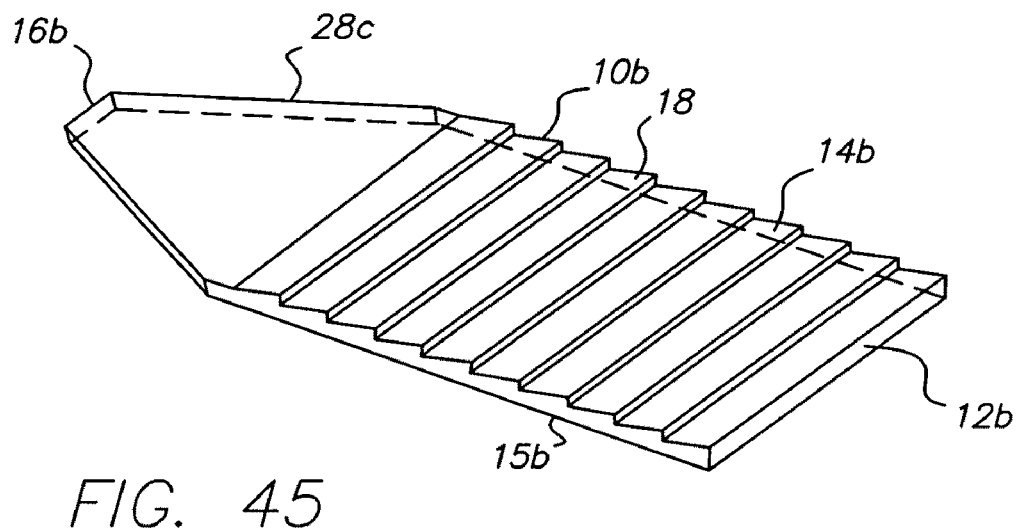
Figure 46A:
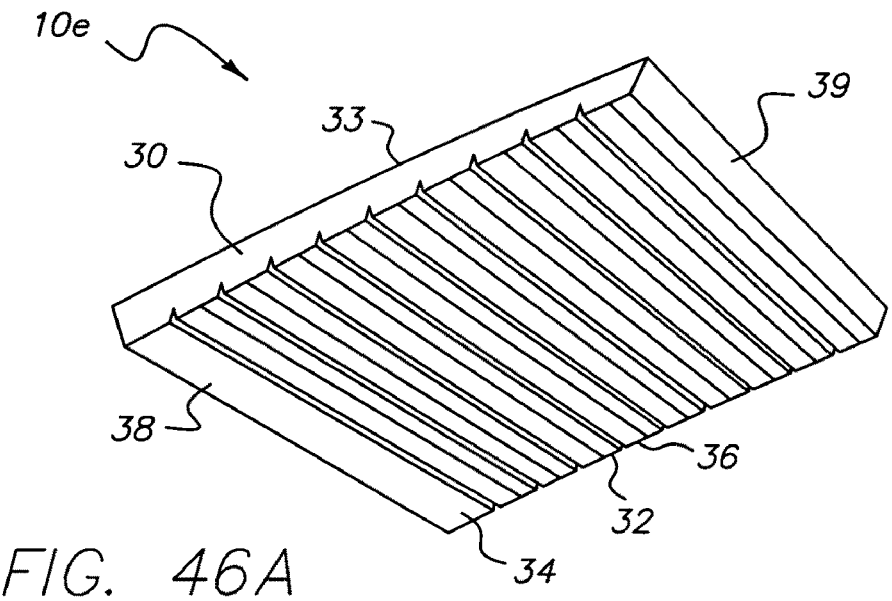
Figure 46B:
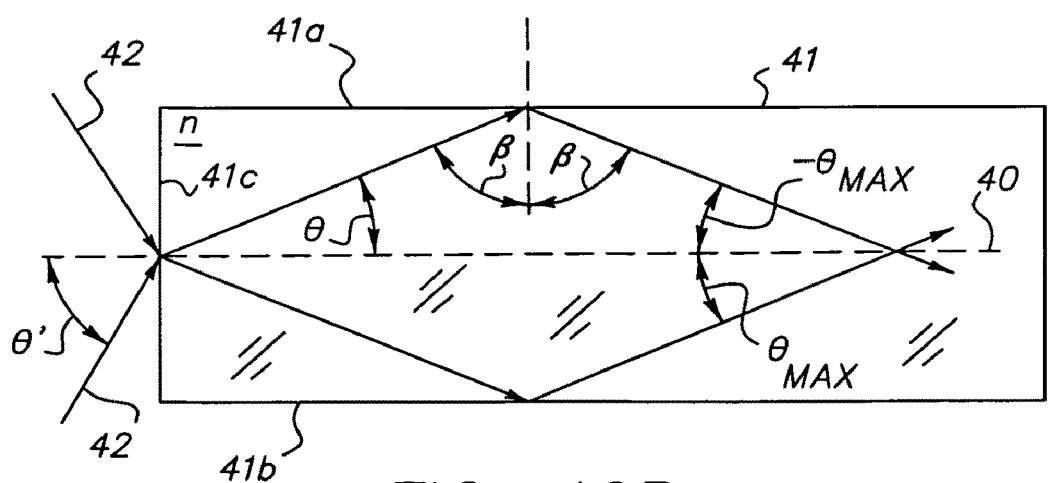
Figure 47:
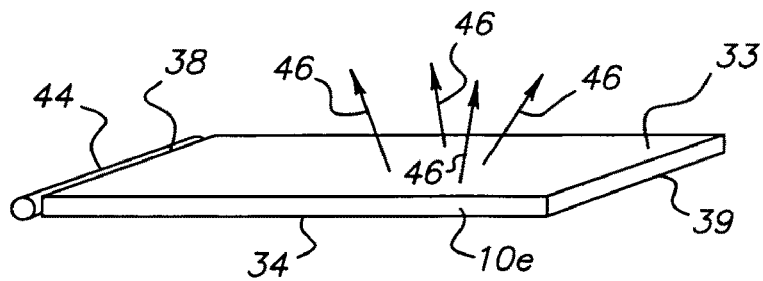
Figure 48:
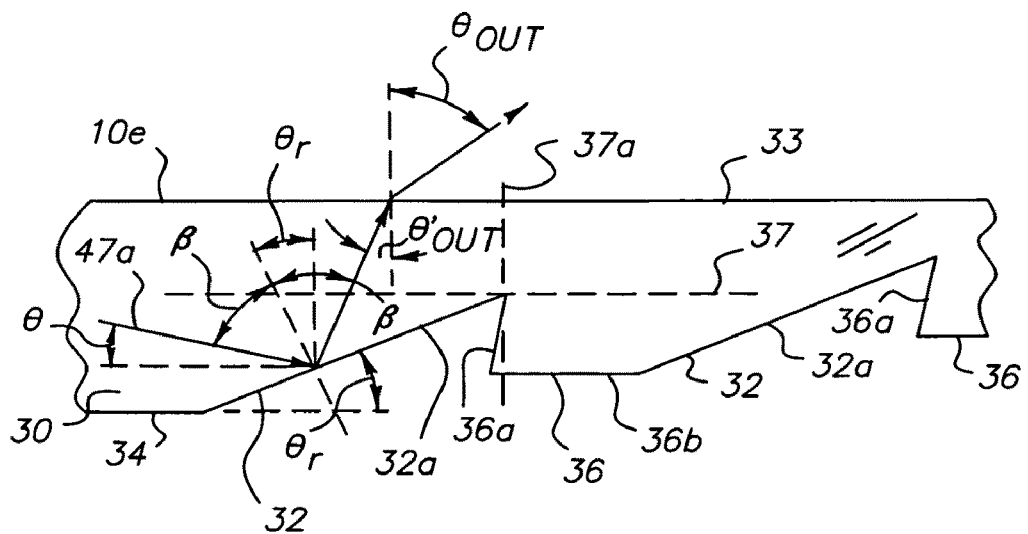
Figure 49:
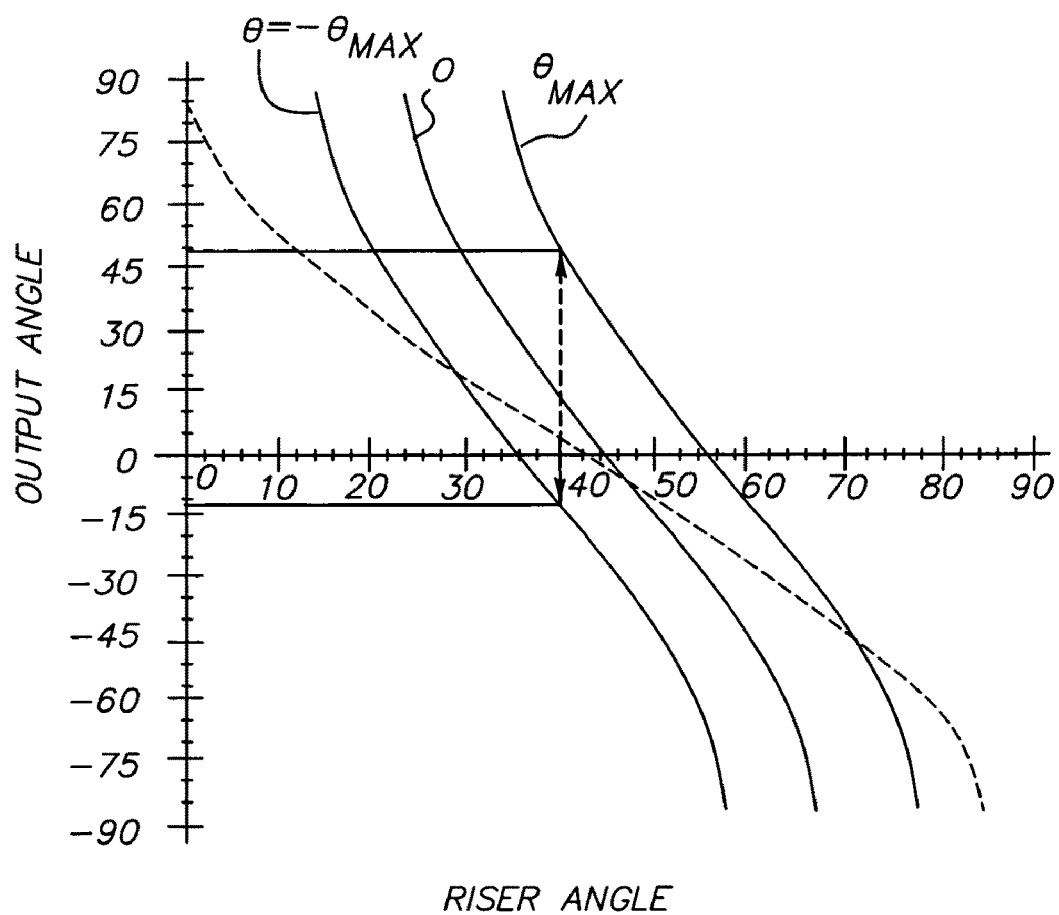
Figure 50:
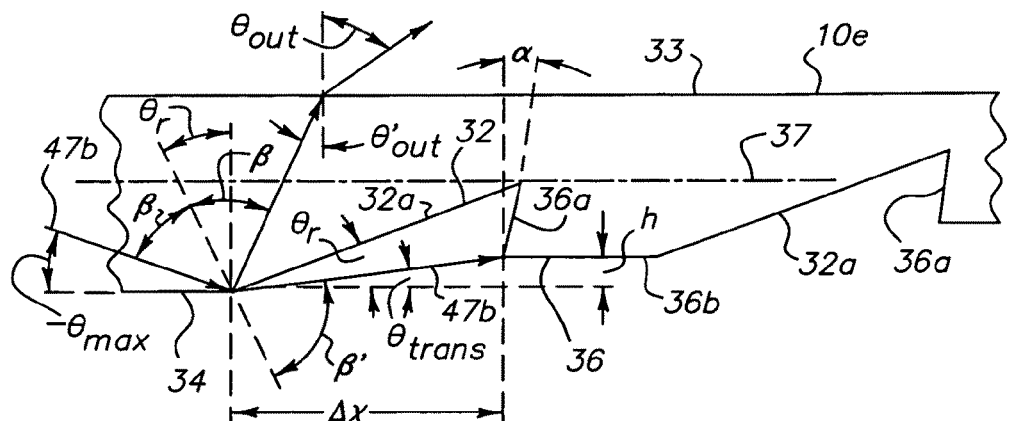
Figure 51:
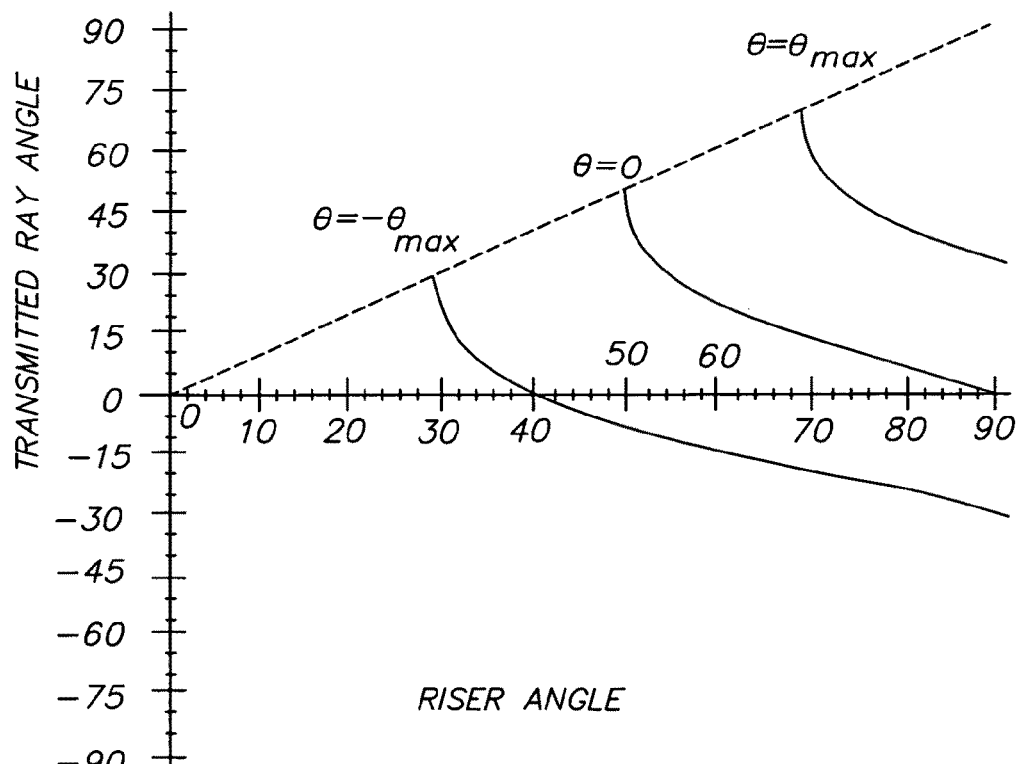
Figure 52:
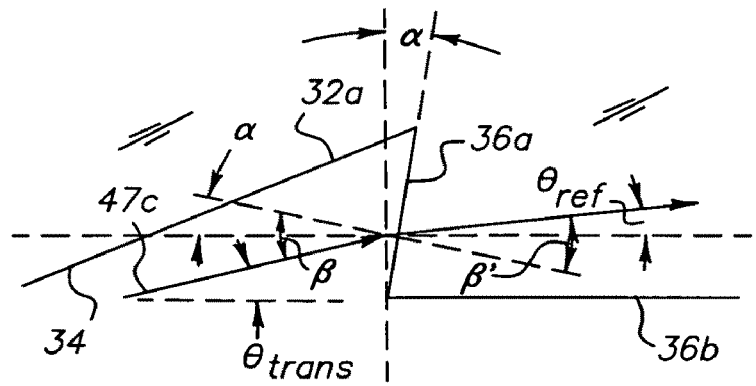
Figure 53:
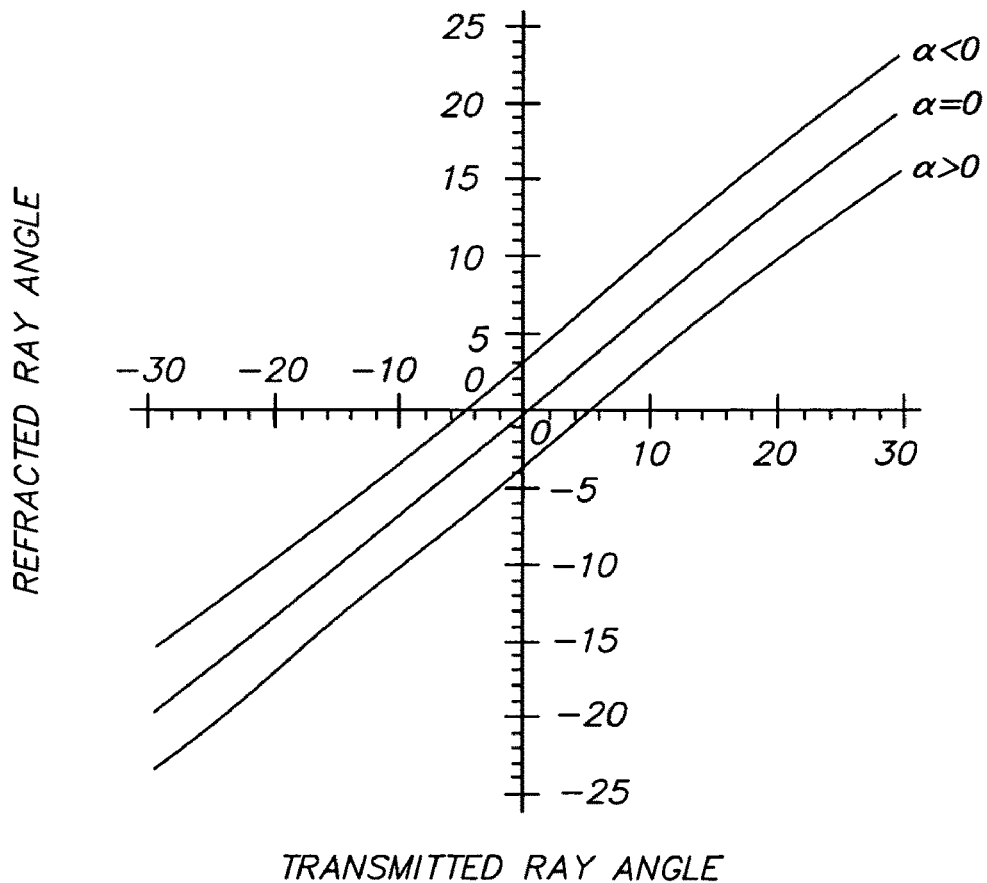
Figure 54A:
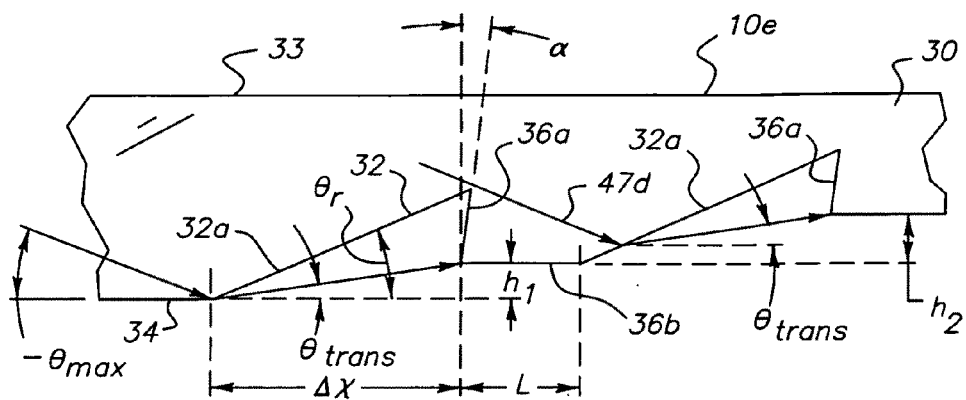
Figure 54B:
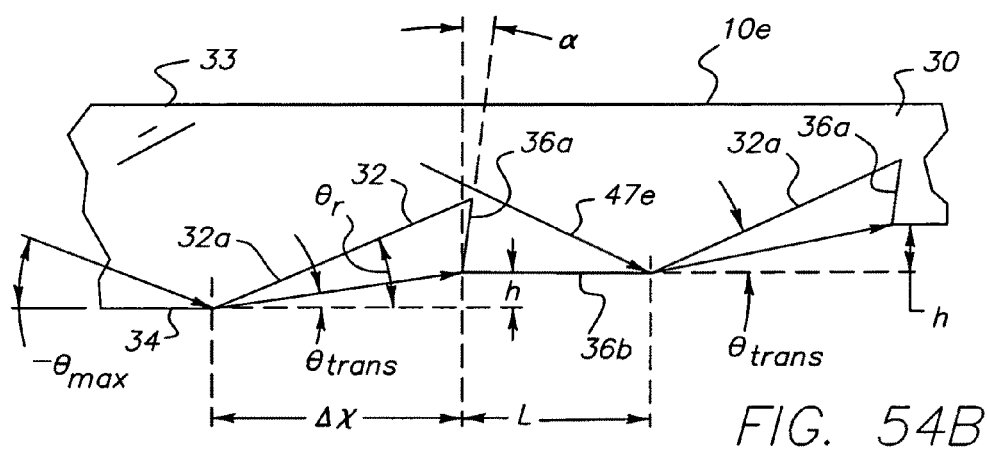
Figure 54C:
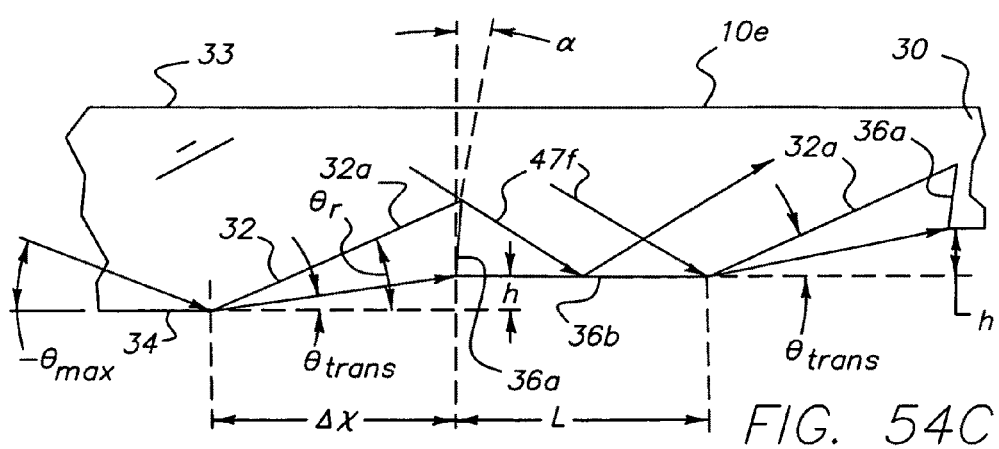
Figure 55A:
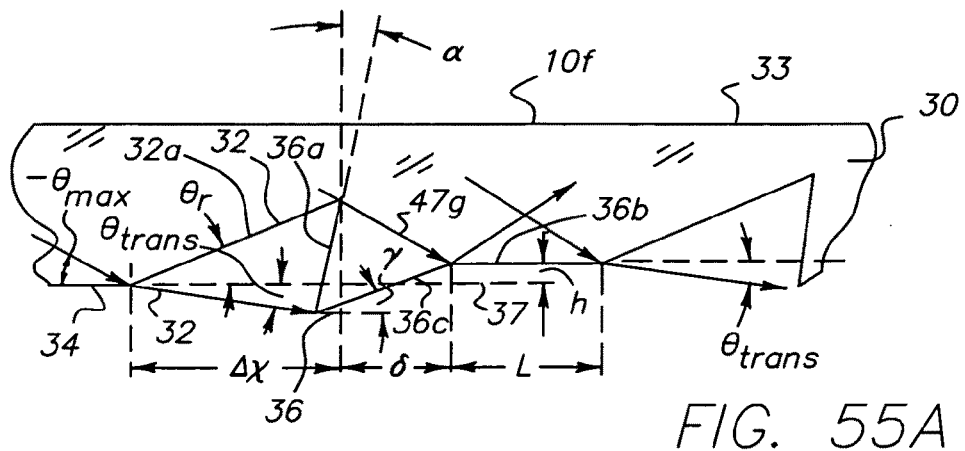
Figure 55B:
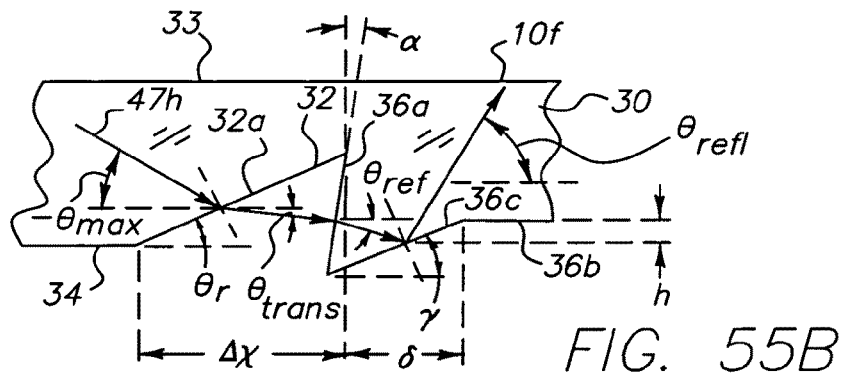
Figure 56A:
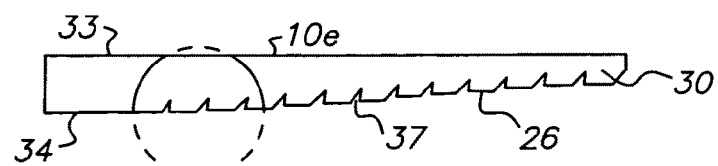
Figure 56B:
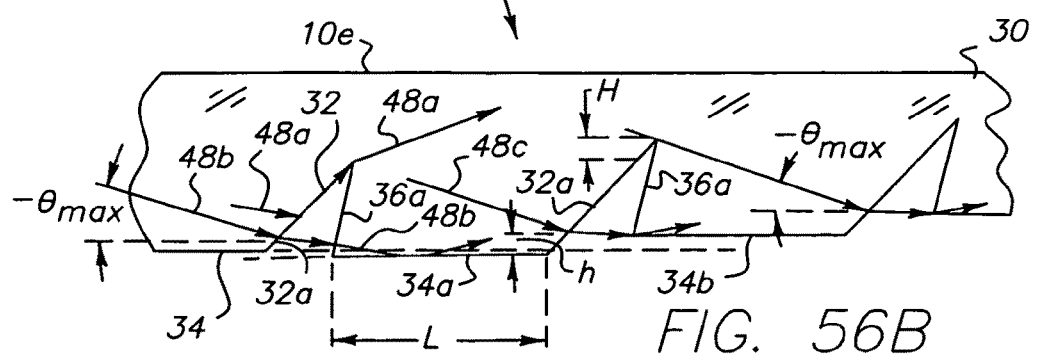
Figure 57:
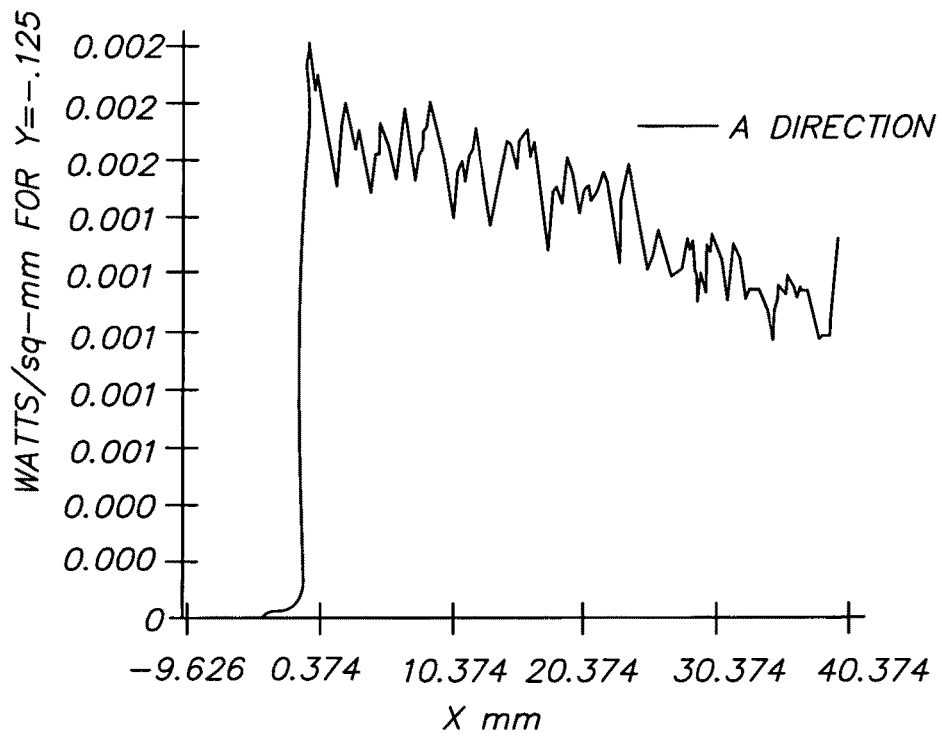
Figure 58:
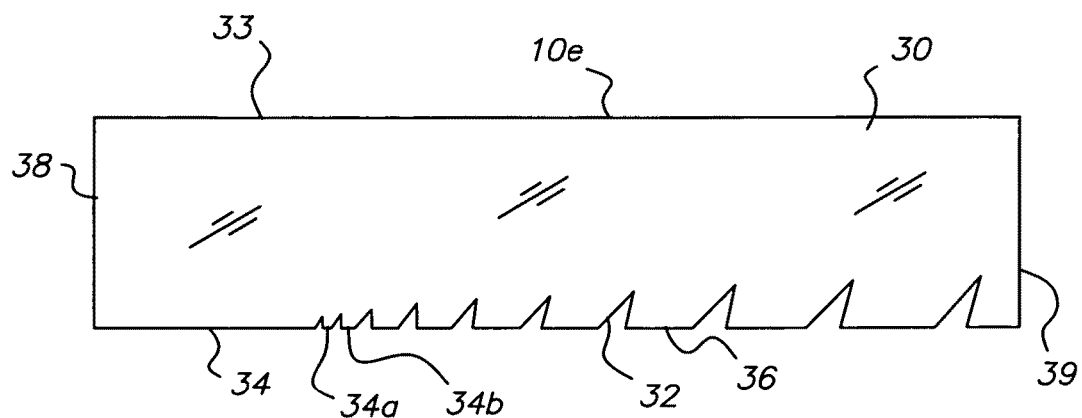
Figure 59A:
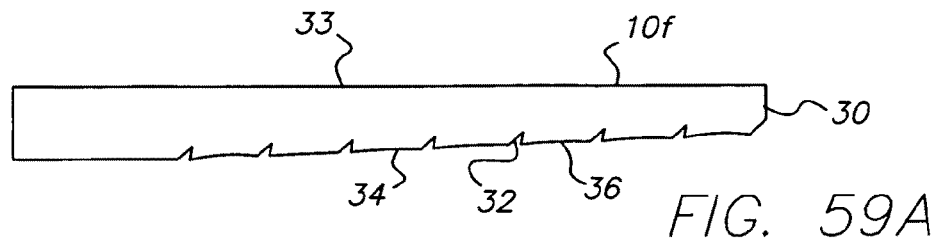
Figure 59B:
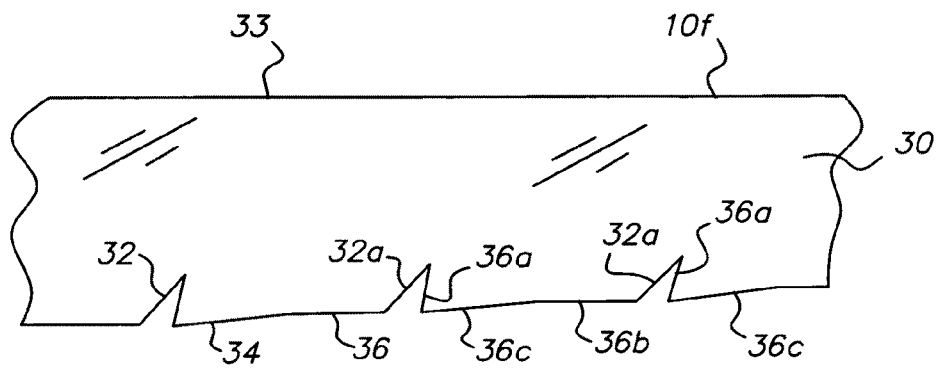
Figure 60:
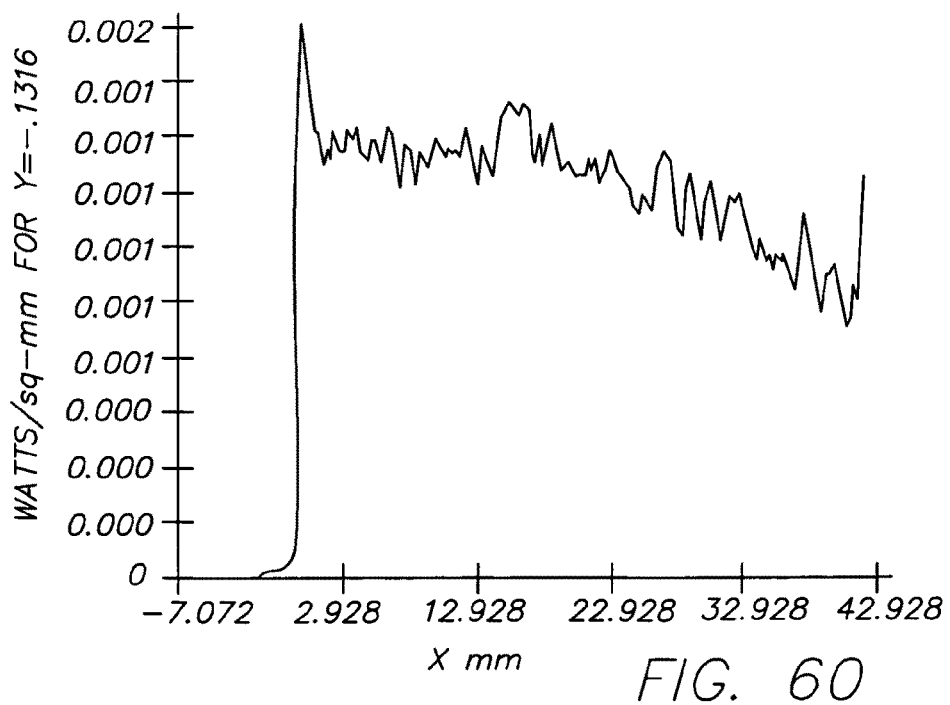
Figure 61:
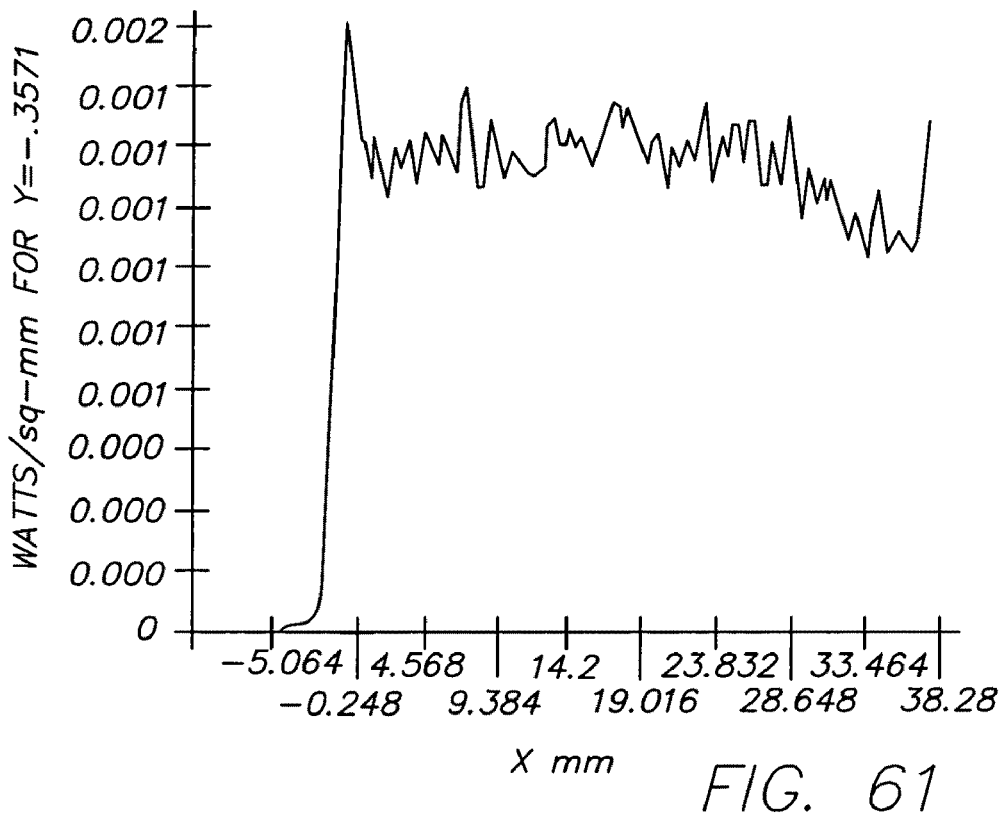
Figure 62:
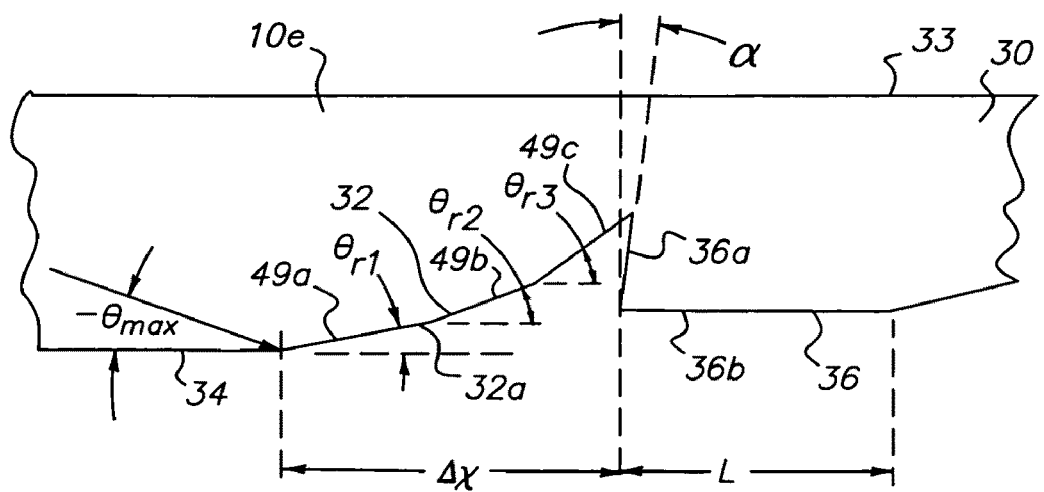
Figure 63:
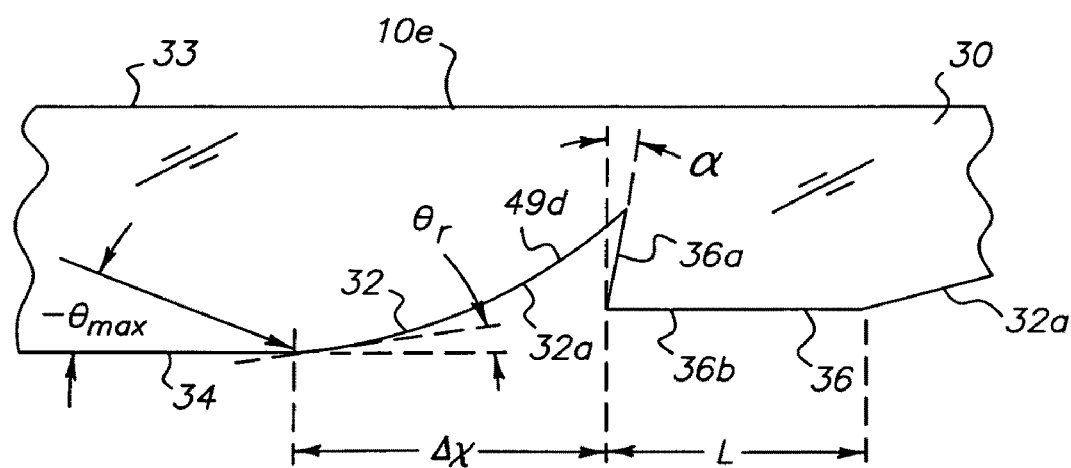
Figure 64A:
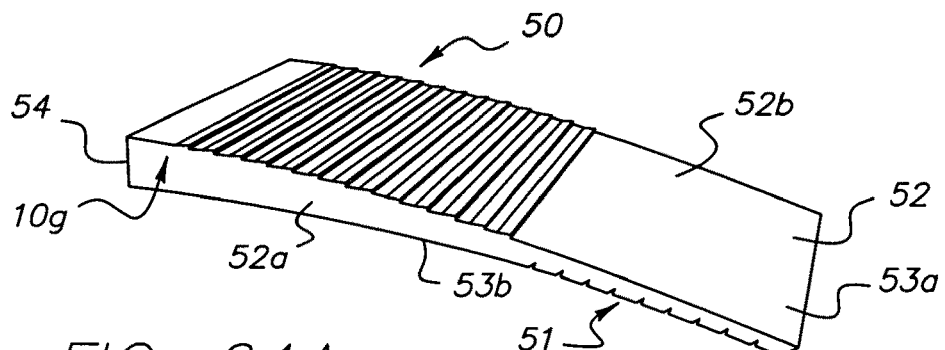
Figure 64B:
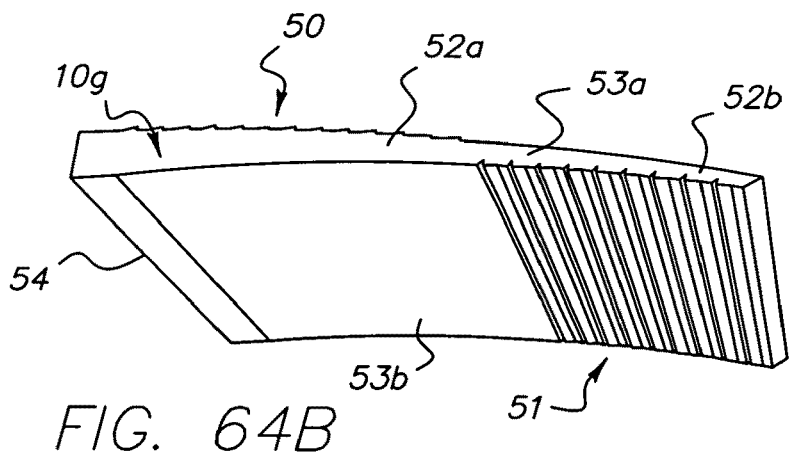
Figure 64C:
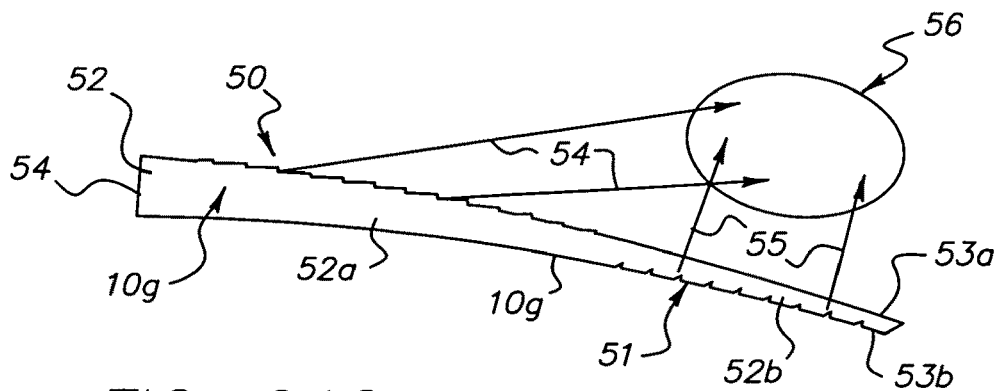
Figure 65:
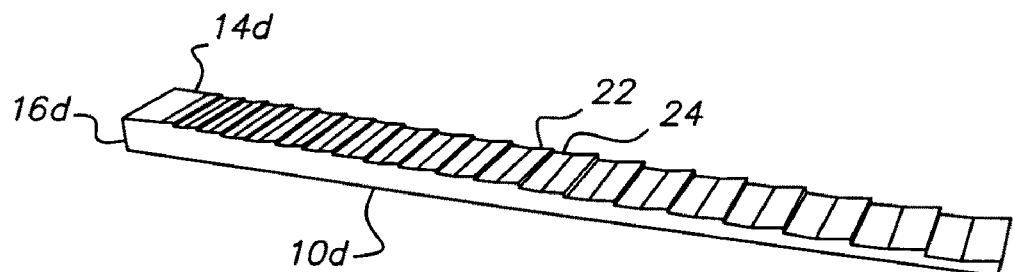

FIG. 14 is a plot showing the minimum exit face and riser (ramp) angle limit derived for the third and fourth limiting rays, Rays 3 and 4, reflective interaction with one of the riser (ramp) surfaces and subsequent refraction through one of the exit faces for the device of FIG. 4 for different values of a numerical aperture NA of light inputted into device, and a refractive index ratio $R_n$ of 1.4;

FIG. 15 is a plot showing all three design constraints to illustrate the solution space for efficient light extraction through the exit faces for the device of FIG. 4, for the case of refractive index ratio $R_n$ of 1.59, and numerical aperture NA values of 0.1, 0.3, and 0.5 for the light injected into the device;

FIG. 16 is a plot showing all three design constraints to illustrate the solution space for efficient light extraction through the exit faces for the device of FIG. 4, for the case of refractive index ratio $R_n$ of 1.4, and numerical aperture NA values of 0.1, 0.3, and 0.5 for the light injected into the device;

FIG. 17 is a perspective view of a third embodiment of the optical illumination guiding device of the present invention having acutely ramp structures, similar to the device of FIG. 4, with gradual or discrete thickness reduction along the length of the device;

FIG. 18 is a partial cross-sectional view of the device of FIG. 17 showing a light ray diagram;

FIG. 19 is another partial cross-sectional view of the device of FIG. 17 showing a light ray diagram to illustrate in more detail limiting refractive ray, Ray 2', interaction through the exit face of one of the ramp structures;

FIG. 20 is a plot of the maximum riser (ramp) angle versus minimum exit face angle limit derived for the second limiting ray, Ray 2', refracting through the exit face of one of the ramp structures of the device of FIG. 17, for index ratio $R_n$ of 1.59, and different values of the thickness reduction (ratio) parameter alpha α;

FIG. 21 is another partial cross-sectional view of the device of FIG. 17 showing a light ray diagram to illustrate the fourth limiting ray, Ray 4', reflective interaction with one of the riser (ramp) surfaces and subsequent refractive interaction through the exit face of one of the ramp structures;

FIG. 22 is a plot showing the minimum exit face and riser (ramp) angle limit derived for the third and fourth limiting rays reflective interaction with the riser (ramp) surface and subsequent refraction through the exit face of one of the ramp structures of the device of FIG. 17 for the cases of the index ratio $R_n$ of 1.59, numerical aperture of injected light of 0.5, and different values of thickness reduction parameter alpha α;

FIG. 23 is a plot showing all three design constraints to illustrate the solution space for efficient light extractions for device of FIG. 17 for the cases of refractive index ratio $R_n$ of 1.59, the thickness reduction ratio α=1.3, and injected light numerical aperture values of 0.1, 0.3, and 0.5;

FIG. 24 is a plot showing all three design constraints to illustrate the solution space for efficient light extractions for the device of FIG. 17 for the cases of refractive index ratio $R_n$ of 1.4, the thickness reduction ratio α=1.2, and injected light numerical aperture values of 0.1, 0.3, and 0.5;

FIG. 25 is a perspective view of a fourth embodiment of the optical illumination guiding device of the present invention having acutely ramp structures and gradual thickness reduction, similar to the device of FIG. 17, with flat surface feature between pairs of adjacent ramp structures;

FIG. 26 is a partial cross-sectional view of the device of FIG. 25 showing a light ray diagram for two of the ramp structures and the flat surface feature disposed between such structures;

FIG. 27 is a partial cross-sectional view of the device of FIG. 25 showing a light ray diagram to illustrate the second limiting refractive ray, Ray 2", interaction through the exit face of one of the ramp structures;

FIG. 28 is a plot of the maximum riser (ramp) angle versus minimum exit face angle limit derived for the second limiting ray, Ray 2", interaction through the exit face of one of the ramp structures of FIG. 25 for the case of index ratio $R_n$ of 1.59, and different values of parameters alpha α and beta β;

FIG. 29 is a partial cross-sectional view of the device of FIG. 25 showing a light ray diagram to illustrate the fourth limiting ray, Ray 4", reflective interaction with one of the riser (ramp) surfaces and subsequent refractive interaction through the front exit face of one of the ramp structures;

FIG. 30 is a plot showing the minimum exit face and riser (ramp) angle limit derived for the third and fourth limiting rays reflective interaction with one of the riser (ramp) surfaces and subsequent refraction through the exit face of one of the ramp structures of FIG. 25;

FIG. 31 is a plot showing all three design constraints to illustrate the solution space for efficient light extractions for device of FIG. 25, for the cases of refractive index ratio $R_n$ of 1.59, the thickness reduction ratio alpha α=1.5, flat parameter beta β=1.0, and injected light numerical aperture values of 0.1, 0.3, and 0.5;

FIG. 32 is a plot showing all three design constraints to illustrate the solution space for efficient light extractions for the device of FIG. 25, for the cases of refractive index ratio $R_n$ of 1.4, the thickness reduction ratio α=1.5, flat parameter β=1.0, and injected light numerical aperture values of 0.1, 0.3, and 0.5;

FIG. 33 is a plot showing the maximum propagation angle, $\Theta_{Ray-max}$, of light in the device of FIG. 4 versus the injected light numerical aperture NA for different values of the refractive index ratio $R_n$;

FIG. 34A is an illustration of an example of the light distribution from the devices of FIGS. 4, 17, and 25 having ramp structures with a $\Theta_{EF}$ of 18 degrees and $\Theta_R$ of 8 degrees, and injected light numerical aperture NA of 0.5;

FIG. 34B is a plot of the intensity of illumination for the light distribution for the example of FIG. 34A;

FIGS. 35A and 35B are plots of the intensity of illumination for the light distribution for two different examples of the devices of FIGS. 4, 17, and 25, in which FIG. 35A represents such light distribution of these devices utilizing ramp structures having $\Theta_{EF}$ of 20 degrees and $\Theta_R$ of 2 degrees, and an injected light numerical aperture NA of 0.1, and FIG. 35B represents such light distribution for these devices using $\Theta_{EF}$ of 40 degrees, $\Theta_R$ of 2 degrees, and the injected light numerical aperture NA of 0.1;

FIG. 36 is a plot of the light distribution for an example of the device of FIG. 17 having a riser angle $\Theta_R$ of 4 degrees, injected light numerical aperture NA of 0.1, refraction index ratio $R_n$ of 1.4, for exit face angles $\Theta_{EF}$ of 10, 20, 30, and 40 degrees;

FIG. 37 is a partial cross-sectional view of the device of FIG. 4, which is similar to FIG. 6, but with the front exit faces curved, such as having a convex shape;

FIG. 38 is a perspective view of the device of FIG. 17, which is similar to FIG. 17, but has arcuate front exit surfaces to influence the angle of the emitted radiation along the width of the device;

FIG. 39 is a perspective view of the device similar to FIG. 17 in which the body of the device is curved about an axis perpendicular to the axis of the device;

FIG. 40 is a perspective view of the device similar to FIG. 17 in which the body of the device is curved about an axis parallel to the axis of the device;

FIG. 41 is a perspective view of the device similar to FIG. 17 in which the body of the device is completely bent about an axis parallel to the axis of the device to form a cylindrical shell;

FIG. 42 is a perspective view of the device similar to FIG. 25 in which the beginning input portion of the body of the device is tapered to the larger thickness in order to reduce the numerical aperture of the radiation within the device in the thickness direction;

FIG. 43 is a perspective view of the device similar to FIG. 25 in which the beginning input portion of the body is tapered to larger thickness in order to reduce the numerical aperture of the radiation within the device in the thickness direction;

FIG. 44 is a perspective view of the device similar to FIG. 4 in which the beginning input portion of the body is tapered in order to reduce the numerical aperture of the radiation within the device along the width of the device;

FIG. 45 is a perspective view of the device similar to FIG. 4 in which the width of the beginning input portion of the body is tapered in order to reduce the numerical aperture of the radiation within the device along the width of the device;

FIG. 46A is a perspective view of a fifth embodiment of the optical illumination guiding device of the present invention having ramp structures along the back surface of the device for reflecting light through the front surface in which ramp structures alternate with falling structures of the back surface to capture light transmitted through ramp structures;

FIG. 46B is a light ray diagram to show the geometry of rays entering a theoretical optical element having top and bottom surfaces to illustrate total internal reflective (TIR) by such surfaces;

FIG. 47 is a block diagram showing one application of the optical device of FIG. 46A having a light source and light emitted from the top surface of the device;

FIG. 48 is a partial cross-sectional view of the device of FIG. 46A showing a light ray diagram to illustrate the reflection off the riser surface of one of the ramp structures of the device to the front surface of the device;

FIG. 49 is a plot of the output angle $\theta_{out}$ from the top surface of the device of FIG. 46A versus the riser angle $\theta_r$ for the space defined by the NA of the light inside the device, where the dashed curve is the boundary for TIR at the riser surface to indicate that ray and riser angles above this curve produce TIR;

FIG. 50 is a partial cross-sectional view of the device of FIG. 46A showing a light ray diagram to illustrate the transmitted ray angle $\theta_{trans}$ from the riser surface of one of the ramp structures;

FIG. 51 is a plot of the transmitted ray angle $\theta_{trans}$ versus the riser angle $\theta_r$ for extreme ray angles $-\theta_{max}$ to $\theta_{max}$ for light ray diagram of FIG. 50;

FIG. 52 is a light ray diagram for one of the riser surfaces of the ramp structures of the device of FIG. 46A in which transmitted light from the riser surface is incident on the falling prismatic surface of an adjacent falling structure of the device along a prism angle;

FIG. 53 is a plot of the refracted ray by the falling prismatic surface versus the transmitted ray angle for rays passing through the riser surface for one of the ramp structures for the light ray diagram of FIG. 52;

FIGS. 54A, 54B, and 54C illustrate light ray diagrams for partial cross-sectional views of the optical device of FIG. 46A to illustrate the three conditions for the spacing between the riser surfaces of adjacent ramp structures;

FIG. 55A is a partial cross-sectional view of a fifth embodiment of the optical illumination guiding device of the present invention, similar to the device of FIG. 46A, but having falling structures with secondary riser (or ramp) surfaces;

FIG. 55B is another partial cross-sectional similar to FIG. 55A;

FIG. 56A is a cross-sectional view of an example of the device of FIG. 46A;

FIG. 56B is partial cross-section view of FIG. 56A, indicated by the oval of FIG. 56A, to showing a light ray diagram;

FIG. 57 is a plot of the light output distribution from the top surface of the device for the example of FIG. 56A;

FIG. 58 is example of the optical device of FIG. 46A showing the size of ramp structures and alternating falling structures gradually increasing along the length of the device;

FIG. 59A is a cross-sectional view of another example of the device of FIG. 55A;

FIG. 59B is partial cross-sectional view of FIG. 59A showing the device in more detail;

FIG. 60 is a plot of the light output distribution from the top surface of the device for the example of FIG. 59A;

FIG. 61 is another plot of the light output distribution from the top surface of the device for the example of FIG. 59A in which the ramp structure separation L is linearly reduced from its maximum value at the first ramp structure to zero at the last ramp structure;

FIG. 62 is a partial cross-sectional view of the device of FIG. 46A in which each ramp structure has a rising surface segmented into multiple surfaces at progressively steeper angles;

FIG. 63 is a partial cross-sectional view of the device of FIG. 46A in which each ramp structure has a rising surface having a continuously varying slope;

FIGS. 64A, 64B, and 64C are top perspective, bottom perspective and side views, respectively, of an optical device in accordance with a seventh embodiment of the optical illumination guiding device of the present invention having ramp structures along the top and bottom surfaces to distribute illumination from the top surface;

FIG. 65 is a perspective view of an example of the optical device of FIG. 25 in which the period and depth of the ramp structures and flat surface feature varies along the length of the device; and FIGS. 66-69 are block diagrams of luminaries with different types of light sources for used with optical devices of FIG. 4, 17, 25, 46A, 55A, or 64A-C;

DETAILED DESCRIPTION OF THE INVENTION

The present invention describes optical illumination devices 10a, 10b, 10c, 10d, 10e, 10f, and 10g having various structured surfaces for enabling controlled distribution of light. Although each of these optical devices 10a-f are described below as different embodiments of the present invention, a single optical device may have structures from one or more of devices 10a-f, as illustrated along the same surface, or different surfaces as, for example, in optical device 10g. The optical devices 10a-g are composed of optical material, such as plastic, glass, polycarbonate, or silicone, having an index of refraction higher than that of the surrounding medium, e.g., material, or gas, such as air, so as to enable guiding of light through the process of total internal reflection within the devices. As described below, on the surface(s) of the body of the optical devices 10a-g are surface relief structures so as to provide efficient light extraction combined with control of the distribution of the illumination that leaks out of the devices.

The structures of optical devices 10a-g may be manufactured on the surface(s) of optical material providing the body of such devices by conventional milling, lathes or diamond turning. Such techniques may be also be used to provide molds for injection molding or extrusion of such devices, or injection molding and then slumping or hot forming, such as to create nonplanar geometries, or extrusion for large flat sheets of such devices.

The optical devices 10a-g mostly have parallel shaped structures made of a dielectric material that is mostly transparent. The dimensions of the optical devices 10a-g and their respective structures are large compared to the wavelength of light so diffractive effects are mostly neglected enabling ray modeling for light. The optical devices 10a-g act as a conduit for light that is coupled into one face of the structure for the purpose of coupling light out of an adjacent face. This is contrary to a fiber optic where light is coupled into one end and exits the opposite end in most applications.

The surfaces of optical device 10a-g utilize both reflection and refraction to control the light to either couple all the light out of the device, or couple out a portion of the light while maintaining or lessening the numerical aperture of the light remaining in the device. The optical devices operate on the principles of conserving the numerical aperture of the light within their devices by only reducing the dimension of the optical device through discrete steps, as opposed to a tapered light-guide where the numerical aperture is correspondingly increased as the thickness for the light-guide is decreased. This allows output coupling while reducing the dimension of the optical devices without increasing the numerical aperture of the light traveling within the devices.

To understand the principle of operation of the optical devices 10a-e shown in FIGS. 1-45, first consider the optical invariant as the product of the dimension of the light-guide and the numerical aperture of the light propagating within.

$$L \equiv X^* NA_x, \quad (1)$$

Where X is the dimension of the light-guide and $NA_x$, is the numerical aperture of the light in the x direction given by:

$$NA_x = n \sin(\Theta_{Ray-max}) \quad (2)$$

Where the refractive index of the device's optical material is n and the maximum angle of light propagation with respect to the device axis is $\Theta_{Ray-max}$. Equations (1) and (2) indicate that if the dimension of the device is reduced, there is a corresponding increase in the angles of the light with in the optical device. This principle is avoided by reducing the dimension of the optical device while coupling light out to prevent the numerical aperture increase associated with an adiabatic taper design. This allows a reduction in the thickness of the structure of the optical device without an increase in the angles of the light remaining. This is important since it is often possible to reduce the dimension of the optical device to the point where it will either leak out of the sides on its own or it will actually reflect back toward the source.

Figure 1:
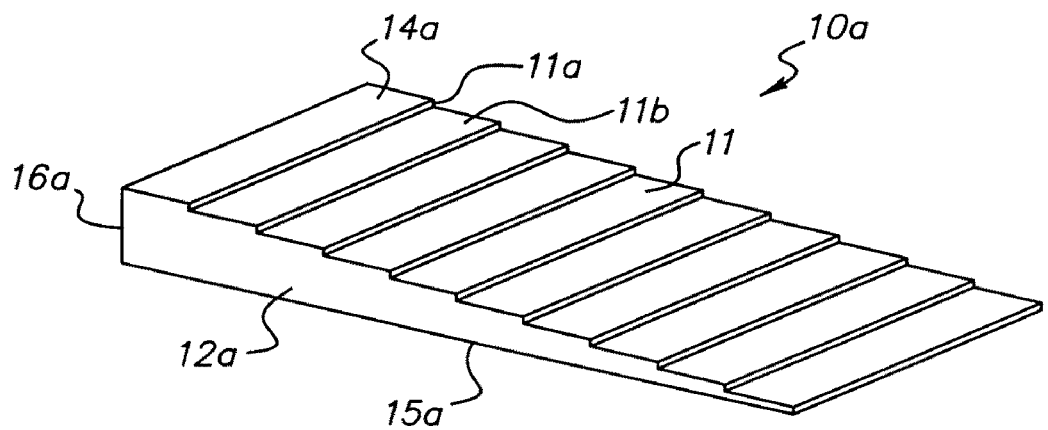
FIG. 1 is a perspective view of a first embodiment of the optical illumination guiding device of the present invention having a front-side perpendicular step or staircase structure.

Optical design rules for the optical devices 10a-e are presented below for 100% efficient coupling out of the intended surface (except for Fresnel reflections). As will be shown, substantially all the light incident on the surface of the device can be out coupled (emitted) through a desired surface, and to couple such light out while maintaining or reducing the numerical aperture of the light remaining in the device. Furthermore, it is possible to control the output angular distribution of the extracted light emitted from the optical device. Several features of the optical devices are:

1) Macroscopic light-guide>>wavelength
2) Length long compared with thickness (typically >10 times the thickness)
3) Conserve or reduce the numerical aperture of light remaining in the light-guide.
4) Reduce light-guide dimension by coupling light out to conserve numerical aperture.
5) Uses both refraction and total internal reflection to manipulate the angles of the rays.
6) Both front-side and backside design rules
7) Design rules developed for near 100% coupling efficiency
8) Maximum control of the output light angular distribution Now referring to FIG. 1, an optical device 10a of a first embodiment is shown having a body 12a of optical material with a series of steps providing a stair-case structure 11 along top surface 14a. Each of the steps is shown equally spaced. As will be shown by the theoretical discussion below, optical device 10a provides frontside output coupling, such that when light is inputted or injected into one end 16a of device 10a the light is distributed by the front exit face 11a of each of the steps, and a substantial portion of the light is internally reflected within body 12a until distributed from such front exit faces.

Optical device 10a is primarily provided to show the concept of the invention, and is considered least preferable of the embodiments described since features added to optical devices 10b-e can provide out-coupling of substantially all the light incident on a front-side while not increasing the numerical aperture of the light that does not exit the optical device. Such output coupling decreases the dimension of the optical device while coupling light out of the device in a predefined direction. The light coupled out of the optical device can have an equal or lesser numerical aperture than that of the light propagating inside of the device. This is accomplished without violating the optical invariant (Equation (1)) by emitting light through a substantially larger area (front surface of the optical device) than the area through which the light was coupled into the optical device (end face 16a).

Figure 2:
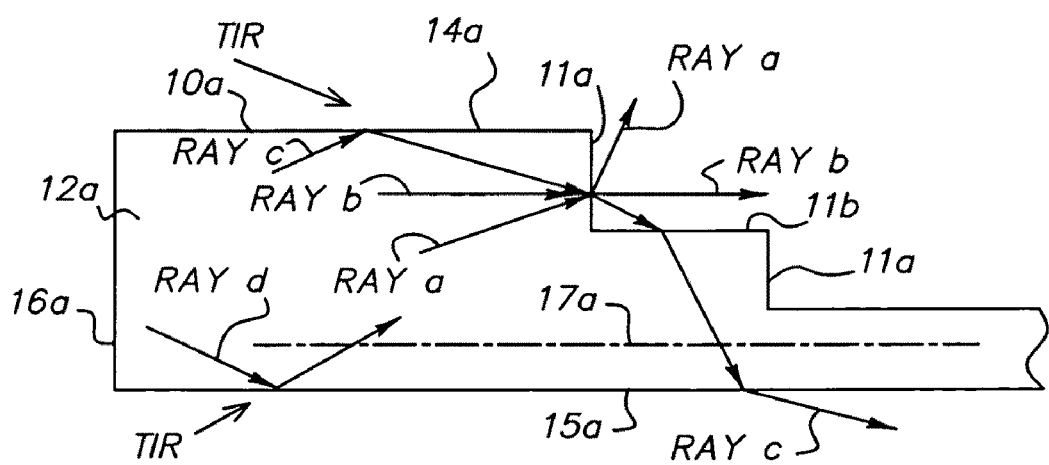
FIG. 2 is a partial cross-sectional view of the device of FIG. 1 showing a light ray diagram.

The front surface 14 of optical device 10a has discrete steps providing front end surfaces 11a and parallel surfaces 11b in order to out-couple light and reduce the thickness of body 16 without using an angled taper that would increase the numerical aperture of the light propagating inside the device. A cross-section of the optical device 10a is shown in FIG. 2. This embodiment couples light out while discretely decreasing the dimension of the device to ensure that while thickness of the device is reduced to zero, the numerical aperture of the rays propagating within the optical device does not increase, as in the case of an adiabatically tapered design. The goal of this embodiment is to couple light out of the front exit surfaces 11a of the structure on the front surface 14. Unfortunately, this structure 11 also allows some rays to couple out the back surface 15a.

FIG. 2 shows light ray geometry, where light is injected into the device through the input end face 16a. The internal rays are depicted by the four rays labeled Ray a, Ray b, Ray c, and Ray d. The ray labeled ray a is propagating upward in the figure toward the surface of the optical device 10a. It is shown incident on the step face and refracting through the step face away from the normal and successfully exiting the device. The ray labeled ray b is traveling parallel to the optical axis 17a. This ray is shown incident on one of the exit faces 11a and propagating through the medium-to-air interface and exiting the device parallel to axis 17a. The extreme ray labeled ray c is shown reflecting off the top surface of the device and then hitting one of the exit faces 11a. This ray refracts away from the normal of the exit face, according to Snell's law, and then reenters the device and refracts toward the normal. This ray c, upon reentering the device, is now propagating at an angle that is not supported by the device and will exit out the back face 15a in an undesirable direction. The structuring of optical device 10a is thus not efficient for out-coupling light in a desired direction. Ray d depicts the extreme downward traveling ray experiencing total internal reflection from the back face 15a. This condition for Ray d occurs as long as the ratio of the refractive index of the optical device material to the refractive index of the surrounding medium is adequate to support the numerical aperture of the injected light.

The conditions of validity for the reflections from the back surface 15a and any parallel front surface 11b (or any other surface parallel to the device axis) to support total internal reflection of maximum angle rays such as Ray d in FIG. 2 are described below.

The critical angle of the surface is defined by:

$$\Theta_{critical} = \arcsin\left[\frac{1}{R_n}\right], \tag{3}$$

where the refractive index ratio is:

$$R_n \equiv \frac{n_{lg}}{n_m}, \tag{4}$$

where the variables $n_{lg}$ and $n_m$ are the refractive indices of the material of the optical device 10a and the medium, respectively.

The maximum angle for the light inside optical device 10a is given by:

$$\Theta_{Ray-max} \geq \arcsin\left[\frac{1}{R_n}*NA\right], \tag{5}$$

where NA is the sine of the numerical aperture of the injected light rays (in air). The numerical aperture for Gaussian distributed rays is the sine of the angle at the $1/e^2$ intensity value of the distribution. For Gaussian beams there is little energy propagating with parameters outside the $1/e^2$ limit, and this can be used as the limiting ray. The angle of incidence of this ray on the front exit surfaces 11a is given by the expressions:

$$\Theta_{in} = \pm(90-\Theta_{Ray-max}). \tag{6}$$

For optical device 10*a* to support these rays in total internal reflection the condition:

$$\Theta_{in} \leq \Theta_{critical} \tag{7}$$

must be met. The required index ratio $R_n$ required to support the numerical aperture of injected light is plotted in FIG. 3. An index ratio $R_n > 1.41$ will support numerical aperture of value equal to 1.0 injected into optical device 10*a*. The condition that the refractive index ratio, $R_n$, is larger than the limit depicted in FIG. 3 is necessary for all optical device 10*a* structures to support total internal reflection of the guided light.

Figure 5:
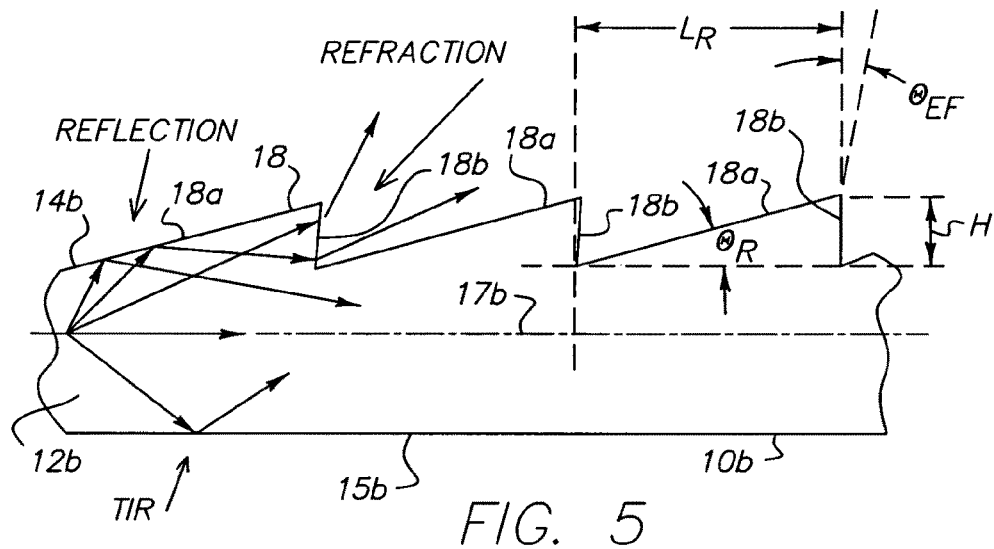
FIG. 5 is a partial cross-sectional view of the device of FIG. 4 showing a light ray diagram.

Referring to FIG. 4, the optical device 10*b* of a second embodiment of the present invention is shown. Optical device 10*b* has a body 12*b* of optical material with a series of repeating (or periodic) acutely angled ramp (or ratchet) structures 18 along front surface 14*b*. Each ramp structure 18 has an acutely angled riser (or ramp) surface 18*a* and an acutely angled front exit face (or facet) 18*b*. The front exit faces 18*b* distribute light when inputted at end 16*b*, and such light is guided in the device by totally internally reflected within body 12*b* until distributed by the front exit faces 18*b* of the ramp structures 18. Optical device 10*b* efficiently extracts substantially all the light incident on the front surface 14*b* (with the exception of Fresnel losses) with each ramp structure 18 having its riser surface 18*a* angled away just before its exit face 18*b*, which is angled backwards. FIG. 5 shows a cross-sectional view of the front surface structure for three of the ramp structures 18. The riser 18*a* and the exit face 18*b* form an acute angle for this embodiment to be effective. This acute angle is necessary to avoid the shortcomings of the optical device 10*a* of the first embodiment described above.

The angle of the riser surface 18*a* relative to the axis 17*b* of optical device 10*b* is represented as $\Theta_R$. The angle of the exit face 18*b* relative to the normal of axis 17*b* is represented as $\Theta_{EF}$. The thickness of body 12*b* between each ramp structure 18 and the bottom surface 15*b* is the same along the length of optical device 10*b*. Bottom surface 15*b* is substantially flat and parallel with the optical axis 17*b*, and provides total internal reflection for all rays injected into the optical device 10*b* as provided by relationships in Equation (7). All of the light incident on the front exit surface 18*b* can be coupled out without having the light reenter optical device 10*b*, as in the case of Ray c (FIG. 2) of optical device 10*a*. This is accomplished with ramp structure 18 by properly controlling the parameters $\Theta_R$ and $\Theta_{EF}$, for a given numerical aperture, NA, and refractive index ratio, $R_n$. In cases where all the light is not extracted, it is possible to optimize the device so that the rays reflected back into the optical device 10*b* will have reduced angle and therefore reduce the effective numerical aperture of the remaining light. Light can directly exit the optical device 10*b* by refracting through the exit face 18*b*, or the light can reflect from the top of the riser 18*a* and then refract through the exit face 18*b*. In either case, light is coupled out of the optical device 10*b* through the exit face 18*b*. Only rays that were propagating upward toward exit faces 18*b* of ramp structures 18 are eligible to be coupled out since horizontally propagating and downward propagating rays never interact with exit faces 18*b*. This means that only half of the light is out coupled with ramp structures 18 and that the numerical aperture of the exiting light can be less than that of the light originally coupled into the optical device 10*b*. The optical invariant (Equations (1) and (2)) is preserved since light is emitted over a larger area than the entrance face 16*b* of optical device 10*b*.

The free parameters for designing optical device 10*b* are the riser angle $\Theta_R$, the riser length $L_R$, and the cutback angle of the exit face $\Theta_{EF}$. The length of the riser surfaces 18*a* can be reduced to the point where they are barely discernable to the human eye, providing an extended light source with pre-defined angular spectrum of emitted radiation. The riser height H is a dependent variable given by the relationship:

$$H = L_R \tan(\Theta_R) \tag{8}$$

The goal of the interaction with the front surface 18*b* is to either:
 a) Couple light out of the device; or
 b) Recirculate the reflected light back into the device at an equal or lesser angular magnitude than its original value. This important feature decreases the numerical aperture of the light propagating in the device.

Figure 7:
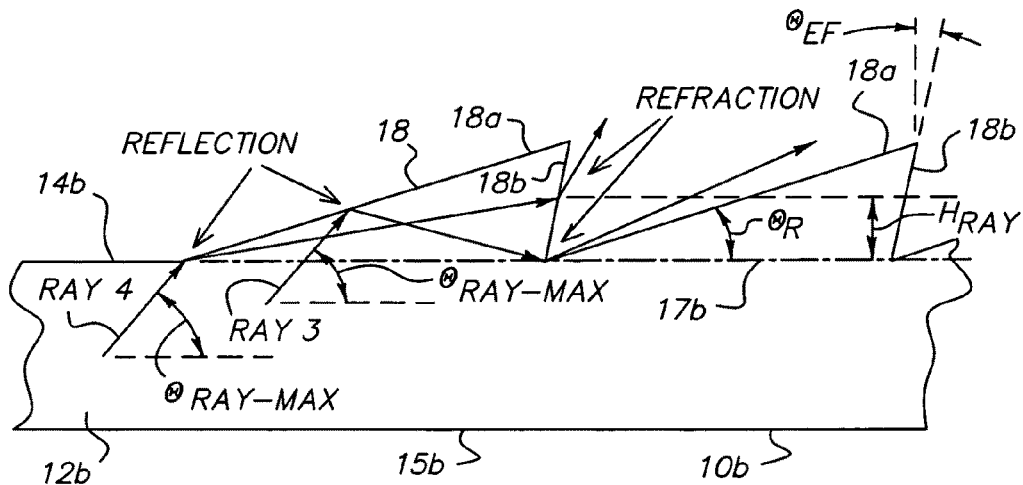
FIG. 7 is another partial cross-sectional view of the device of FIG. 4 showing a light ray diagram to illustrate two key limiting reflective ray interactions, Rays 3 and 4, at the front surface of the device.

In order to do this it is necessary to consider four critical ray limits identified in FIGS. 6 and 7. In FIG. 6, two extreme angled rays are shown directly incident on the exit face 18*b* of the structure 18. Ray 1 is the maximum angle ray propagating at $\Theta_{Ray\text{-}max}$ as defined by Equation (5). Ray 2 is the most downward traveling ray that is directly incident on the exit face 18*b* without reflecting from the riser surface 18*a*. In these figures Ray 2 is a ray of angle zero traveling parallel to the axis 17*b* and incident at the bottom of the exit face 18*b*. Conditions are imposed on the exit face 18*b* angle $\Theta_{EF}$ such that neither ray, upon exiting the optical device 10*b*, will reenter the optical device through the subsequent riser surface 18*a*.

FIG. 7 shows two cases of rays that undergo total internal reflection from the riser surface 18*a* of the structure 18 before hitting the exit face 18*b*. These are rays 3 and 4 in FIG. 7. Ray 3 represents the case where the numerical aperture and riser surface angle $\Theta_R$ are such that the reflected ray has a negative angle and is capable of hitting the bottom of the exit face surface 18*b* as shown. In general the ray that hits the bottom of the exit face 18*b* will reflect from a position on the riser between the bottom and the top of the riser surface 18*a*. Ray 4 represents the case where the numerical aperture of the light and riser surface 18*a* angle are such that the ray reflecting from the bottom of the riser surface 18*a* will travel upward and hit the exit face 18*b* at a non-zero height $H_{Ray}$. As the reflected ray angles for Ray 3 and Ray 4 interaction approach zero, these two cases become degenerate with both rays incident at the bottom of the riser and their reflected counterparts incident at the bottom of the exit face 18*b*.

Figure 8:
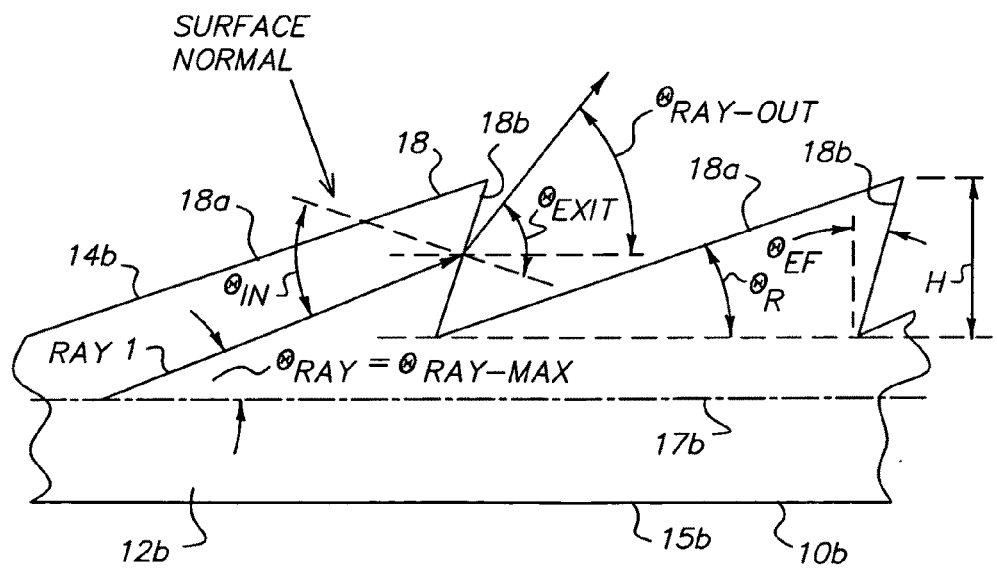
FIG. 8 is another partial cross-sectional view of the device of FIG. 4 showing a light ray diagram to illustrate in more detail the first limiting refractive ray, Ray 1, refracting through one of the exit faces of the device.

Referring to FIG. 8, the first design constraint on optical device 10*b* can be placed on the exit face angle to avoid total internal reflection at an angle that could either increase the ray's angle or reflect it backwards toward the source. This condition is that a ray propagating at the maximum upward angle $\Theta_{Ray\text{-}max}$ will be incident on the exit face 18*b* at less than the critical angle for optical material of optical device 10*b*. First, using the nomenclature in FIG. 8, the angle of incidence of the ray, relative to the surface normal, is defined as:

$$\Theta_{in} = \Theta_{Ray\text{-}max} + \Theta_{EF}. \tag{9}$$

The angle of incidence is required to be less than the critical angle of the optical material of optical device 10*b*:

$$\Theta_{EF} + \Theta_{Ray\text{-}max} \leq \Theta_{critical}. \tag{10}$$

where the critical angle for optical device 10*b* is given by the formula in Equations (3) and (4).

At this point these extreme upward traveling rays do not experience total internal reflection at the exit face 18*b*. This condition can be expressed as a limit on the exit face angle:

$$\Theta_{EF} \leq \Theta_{critical} - \Theta_{Ray\text{-}max}. \tag{11}$$

Rewriting this inequality using the definitions for the critical and maximum ray angles, yields:

$$\Theta_{EF} \leq \arcsin\left[\frac{1}{R_n}\right] - \arcsin\left[\frac{1}{R_n}NA\right] \quad (12)$$

Figure 9:
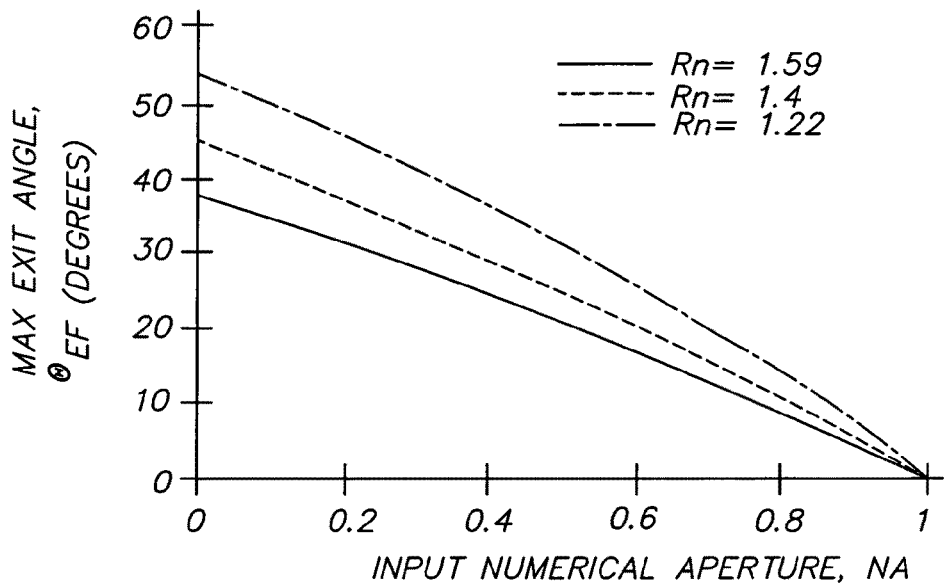
FIG. 9 is a plot of maximum exit face angle derived for first limiting ray, Ray 1, refracting through one of the exit faces of the device of FIG. 4.

To visualize this constraint, a plot of this limiting condition is shown in FIG. 9 for various values of the index ratio, $R_n$. If the exit face angle $\Theta_{EF}$ is less than the values plotted for a given numerical aperture and refractive index ratio $R_n$, then the maximum angled ray, Ray 1, will not experience total internal refection at the exit face surface 18b. This is a loose constraint and allows for some design latitude in the selection of the exit face cut-back angle. Conversely, if the angle of the exit face 18b is increased to the point where some or all of the rays incident on it will experience total internal reflection then the rays will be directed toward the riser surface 18a and will then exit the light guide in a direction angled back toward the source. This condition will allow the front-surface structures 18 to be used to create larger angle illumination. The device can now illuminate a substantially wider range of angles.

The next design rule for optical device 10b is derived by considering the behavior of Ray 2, such that relationship between angles $\Theta_{EF}$ and $\Theta_R$ such that Ray 2 does not reenter the optical device through the top of the subsequent riser 18a. Ray angle nomenclature is defined in FIG. 10. Since the limiting ray is parallel to the device axis 17b, the ray angle $\Theta_{Ray}=0$. The expression for the incident ray angle in Equation (9) becomes:

$$\Theta_{in}=\Theta_{EF} \quad (13)$$

The exit angle $\Theta_{exit}$ of a ray that refracts through the riser surface 18a is calculated using Snell's Law:

$$\Theta_{exit}=\arcsin[R_n*\sin(\Theta_{in})] \quad (14)$$

Equation (14) shows the exiting ray's angle relative to the surface normal. The new angle of propagation relative to axis 17b is:

$$\Theta_{Ray\text{-}out}=\Theta_{exit}-\Theta_{EF} \quad (15)$$

This new angle of propagation must be larger than the riser angle or the ray will reenter optical device 10b and refract to an angle that is larger than its original propagation angle. To avoid this condition the new propagation angle is required to be larger than the riser angle:

$$\Theta_{Ray\text{-}out} \geq \Theta_R \quad (16)$$

Substituting the relevant definitions, the relationship between the riser angle and the exit face cut-back angle values is:

$$\arcsin[R_n*\sin(\Theta_{EF})]-\Theta_{EF} \geq \Theta_R. \quad (17)$$

Figure 10:
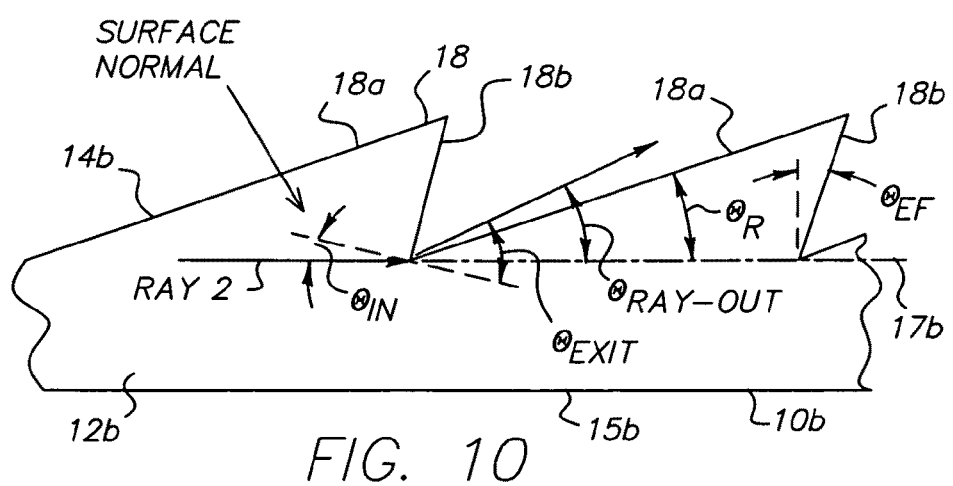
FIG. 10 is another partial cross-sectional view of the device of FIG. 4 showing a light ray diagram to illustrate in more detail the second limiting ray, Ray 2, refracting through one of the exit faces of the device.
Figure 11:
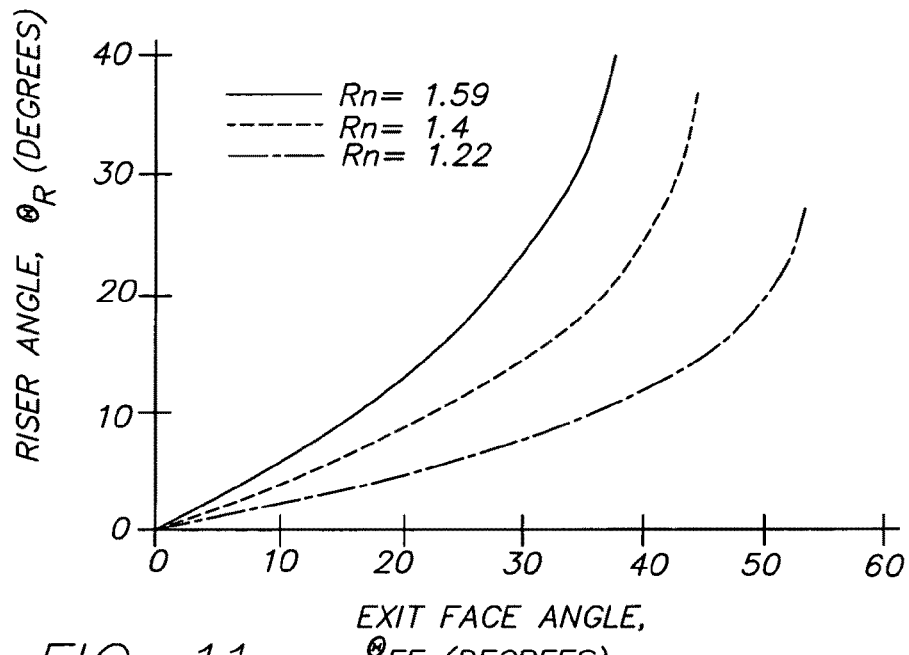
FIG. 11 is a plot of the maximum riser (ramp) angle versus minimum exit face angle limit derived for the second limiting ray, Ray 2, refracting through one of the exit faces of the device of FIG. 4, and three different values of the refractive index ratio $R_n$.

When this condition is satisfied, the extreme Ray 2 shown in FIG. 10 will exit through the exit face 18b and never reenter optical device 10b. To demonstrate this relationship between the riser angle and the exit face angle, a plot of the riser angle versus the exit face angle is shown in FIG. 11 for various ratios of the refractive index of optical device 10b to the refractive index of the surrounding medium. This plot shows that the exit face angle must be greater than a minimum value for a given riser angle or conversely that the riser angle must be less than a maximum value for a given exit face angle. These curves provide a limit to the solution space for high efficiency output coupling through these front-side surfaces 18b. Since the solutions lie below and to the right of the curves increasing the refractive index ratio, $R_n$, increases the size of solution space.

Figure 12:
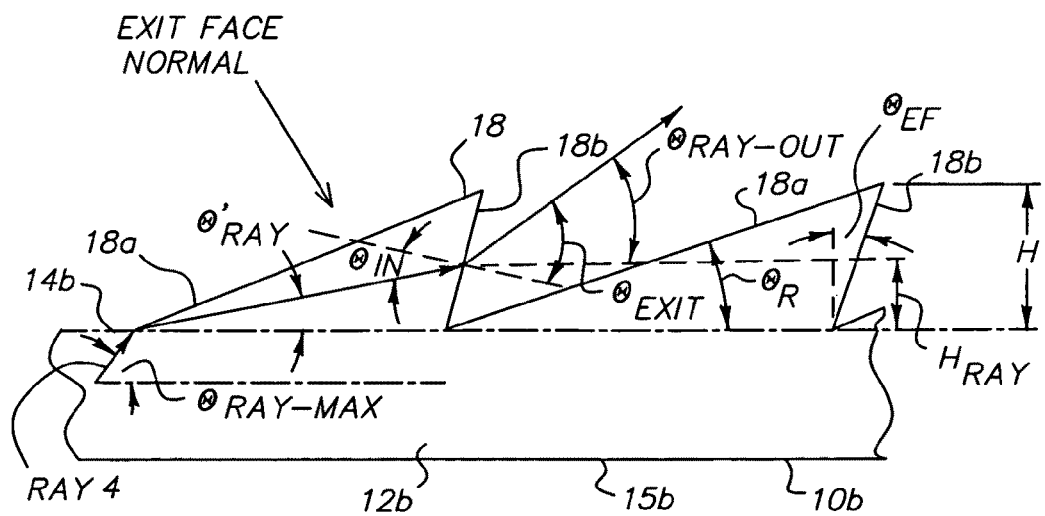
FIG. 12 is another partial cross-sectional view of the device of FIG. 4 showing a light ray diagram to illustrate in more detail the fourth limiting ray, Ray 4, reflective interaction with one of the riser (ramp) surfaces and subsequent refraction through one of the exit faces of the device.

Now consider the case for rays that reflect off the riser 18a and then exit through the exit face 18b as shown for Rays 3 and 4 shown in FIG. 7. For this discussion the detailed diagram of this case is shown in FIG. 12, where a more general Ray 4 interaction is shown. The first interaction of the light ray is in reflection from the riser 18a. The ray takes on a new direction given by:

$$\Theta_{Ray}=2\Theta_R-\Theta_{Ray\text{-}max} \quad (18)$$

If the ray is incident on the exit face 18b it will couple out of optical device 10b and refract at an angle represented by $\Theta_{Ray\text{-}out}$. To determine this angle, it is useful to represent the angle of incidence on the exit face 18b with respect to the normal of the exit face as:

$$\Theta_{in}=\Theta_{Ray}+\Theta_{EF} \quad (19)$$

Then, using Snell's law the angle of the light transmitted through the exit face with respect to the exit face normal is given by:

$$\Theta_{exit}=\arcsin[R_n\sin(\Theta_{in})] \quad (20)$$

The exit ray angle with respect to axis 17b can be expressed as:

$$\Theta_{Ray\text{-}out}=\Theta_{exit}-\Theta_{EF} \quad (21)$$

With the expression for the exit ray angle, the condition to prevent the ray from reentering the optical device 10b can be defined. If the reflected ray angle is small enough such that a reflected ray from some part of the riser 18a can hit the bottom of the exit face 18b at $\Theta'_{Ray}<0$ then the extreme angled ray will be incident on the bottom of the exit face 18b as for the case of Ray 3 in FIG. 7. After refracting through the exit face 18b it must possess an angle larger than the riser angle to avoid reentering optical device 10b. This condition is given by:

$$\Theta_{Ray\text{-}out} \geq \Theta_R \quad (22)$$

Combining relationships given in Equations (14)-(18) and using the limiting value for the ray angle in Equation (5) the relationship necessary to define another design parameter for optical device 10b is:

$$\Theta_{Ray\text{-}out}=\arcsin\lfloor R_n*\sin(2*\Theta_R-\Theta_{Ray\text{-}max}+\Theta_{EF})\rfloor - \Theta_{EF} \geq \Theta_R. \quad (23)$$

Equation (23) is the expression for a ray reflected off the riser surface 18a and refracting through the exit face 18b at the bottom of the exit face 18b. If, on the other hand, the riser angle is large enough such that the extreme angle ray ($\Theta_{Ray\text{-}max}$) reflecting off the bottom of the riser surface 18a has a positive angle ($\Theta'_{Ray}>0$) then the point at which the ray is incident on the riser surface 18a is $H_{Ray}>0$ (as for Ray 4 in FIGS. 5 and 10). The height of the ray at the exit face 18b is given by:

$$H_{Ray} \cong L_R*\tan(\Theta'_{Ray}), \quad (24)$$

where the approximation arises since the ray does actually travels the entire distance $L_R$ to the exit face 18b. The ray will travel slightly less than this distance, but the approximation is fairly accurate for reasonably small exit face and riser angles. The condition that the exit ray misses the top of the subsequent riser 18a to avoid reentry into optical device 10b is now given by the expression:

$$L_R*\tan(\Theta_{Ray\text{-}out}) \geq H-H_{Ray}. \quad (25)$$

Figure 13:
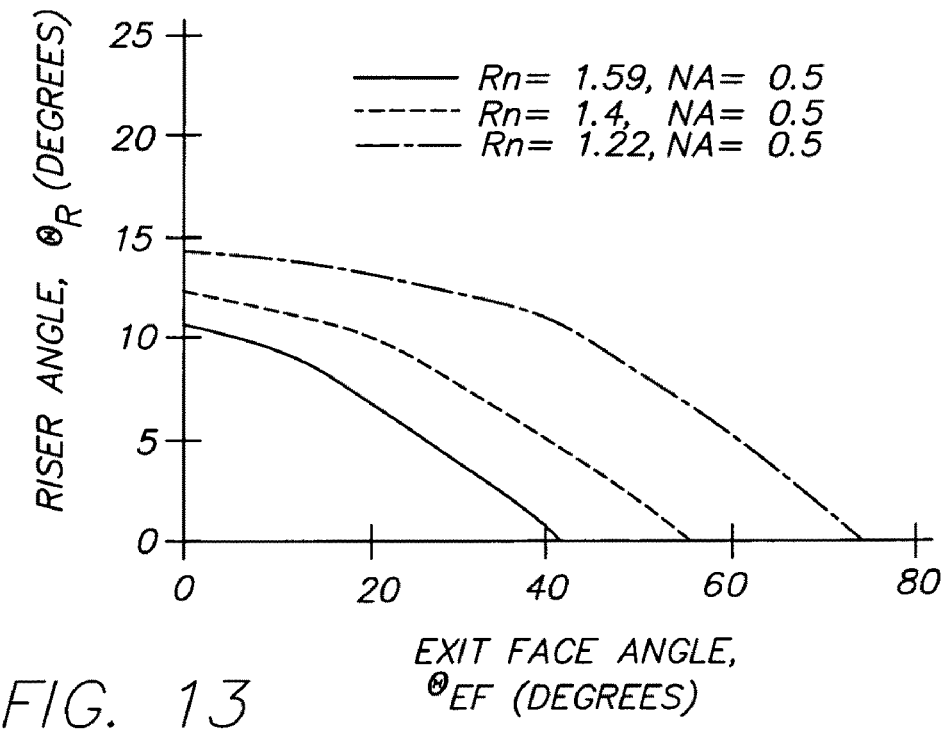
FIG. 13 is a plot showing the minimum exit face and riser (ramp) angle limit derived for the third and fourth limiting rays, Rays 3 and 4, reflective interaction with one of the riser (ramp) surfaces and subsequent refraction through one of the exit faces for the device of FIG. 4 with light inputted into the device having an NA of 0.5 for different values of index ratio $R_n$.

Using the definitions for H and $H_{Ray}$ this last equation can be rewritten as:

$$\tan(\Theta_{Ray\text{-}out}) \geq \tan(\Theta_R)-\tan(\Theta'_{Ray}). \quad (26)$$

Where the definitions in Equations (18) and (23) for $\Theta'_{Ray}$ and $\Theta_{Ray\text{-}out}$, respectively, still apply. Equations (23) and (26) impose a lower bound on the relationship between the riser surface 18a angle and the exit face 18b cut-back angle. To visualize this last design condition necessary for high efficiency output coupling, the boundary condition is plotted in FIGS. 13 and 14 for various parameters of $R_n$ and NA. FIG. 13 shows that as the refractive index ratio is decreased for a fixed numerical aperture, the minimum angle constraint increases, thus decreasing the size of the solution space. FIG. 14 shows, that as the numerical aperture of the input illumination is decreased for a fixed refractive index ratio, the minimum angle constraint also decreases, thus increasing the size of the solution space. This interpretation of this design constraint is that both the exit face 18b and riser 18a angles must be larger than locus of points defined by these curves.

Now the three design rules expressed in Equations (12), (17), (23), and (26) can be assembled together to enable selection of parameters for optical device 10b as desired. FIGS. 15 and 16 show the solution space for selection of such parameters dictated by the three bounding design rules of optical device 10b for the cases of the index ratio $R_n$ equal to 1.59 and 1.4 respectively. The solution space is bounded from the top by Equation (17). The solution space is bounded from the right by the critical angle limit expressed in Equation (12). The solution space is bounded from the bottom by limit rays in the reflective-refractive interaction case expressed in Equations (23) and (26). Solutions for the cases of numerical aperture values of 0.1, 0.3, and 0.5 are the labeled and shaded areas indicated in these figures.

For example, an optical device 10b may be provided in which the refractive index ratio of 1.59 (polycarbonate in air), as shown in FIG. 15, the exit face 18b angle value of 18 degrees and the riser surface 18a angle value of approximately 10 degrees. In another example, an optical device 10b may be provided in which the refractive index ratio of 1.4 (Silicone in air), as depicted in FIG. 16, the exit face 18b angle is ~24 degrees and a riser 18a surface angle of about 10 degrees. The ramp structures 18 defined by these angles repeats along the top surface 14b of the device to provide the optical device, such as shown in FIG. 4.

The dimensions of the exit face 18b and riser surfaces 18a are typically small compared with the total thickness of optical device 10b. They are usually in the range of 1/10 to 1/1000 of the original thickness of the optical device 10b. So for an example of device 10b whose thickness is 5 mm, the exit face 18b height H may be in the range of 0.005 mm to 0.5 mm. The length of the riser 18a is determined by its angle and the riser height H. For the current example this would mean that the length L of the structures 18 is in the range of 0.01 mm to 1 mm in length. These are approximate ranges and operating outside these ranges is possible. For example, larger structures 18 will result in coarser, less smooth, illumination, while smaller structures 18 will produce smoother and more even illumination closer to the surface 14b of the optical device. As the structures 18 are reduced below 0.05 mm in height, the fabrication tolerances may become more severe.

As these examples show the solution space narrows as the refractive index ratio decreases. Increased refractive index ratio and decreased input numerical aperture illumination increases the size of possible parameters for optical device 10b. In these examples, the angle of the light exiting the optical device can be adjusted by tuning these two angles about a significant angular range. The angular range for instance, for the case of NA=0.1 and the index ratio of $R_n$=1.4 as shown in FIG. 16 exit face angles between 5 and 40 degrees may be selected. The large exit face angle acts like a prism to direct the light away from the optical device. This effect is demonstrated in the below discussed FIGS. 35A and 35B, which shows the light distribution adjusted as the exit face angle is changed from 20 degrees to 40 degrees.

While the light is efficiently coupled out of optical device 10b in the desired direction, it is not possible to couple out all of the light without reducing the thickness of the device to zero or having a final exit face 18b at the end 19b (FIG. 4) of the device. The exit face 18b at the end 19b should be approximately the same as the previous exit face angles to provide the same angular spectrum of light emitted from this region. The exit face at end 18b may also be structured to modify the angular spectrum of the rays from such face. As will be described below for optical device 10c of FIG. 17, reducing the thickness of optical device from end 16b to end 19b can be used as an alternative to coupling the remainder of the light out of the end of the optical device.

In another example of optical device 10b, referring to FIG. 15 the center of the solution space for NA=0.5 and $R_n$=1.59 is at the riser angle of $\Theta_R$=10 degrees and an exit face angle of $\Theta_{EF}$=18 degrees. If the angle of the light emission is chosen with respect to the normal to the axis of the optical device then all the light will emit between the exit-face angle and the compliment of the riser surface angles, or between 18 and 80 degrees from the normal to the axis of the optical device. These angles provide illumination in a mostly forward direction along this propagation direction of the injected light.

In a further example, referring to FIG. 16 at NA=0.3 and $R_n$=1.40, one may select a riser angle $\Theta_R$=10 degrees and an exit face angle $\Theta_{EF}$=30 degrees. In this case the riser surface angle is larger than the maximum ray angle so there is no reflection of light from the riser surface and all the light exiting the light guide is directly incident on the exit surface. All the light will emit between the exit-face and the compliment of the riser surface angle, or in this case between 30 and 80 degrees from the normal to the axis of the optical device. Once again the light is emitted in a mostly forward direction as defined by the propagation direction of the injected light.

Referring to FIG. 17, optical device 10c of a third embodiment of the present invention is shown. The optical device 10c has the ramp structure 20 along top surface 14c having riser (ramp) surfaces 20a and exit faces 20b. Ramp structure 20 is similar to the ramp structure 18 of optical device 10b, however unlike optical device 10b, the thickness of the body 12c of the optical device is reduced, and the rate at which light is coupled out of the optical device is controlled. This also alleviates the problem of coupling the remaining light out of the end of the device as can occur in the second embodiment of optical device 10b. By reducing the thickness of the optical device 10c to zero at end 19c, substantially all the light inputted from end 16c can be extracted from exit surfaces 20b of ramp structures 20. FIG. 18 is a cross-sectional view of the front surface structure of optical device 10c. The height of the exit face, $H_{EF}$, is a variable that is no longer directly related to the riser angle $\Theta_R$ by the relationship in Equation (8). Instead, the exit face 20b continues angling downward and backward at the exit face angle $\Theta_{EF}$ to the exit face height $H_{EF}$ expressed as:

$$H_{EF} = \alpha * H, \qquad (27)$$

where the dimensionless scaling parameter alpha ($\alpha$) is introduced and is constrained to:

$$\alpha \geq 1. \qquad (28)$$

With the addition of this thickness reduction, the rate at which the thickness of the optical device 10c is reduced can be expressed as:

$$\text{Effective-taper-angle} = \arctan[(1-\alpha)^*\tan(\Theta_R)]. \quad (29)$$

The quantity $(1-\alpha)$ scaled by the tangent of the riser angle, $\Theta_R$, acts to introduce an effective slope relative to the axis 17c of optical device 10c. Since the Ray 1 interaction depicted in FIG. 6 is identical for this device, the constraint placed on the exit face angle, $\Theta_{EF}$, by Equation (12), derived for the Ray 1 interaction, still applies. The constraints defined for rays Ray 2', Ray 3', and Ray 4' for optical device 10c are determined below in connection with FIGS. 19-22.

FIG. 19 shows the Ray 2' interaction in optical device 10c. The limiting downward refracting ray may be shown as $\Theta_{Ray}$ by:

$$\Theta_{Ray} = \arctan\left[\frac{H - H_{EF}}{L_R}\right], \quad (30)$$

where the Height H is still defined by Equation (1). Using the definitions for H and $H_{EF}$, Equation (22) can be rewritten as:

$$\Theta_{Ray} = \arctan[(1-\alpha)^*\tan(\Theta_R)]. \quad (31)$$

This is the same as the effective taper angle given by Equation (29). Since the Ray 2' is traveling downward, the angle of incidence of the ray is given by:

$$\Theta_{in} = \Theta_{EF} + \Theta_{Ray}. \quad (32)$$

Using the Snell's law and definitions previously defined, the expression for the angle of the ray exiting the device 10c is:

$$\Theta_{Ray\text{-}out} = \arcsin\{R_n^*\sin[\Theta_{EF} + \arctan[(1-\alpha)^*\tan(\Theta_R)]]\} - \Theta_{EF}. \quad (33)$$

This exiting ray must not reenter the optical device 10c so its angle must be greater than the riser angle:

$$\arcsin\{R_n^*\sin[\Theta_{EF} + \arctan((1-\alpha)^*\tan(\Theta_R))]\} - \Theta_{EF} \geq \Theta_R \quad (34)$$

Equation (34) is the criterion for Ray 2' to exit optical device 10c and not reenter through the subsequent riser surface 20a. If $\alpha=1$ then Equation (34) reverts to the expression in Equation (17) for second embodiment optical design 10b. The solutions to this relationship are plotted in FIG. 20. As the parameter $\alpha$ is increased, the upper angular limit moves down, narrowing the solution space. For the case of $\alpha=1.3$, the riser angle must be less than 8 degrees for an exit face angle of 20 degrees. For example, an 8 degree riser angle for $\alpha=1.3$ provides an effective thickness reduction, as described in Equation (29), of about 2.4 degrees.

The design constraint imposed by the extreme reflective-refractive ray interaction on the front-face 20b for optical device 10c will now be described. For this discussion, FIG. 21 shows the Ray 4' interactions. The height of the ray $H_{ray}$ at the exit face 20b is given by the expression:

$$H_{Ray} \approx (H_{EF} - H) + L_R^*\tan(\Theta_{Ray}), \quad (35)$$

where once again this is an approximate relationship. The constraint that the exiting ray must not reenter the optical device 10c can be rephrased as that the ray must achieve the height of the tip of the subsequent riser 20a:

$$L_R^*\tan(\Theta_{Ray\text{-}out}) \geq H - H_{Ray}. \quad (36)$$

Substituting the definitions for H and $H_{Ray}$ this condition may be rewritten as:

$$\tan(\Theta_{Ray\text{-}out}) \geq (2-\alpha)^*\tan(\Theta_R) - \tan(\Theta'_{Ray}). \quad (37)$$

This equation reverts to Equation (26) for $\alpha=1$, or no thickness reduction. This condition applies when the position of the ray at the exit face 20b satisfies the condition:

$$H_{Ray} \geq 0, \quad (38)$$

which means that this is the Ray 4' interaction. This condition can be expressed as a condition on the reflected ray angle $\Theta_{Ray}$:

$$\tan(\Theta'_{Ray}) \geq (1-\alpha)^*\tan(\Theta_R). \quad (39)$$

For the Ray 3' interaction the ray angle is such that it does not satisfy this relation then the output ray angle $\Theta_{Ray\text{-}out}$ will need to satisfy the condition:

$$\Theta_{Ray\text{-}out} \geq \Theta_R. \quad (40)$$

The output ray angle $\Theta_{Ray\text{-}out}$ is once again defined by:

$$\Theta_{Ray\text{-}out} = \arcsin\lfloor R_n^*\sin(2^*\Theta_R - \Theta_{Ray\text{-}max} + \Theta_{EF})\rfloor - \Theta_{EF} \geq \Theta_R \quad (41)$$

The condition in Equation (41) is identical to Equation (23). Equations (37) and (41) together form the lower boundary condition for the solution space for selecting parameter for optical device 10c. This boundary condition is plotted for index ratio $R_n=1.59$, a numerical aperture of 0.5, and various values of $\alpha$ in FIG. 22. The parameter $\alpha$ does not strongly affect this boundary condition.

In FIGS. 23 and 24, the three design constraints for optical device 10c are plotted to show the solution space for several values of the parameter $\alpha$. The solution space can be compared with that from FIGS. 13 and 14 for the same index ratios. The solution space has narrowed due to the thickness reduction. For example, in FIG. 24 there is a narrow solution space for 100% coupling out the exit face for the index ratio of 1.4 and numerical aperture of 0.5 for the parameters chosen.

For example, optical device 10c may be selected to have parameters from FIG. 23 for index ratio, $R_n$, of 1.59, a numerical aperture of 0.5 centered on the riser angle value of 8 degrees, and the exit face angle value of 20 degrees for the case of $\alpha=1.3$ shown. The numerical aperture values of 0.3 and 0.1 are still quite large for this set of parameters. The effective taper angle (defining the thickness reduction) as given by Equation (29) for this example is approximately 2.4 degrees. If the parameters were not varied over the length of the optical device 10c, the thickness could be reduced to zero over a length of approximately 24 times the thickness of the optical device at the input end face 16c or the start of first ramp structure 20 with respect to the input face. For this example, the light will be emitted between angles of 20 degrees to 82 degrees from the normal to the axis 17c (FIG. 18) of the optical device 10c in a forward direction along the propagation direction of the injected light from end 16c.

In another example, optical device 10c may be selected to have parameters from FIG. 24 for index ratio, $R_n$, of 1.4, a numerical aperture of 0.5 centered on the riser angle value of 8 degrees, and the exit face angle value of 24 degrees for the case of $\alpha=1.2$ shown. The numerical aperture values of 0.3 and 0.1 are still quite large for this set of parameters. The effective taper angle as given by Equation (29) for this example is approximately 1.6 degrees. If the parameters were not varied over the length of the optical device 10c, the thickness could be reduced to zero over a length of approximately 36 times the thickness of the optical device 10c at the input end face 16c or the start of first ramp structure 20 with respect to the input face. For this example, all the light will be emitted between angles of 24 degrees to 82 degrees from the normal to the axis 17c in a forward direction along the propagation direction of the injected light from end 16c.

Referring to FIG. 25, optical device 10d of a fourth embodiment of the present invention is shown. Optical device 10d has a body 12d of optical material with ramp structures 22 on its front surface 14d with discrete or gradual reduced thickness along its length from ends 16d to 19d, similar to optical device 10c. Each ramp structure 22 has an riser (or ramp) surface 22a and an front exit face 22 similar to ramp structures 18 and 20 of optical devices 10b and 10c, respectively. Adjacent pairs of ramp structures 22 are separated by a flat surface 24 on front surface 14d parallel to optical axis 17d of the device. The addition of such flat surfaces 24 widens the solution space for all parameter ranges discussed in connection with the optical device 10c. A cross-sectional view of third embodiment optical device 10d shown in FIG. 26.

In addition to the design variables of the exit face angle $\Theta_{EF}$, riser angle $\Theta_R$, and the exit face height $H_{EF}$, parameter S is added, which represents the length of each flat surface 24 feature. The purpose of this flat surface is to act to regulate the rate of out-coupling of light from the optical device 10d, thereby expanding the solution space of parameters, while maintaining the numerical aperture of light not coupled out of the optical device. The parameter S is linked to the length of the riser surface $L_R$ by the definition:

$$S = \beta * L_R, \quad (42)$$

where $\beta$ is a dimensionless scaling parameter constrained by:

$$\beta \geq 0. \quad (43)$$

With the addition of the flat surface 24 the expression for the effective angle of taper of the optical device 10d is:

$$\text{Effective-taper-angle} = \arctan\left[\frac{(1-\alpha)*\tan(\Theta_R)}{(1+\beta)}\right]. \quad (44)$$

Once again, the critical angle condition given in Equation (12) is still valid. The minimum and maximum angle constraints will now be determined. The addition of the flat surface 24 allows more design latitude in adjusting the riser and exit face angles for a given set of parameters, i.e., $R_n$ and NA.

Referring to FIG. 27, the height of the exit facet 22b is still given by Equations (27) and (28). The limiting downward traveling ray (Ray 2″) is incident on the exit face 22b. Its propagation angle, after refracting through the exit face 22b, is still accurately described by expressions in Equation (33). This time the limiting exit angle is less than $\Theta_R$ since the ray needs to travel additional distance to encounter the subsequent riser 22a. The liming angle for the exiting ray angle is now limited by:

$$\Theta_{Ray-out} \geq \arctan\left[\frac{H}{L_R + S}\right]. \quad (45)$$

Substituting expressions for H, $L_R$, and S, Equation (45) can be written as:

$$\Theta_{Ray-out} \geq \arctan\left[\frac{\tan(\Theta_R)}{(1+\beta)}\right] \quad (46)$$

Using the expressions for $\Theta_{Ray-out}$ shown in Equations (33) the upper angular limit design constraint for optical device 10d is:

$$\arcsin\{R_n * \sin[\Theta_{EF} - \arctan((\alpha-1)*\tan(\Theta_R))]\} - \Theta_{EF} \geq \quad (47)$$
$$\arctan\left[\frac{\tan(\Theta_R)}{(1+\beta)}\right].$$

This equation reverts to the expressions in Equation (34) for the condition $\beta=0$. This design constraint is plotted for various parameters in FIG. 28. The figure shows that as the thickness decrease parameter, $\alpha$, is increased, the maximum angle constraint decreases, tightening the design space. However, the flat surface 24 loosens the angle constraint significantly for values of $\alpha=1.5$ as $\beta$ is increased from 0 to 2.

Referring to FIG. 29, the constraint imposed by the limiting rays subjected to both reflection and refraction for optical device 10d will now be described. First consider the case for the reflected ray angle satisfying the expression in Equation (37) for the Ray 4″ interaction. In order to avoid reentry into optical device 10d through the top of the subsequent riser 22a the angle of the exiting ray is limited by the expression:

$$\Theta_{Ray-out} \geq \arctan\left[\frac{H - H_{Ray}}{L_R + S}\right], \quad (48)$$

which after substituting values for the various parameters becomes:

$$\Theta_{Ray-out} \geq \arctan\left[\frac{(2-\alpha)*\tan(\Theta_R) - \tan(2\Theta_R - \Theta_{Ray-max})}{1+\beta}\right]. \quad (49)$$

Conversely, when the ray angle is less than the limit defined in Equation (36) the ray interaction is similar to the Ray 3 interaction shown in FIG. 5 and the boundary condition becomes:

$$\Theta_{Ray-out} \geq \arctan\left[\frac{H}{L_R + S}\right], \quad (50)$$

Which can be rewritten as:

$$\Theta_{Ray-out} \geq \arctan\left[\frac{\tan(\Theta_R)}{1+\beta}\right]. \quad (51)$$

Equations (49) and (51) represent the lower angle limit for the solution space for optical device 10d with thickness reduction and flat surface features. This lower angle limit is plotted in FIG. 30. The minimum angle can be substantially decreased by increasing the size of the flat surfaces 24, which is the same as increasing the parameter $\beta$.

FIG. 31 shows a plot of all three design constraints for optical device 10d for parameter values $\alpha=1.5$, $\beta=1.0$, $R_n=1.59$, and numerical aperture values of 0.5, 0.3, 0.1. For example, the parameters for optical device 10d may be selected for the index ratio $R_n=1.59$, which lies at the riser angle of about 8 degrees, and the exit face angle of about 18 degrees. Referring to Equation (44), the effective taper angle for this example is about 2 degrees. If the parameters were not varied over the length of the optical device 10*d*, the length of the optical device would be about 29 times the initial thickness in order to reduce the thickness to zero. For this example, all the light injected from end face 16*d* is emitted between angles of 18 degrees and 82 degrees from the front surface 14*d* with respect to the normal of the axis 17*d* (FIG. 26) of the device in a forward direction with respect to the direction of propagation of the injected light.

FIG. 32 shows another plot of all three design constraints for optical device 10*d* for parameter values α=1.5, β=1.0, $R_n$=1.40, and numerical aperture values of 0.5, 0.3, 0.1. In another example, the parameters for optical device 10*d* may be selected for a NA of 0.5 for a riser angle of at about 8 degrees and the exit face angle of about 24 degrees. The effective taper angle for this example is about 2 degrees. The light distribution for this example will be between 24 degrees and 82 degrees with respect to the normal of axis 17*d*.

The light distribution from the front-side acutely angle ramp structures of optical devices 10*b*, 10*c*, and 10*d* will now be described in more detail. All three devices 10*b*, 10*c*, and 10*d* are capable of two limiting cases of light distributions. The first case can produce wide angle illumination that is distributed between the angles defined by the exit surface and riser planes along a plane containing both the normal to the exit face and riser surfaces. The second case produces narrower distributions that can be steered by adjusting the exit face angle. The first case is relevant for numerical aperture values approaching 0.3 and higher. The second case is valid for lower values of the numerical aperture typically below 0.3. In both cases the light is distributed along the width of the optical device 10*b*, 10 *c*, and 10*d* in a manner identical to the original source distribution, unless the width of the optical device is modified such as described later below in connection with FIGS. 41-45 by providing source collimation.

For the case of large angle distributions, the condition for this first light distribution example to be successful is that the angles of the ramp structures 18, 20, 22 of optics device 10*b*, 10*c*, and 10*d*, respectively, are selected such that the riser angle is approximately half of the maximum ray angle, $\Theta_{Ray\text{-}max}$, and the exit face angle, $\Theta_{EF}$, is at or near the maximum angle as defined by the critical angle limit for the appropriate numerical aperture of the light. For example, in the case of optical device 10*d* of FIG. 25, the parameters meeting the requirements is near the riser angle value of about 8 degrees and the exit face angle of about 18 degrees. The light distribution for this example is illustrated in FIG. 34A and plotted in FIG. 34B. The horizontal axis is the direction of the light with respect to the normal of the optical device axis. An illumination angle of zero degrees thus is perpendicular to the optical device surface, and an illumination angle of 90 degrees thus is directly parallel to the optical device axis. The plot of FIG. 34B shows that the light is distributed over a range of angles between the exit face angle (18 degrees) and the compliment of the riser surface angle (82 degrees). Most of the light falls between 60 and 80 degrees from the surface normal. Similar examples exist for other acute angle optical devices 10*b* and 10*c* for several values of the numerical aperture and the refractive index ratio, $R_n$.

When the numerical aperture of the light is small and therefore the distribution of angles inside the optical device's body is small, it is possible to adjust the angles of the riser and exit face surfaces to control the distribution of the light exiting the light-guide. In FIGS. 35A and 35B is plotted the light distribution for the case of small numerical aperture NA=0.1, index ratio $R_n$ of 1.4, and a riser surface angle of 2 degrees. For this value of riser surface and NA the light exits directly through the exit face angle as well as reflects off the riser surface and then exits through the exit face surface. In FIG. 35A the exit face angle is 20 degrees and most of the light is distributed in the vicinity of about an 80 degree angle with respect to the optical device normal. For FIG. 35B the exit face angle is 40 degrees and now the illumination is centered about 65 degree angle with respect to the optical device normal. Other acute angle optical devices 10*c* and 10*d* utilizing such NA and $R_n$ may similarly have such light distribution of FIGS. 35A and 35B.

For the case of narrower distributions, the numerical aperture of the light injected in optical devices 10*b*, 10*c* and 10*d* is small enough to allow a riser face angle to exceed the maximum angle of the light in the light guide, $\Theta_{Ray\text{-}max}$, as defined by the curves in FIG. 33. A riser angle is selected larger than the limiting ray angle $\Theta_{Ray\text{-}max}$. This ensures that no rays will reflect off the riser surface but instead be directly incident on the exit face. In this case the light distribution will be smaller than the angles between the exit face and riser surfaces, and the distribution can be steered along the plane containing the surface normal to both exit face and riser surfaces. The steering is accomplished by adjusting the exit face angle, $\Theta_{EF}$, between values bounded by the angles lying on the curves in FIG. 33 and the maximum angle constraint for the given design embodiment. For example, in the case of optical device 10*b* of FIG. 10, at an NA=0.1 the maximum ray angle, $\Theta_{Ray\text{-}max}$ is about 4 degrees, as seen in FIG. 33 for the index ratio $R_n$=1.4. So the riser angle $\Theta_R$ must be at least 4 degrees. Referring to FIG. 16, the exit face angle must be between 10 degrees and 41 degrees. In FIG. 36, a plot of the light distribution for several values of the exit face angle, $\Theta_{EF}$ is provided. The plot shows the normalized intensity distribution of the light emitted from the optical device 10*b* of this example for the several parameters. Remember that this solution only allows light to exist at angles bound by the complement of the riser angle of 4 degrees or at an illumination angle of 86 degrees. Also, FIG. 36 shows that as the exit face angle is increased the light distribution is steered toward the normal, i.e., 90 degree, of the optical device axis while remaining relatively narrow. Similar examples exist for other acute angle optical devices 10*c* and 10*d* for several values of the numerical aperture and the refractive index ratios.

Optionally, the front exit surfaces 11*a*, 18*b*, 20*b*, or 22*b* of optical devices 10*a*, 10*b*, 10*c*, and 10*d*, respectively, may be curved surfaces in cross-section along their arcuate angled elevation along their respective top surfaces 14*a*, 14*b*, 14*c*, and 14*d*. For example, FIG. 37 shows a partial cross-section of the optical device 10*b* in which front exit surfaces 18*b* are concave, rather than straight as shown in FIG. 5. The curvature of the front exit surfaces influences the angle of the emitted radiation along the thickness of the device, as shown by light rays 1''' and 2''' incident on the curved exit face 18*b* of FIG. 37, compared to their counterpart light Rays 1 and 2 when incident straight on exit face 18*b* of FIGS. 6, 8, and 10. The ramp structure 18 has a riser 18*a* angle large enough to avoid reflection. The curved front exit face 18*b* changes the distribution of the light from the top surface 14*b* of the device 10*b* so as to provide directed, reduced numerical aperture illumination. The front exit faces 11*a*, 20*b* and 22*b* of optical devices 10*a*, 10*c*, and 10*d*, respectively, may be similarly curved surfaces, or the front exit faces 11*a*, 18*b*, 20*b*, or 22*b* may have other shapes to provide a desired light distribution for their respective devices 10*a*, 10*b*, 10*c* and 10*d*.

Optionally, the front exit surfaces 11*a*, 18*b*, 20*b*, or 22*b* of optical devices 10*a*, 10*b*, 10*c*, and 10*d*, respectively, may follow an arcuate path along the width of the devices to effect the distribution of the light from their respective top surfaces 14a, 14b, 14c, and 14d. For example, FIG. 38 shows optical device 10b of FIG. 4 in which the forward edge of each riser (ramp) surface 18a and each front exit faces 18b are curved along the width of the device, rather than being straight as show in FIG. 4. The front exit surfaces 11a, 20b, and 22b of optical devices 10a, 10c and 10d, respectively, may be similarly curved surfaces, or the front exit surfaces 11a, 18b, 20b, or 22b may have other shapes along the width of the device to provide a desired light distribution for their respective devices 10a, 10b, 10c and 10d. Also, the front exit surfaces 11a, 18b, 20b, or 22b may both be shaped along the width of device (e.g., FIG. 38) and shaped in cross-section along their acute angled elevation (e.g., FIG. 37) along their respective top surfaces.

Although the optical devices 10b, 10c, and 10d described above are shown where their optical axis is generally aligned with a plane parallel with their respective back surface, the body of the optical devices may be curved about an axis perpendicular to the axis of the device, as shown in FIG. 39, or curved about an axis parallel to the axis of the device, as shown in FIG. 40, or completely bent about an axis parallel to the axis of the device to form a cylinder, as shown in FIG. 41. Although FIGS. 39-41 are shown for optical device 10b, optical devices 10c and 10d may form similar shapes. Further, optical devices 10b, 10 c and 10d may form other shapes, or combinations thereof, not limited to those shown in these figures as needed for a particular illumination application.

The plots of FIGS. 15, 16, 23, 24, 31, and 32 for respective optical devices 10b, 10c, and 10d show that for efficient output coupling when the numerical aperture is increased much beyond the value of 0.5, selection of parameters becomes small or disappears altogether for smaller values of the refractive index ratio, $R_n$. Often it is desirable to either have a higher refractive index ratio, $R_n$, than the case of 1.59 for polycarbonate in air, or to modify the source numerical aperture to allow some flexibility in the optical design.

Referring to FIGS. 42-45, the body of optical devices 10b, 10c, or 10d may have a shaped input portion 28a-c between their end face for inputting light and their first acutely angled ramp structure, so as to decrease the numerical aperture of the light in the optical device for the purpose of obtaining efficient output coupling solutions, or widening the optical device parameters that can be selected for a given source numerical aperture. This results because increasing the dimension of the optical device reduces the numerical aperture of the light in the optical device, as evident from the expression in Equation (1). For example, light may be coupled in to support numerical apertures up to NA=1 into an optical device whose index ratio, $R_n$, is at least 1.4, as shown in FIG. 3. Once the high NA light rays are coupled into the optical device the optical device can be shaped to reduce the numerical aperture of the guided light rays. The numerical aperture reduction of the light is in the direction perpendicular to the front and back surfaces of the optical device.

For example, FIGS. 42 and 43 show optical device 10d with the thickness of input portion 28a increasing from the end 16d to the start of the first ramp structure 22 along the entrance face of the optical device. FIG. 42 shows a long entrance end face 16d such as for coupling light from a line-source, such as a linear array of LEDs. The thickness of the optical device is shown increasing in a parabolic trajectory to provide rapid collimation of the light. FIG. 43 shows a more compact end face 16d, such as for coupling light from a small light source, in which the thickness is once again increased to provide collimation of the light in the optical device. Once the thickness of the device is increased appropriately, the ramp structures 22 efficiently couple the light out of the optical device. Reducing the thickness of the optical device 10d to at or near zero provides efficient distribution of all the light as desired. The thickness of the optical device at input portion 28a should increase until the desired numerical aperture is achieved. Although FIGS. 42 and 43 show optical device 10d, other optical devices 10b and 10c may similarly have shaped input portions to provide desired collimation.

In FIGS. 44 and 45, an input portion 28b and 28c, respectively, are shaped to decrease the numerical aperture of the optical device 10b in the width direction so as to emit light of reduced numerical aperture in this direction. FIG. 44 shows input portion 28b having a parabolic taper, and FIG. 45 shows input portion 28c having a linear taper, between end 16b and the first ramp structure 18 in the width dimension in order to increase the optical device width and decrease the NA of the radiation within the optical device and emitted from the optical device along this width dimension. This can be used to create a wider luminaire from a single small source for the purpose of delivering more collimated light from a larger area to either tailor the distribution of the illumination or reduce the intensity at the face of the optical device. Although FIGS. 44 and 45 show optical device 10b, other optical devices 10c and 10d may similarly have shaped input portions to provide desired collimation. Also, although the body of the optical devices shown in FIGS. 42-45 are shaped to provide their respective input portions 28a-c, optionally an optical element may be provided instead of, or in combination with, such input portions to provide and/or enhance the sizing and/or tailoring of illumination to the optical devices.

Referring to FIG. 46A, optical device 10e of a fifth embodiment of the present invention is shown having a structured backside surface that emits light from its top surface. Optical device 10e has a body 30 of optical material with ramp structures 32 and rising structures 36 that alternate with each other along the bottom surface 34 of the device. The ramp structures 32 and falling structures 36 extend along a dimension representing the axis 37 of the device, which is substantially parallel to the top surface 33 of the device, as best shown in FIG. 48. Each ramp structure 32 has a rising surface (or riser) 32a at an acute angle with respect to axis 37. Each falling structure has a falling surface at an acute angle with respect to the normal 37a of axis 37, and then a surface 36b substantially parallel to the top surface. The device's body gradually reduces in thickness as the ramp structures 32 alternate with the falling structures 36 extend along the device from end 38 to end 39. As will be shown by the theoretical discussion below, light when received from end of 38 is totally internally reflected within the body 30 until distributed by reflection from one of the ramp structures to exit from the device's top surface or transmitted through one of the ramp structures back into the body via an adjacent one of the falling structures.

For purposes of illustration, consider the general optical element 41 with two flat surfaces 41a and 41b of FIG. 46B. Light is injected at end 41c, and the light emitted into an angular space henceforth defined with respect to the axis 40 and is characterized by the numerical aperture (NA) of the optical material of optical element 41 defined by the expression $$NA = n \sin \theta_{max}, \quad (52)$$

where n is the refractive index of the surrounding medium in which the light propagates, and $\theta_{max}$ is the maximum angle of the light with respect to an arbitrary axis, in this case axis 40. The light enters from a source, and if the angle $\theta_{max}$ is small enough the light will not exceed the critical angle of the optical device material and will remain confined to the optical device through total internal reflections until it encounters a structure or feature that alters its propagation angle and is ejected or emitted from the light guide. Light (indicated by arrows 42) from a source strikes the entrance surface 41c of the optical element 41 at an angle θ' in air with respect to the surface normal and axis 40. The ray is refracted at surface 41c according to Snell's law, n sin θ=sin θ', and propagates in the optical element 14 at an angle θ. Eventually it strikes the top surface 41a at an angle β with respect to the local normal. If β is larger than the critical angle defined by, $$\beta_c = \arcsin\left(\frac{1}{n}\right), \quad (53)$$

then the ray experiences total internal reflection (TIR) and no light is transmitted through the surface. This is the basic principle of a light guide. The conditions on θ and θ' for TIR are $$|\theta| \le 90° - \arcsin\left(\frac{1}{n}\right), \quad (54)$$

$$|\theta'| \le \arcsin\left\{n\sin\left[90° - \arcsin\left(\frac{1}{n}\right)\right]\right\}.$$

Note that for n greater than $\sqrt{2}$ all rays at angles up to 90° will enter optical element 41 and be totally internally reflected.

In the optical device 10e of FIG. 46A, the ramp structures 32 alter the propagation angles of the light causing it to be emitted from the front surface 33 into a defined angular space. FIG. 47 shows an example of an application of optical device 10e where light from a source 44 is injected into the optical device 10e from end 38 with the top surface 33 emitting the light (indicated by arrows 46). The ramp structures 32 along the back or bottom surface 34 redirect the light inside the optical device 10e for emission out the top surface 33. Although device 10e is illustrated as a planar substrate, the device may be curved or bent similar to that described earlier for optical devices 10b-e.

FIG. 48 show a partial cross-section showing the structured back surface 34 of FIG. 46A in more detail. As stated earlier, the structure consists of a repeating ramp structure 32 followed by a falling structure 36. The falling structure 36 has a falling surface (or step-down ramp) 36a representing a prismatic structure or structured surface, and a flat area or surface 36b. The multiple number of times ramp and falling structures repeat is determined by the size of the optical device 10e and the area over which light is to be emitted.

Referring to the angles described in FIG. 48, first consider the rays 47a that strike a single riser 32a. A ray propagates at an angle θ with respect to the axis 37. In the figure all angles are shown as positive except θ. It strikes the riser 32a at an angle β with respect to the riser normal. If β is larger than the critical angle then the ray experiences TIR and is reflected upward toward top surface 33 of the device. The ray emerges from the top surface 33 at an angle $\theta_{out}$. The relationship between these angles and the riser angle, $\theta_r$, is β=90°−θ_r+θ, θ'_{out}=β−θ_r=90°−2θ_r+θ, sin(θ_{out})=n sin(θ'_{out})=n sin(90°−2θ_r+θ)  (55)

A positive value for $\theta_{out}$ indicates a clockwise angle relative to the surface normal.

For example, suppose the optical material of optical device 10e has a refractive index n=1.5 and a light source with a numerical aperture in air of 0.5 or 30°. In the device the maximum angular spread will be $\theta_{max}$=19.47° with respect to device's axis. The range of output angles as a function of the riser angle by plotting Equation (55) can be determined for specific values of θ, namely $\theta_{max}$, 0, and −$\theta_{max}$. In FIG. 49, a plot is shown of the results from this example. For any given riser angle, there is a range of output angles determined by the vertical separation between the curves for θ=$\theta_{max}$ and −$\theta_{max}$. For a riser angle of 40°, for example, the output angles range from −14.3° for −$\theta_{max}$ to 47.6° for $\theta_{max}$ as indicated by the vertical dashed line. Increasing the index of refraction brings the θ curves more vertical and closer together and increases the output angle range. In FIG. 49, for example, a riser angle of 40° provides output angles of −14 to 48 degrees.

If the riser angle is 45° then the θ=0 ray is reflected straight up and emerges from the output face normal to the surface and the other output angles of the reflected rays are symmetric about 0° emerging with the same NA as the input light.

If the ramp angle is chosen shallow such that the output angle $\theta'_{out}$ is larger than the critical angle at the top surface, then some of the rays, starting with the θ=$\theta_{max}$ curve, will experience TIR at the top surface and continue to propagate down the optical device but at angles larger than $\theta_{max}$ thus increasing the numerical aperture of the light within the optical device. This is an undesirable situation since it may result in significant losses out the backside of the optical device. In the example of FIG. 49 the minimum riser angle occurs at 33.8°, the point at which the output angle is 90° for the curve θ=$\theta_{max}$. Therefore it is desired to choose a riser angle large enough so that all the rays reflecting off the riser will exit the front surface.

In most cases not all the rays will experience TIR upon striking the riser. If β in FIG. 48 is smaller than the critical angle given in Equation (53) then the ray is split into a reflected ray and a transmitted ray. The reflected ray behaves as described above, emerging from the top surface. The transmitted ray is refracted out the rising surface 32a and continues propagating out the back surface 34. Both the riser angle and the ray angle determine when this condition occurs and is shown graphically in the example of FIG. 49 by the area below the dashed curve. This can be avoided if the back surface 34 is mirrored, then all rays, regardless of angle, will be reflected toward the output surface 33. Mirroring the back surface may not be feasible in all applications, however, thus it would be instructive to consider the design criteria needed to capture this light and redirect it toward the output surface 33, particularly since the transmitted rays carry most of the energy.

The extreme condition for the rays transmitted through the riser 32a occurs with the ray at θ=−$\theta_{max}$ striking the base of the riser. This is shown in FIG. 50. The refracted ray 47b emerges at an angle $\theta_{trans}$ with respect to axis 37 to intercept the prismatic surface 36a of the falling structure 32. The height h and position Δx at which it strikes the falling surface 36a determines the tapering factor of the optical device 10e, which provides the device's gradual thickness reduction. These parameters are related by the expression $$\tan(\theta_{trans}) = \frac{h}{\Delta x}. \quad (56)$$

If $\theta_{trans}$ is positive for the extreme ray angle, θ=−$\theta_{max}$, then the tapering height h will be positive and the thickness of the optical device 10e can be reduced along the length of the emission area by simply duplicating the first ramp structure 32 and falling structure 36 along the length of the optical device. If $\theta_{trans}$ is negative, then the prism structure of falling surface 36a must extend beyond the plane of the back surface in order to capture this ray. Tapering can still be achieved by increasing the length of the second and subsequent ramp structure 32. An example of this will be shown later in connection with FIG. 58. From FIG. 50 the riser incident angle $\beta$ for any given ray angle $\theta$ is given by $$\beta = 90° - \theta_r + \theta. \tag{57}$$

The transmitted angle, $\theta_{trans}$, is given by $$\theta_{trans} = \beta' - (\beta - \theta), \tag{58}$$

where the angle $\beta'$ is related to $\beta$ by Snell's law: $\sin \beta' = n \sin \beta$. Thus the relationship between the refracted ray angle and the riser and incident ray angles is $$\theta_{trans} = \arcsin[n \sin(90° - \theta_r + \theta)] - 90° + \theta_r. \tag{59}$$

This expression is plotted for the previous example in FIG. 51 for the same three values of $\theta$, namely $\theta_{max}$, 0, and $-\theta_{max}$. The maximum value of $\theta_{trans}$ is the riser angle $\theta_r$, the dashed line in the figure, which occurs at the critical angle of the riser 32a. In this example for riser angles less than 28.7° all the rays will experience TIR at the riser, however, as shown in FIG. 49 such riser angles will lead to TIR at the top surface for some of these reflected rays—a situation we want to avoid in order to maintain the NA of the light within the optical device 10e. A compromise must be reached and some rays must be permitted to pass through the riser surface 32a. The riser angle may be selected to impart the appropriate reflection angle to the TIR rays from the riser 32a so that they exit the top surface 33 while refracting the other rays with a transmission angle so that they may be captured by the prismatic structure of falling surface 36a and recycled back into the optical device 10e.

Now turning to the prismatic structure of the falling (or down-sloping) structure 36 adjacent to ramp structure 32, its purpose is to capture the rays that pass through the riser 32a and to refract them back into the optical device 10e at an angle between $\pm\theta_{max}$. This can be a positively or negatively sloped surface depending on the angle space of the rays striking it and the angle space desired for propagating the captured refracted rays. The angle, $\theta_{ref}$, at which these rays reenter the optical device is determined with the aid of FIG. 52 which shows the prismatic structure of falling surface 36a in more detail. The entrance face of falling surface 36a forms an angle $\alpha$ with respect to the vertical, and the transmitted ray 47c forms an angle $\beta$ with respect to the surface normal. This ray refracts at an angle $\beta'$ with respect to the normal as it reenters the optical device 10e forming an angle $\theta_{ref}$ with respect to device axis 37. The relationship between these angles is given by $$\sin(\beta) = n \sin(\beta'),$$

$$\beta = \alpha + \theta_{trans},$$

$$\beta' = \alpha + \theta_{ref}. \tag{60}$$

Note that all angles in the figure are shown with a positive orientation. Solving for $\theta_{ref}$ in terms of $\alpha$ and $\theta_{trans}$ yields $$\theta_{ref} = \arcsin\left[\frac{1}{n}\sin(\theta_{trans} + \alpha)\right] - \alpha. \tag{61}$$

In FIG. 53 the result of this equation are plotted for $\alpha$ equal to zero, greater than zero, and less than zero, and for n=1.5.

The riser separation L of the risers, the riser length $\Delta x$, and the number of risers 32a determine the length of the emission area from top surface 33. In FIG. 54A-C, three possibilities for L are shown based on where the one extreme ray $\theta = -\theta_{max}$ that just misses the first riser 32a strikes the next surface of the light guide. In FIG. 54A this extreme ray 47d strikes the second riser 32a at a location up from the riser base. The subsequent transmitted ray will strike the next prismatic falling surface 36a at a higher location $h_2$ than for the first riser 32a. Alternatively, if h is to remain the same then the length $\Delta x_2$ could be shortened. In this case L may go to zero, then each riser 32a begins at the base of the previous prismatic falling surface 36a.

In FIG. 54B a special case is shown in which the extreme ray 47e that misses the first riser 32a hits the base of the second riser 32a. The NA of the light in the optical device, the riser angle, the prism angle, the riser length, $\Delta x$, and the taper height, h, all determine the value of L.

FIG. 54C shows the case where L is any value larger than that in FIG. 54B. In this case some of the extreme rays 47f strike the flat surface 36b parallel to axis 37. These rays 47f and all the rays that hit this surface 36b experience TIR and propagate down the optical device. In this way the length of the emission area from top surface 33 can be extended. This has the advantage that each point of the riser 32a is illuminated by the full internal NA of the light. If the length L becomes large relative to the other parameters of the optical device 10e, then the spatial distribution of the emitted light at the top surface 33 may become non-uniform, exhibiting banding effects. This will be problematic for applications such as displays where the user is looking directly at the output surface 33. But for applications such as general-purpose lighting, this will not be a problem and may be desirable in order to extend the length of the emission area.

In some cases when the transmitted ray, $\theta_{trans}$, is negative the ability to taper the optical device may be limited with the optical designs 10e shown in FIG. 54A-C.

Referring to FIG. 55A, an optical device 10f of a sixth embodiment of the present invention is shown, which is similar to device 10e but with alternative falling structures, and as such like reference numbers reference like elements of device 10e and 10f. In device 10f each falling structure 36 has a riser surface 36c between falling surface 36a and flat surface 36a. The riser surface 36c is at an angle $\gamma$ with respect to axis 37. This riser 36c redirects some of the transmitted rays, still keeping them within the original NA of the light, and provides a means to reduce the thickness of the optical device 10f by allowing the flat surface 36b to be placed at the point where it would intercept the first extreme ray 47g that just misses the highest point of the riser 32a. The height of this flat surface 36b relative to the original plane of the backside of the optical device 10f can now be variable. This is now greater flexibility to vary the length L between riser 32a and falling surface 36a along the length of the optical device 10f.

In FIG. 55B, an extreme ray 47h is traced at $\theta = -\theta_{max}$. It passes through the first riser 32a at an angle $\theta_{trans}$ until it hits the prismatic falling surface 36a at which points it reenters the optical device at an angle $\theta_{ref}$. The ray propagates to the riser 36c where it is totally internally reflected to an angle $\theta_{refl}$ and continues propagating down the optical device. In terms of the refraction angle $\theta_{ref}$ and the riser angle, $\gamma$, of riser 36c, the reflected angle is given by $$\theta_{refl} = 2\gamma - \theta_{ref}. \tag{63}$$

This angle is required to be less than the maximum angle of the light in the optical device 10f, namely $\theta_{max}$. Once γ has been set then the maximum values for the taper height h and the length δ of the riser 36c are determined by the intersection of the extreme ray with the riser 36c as shown in the figure.

The requirement that $\theta_{refl}$ be less than $\theta_{max}$ may be relaxed provided that all the rays reflecting off the riser 36c strike the surface of the next riser 32a before hitting the top surface 33 of optical device 10f. At the top surface 33 they must be less than the critical angle so that they can be ejected and not totally internally reflected.

One example of optical device 10e of FIG. 46A will now be described, in which the ramp structures 32 and falling structures 36 are as shown in FIG. 54A, in which the falling prismatic face 36a is large enough to capture the rays transmitted through riser 32a, and a flat surface 36b is present between each pair of risers 32a. In this example, the light inputted in optical device has an numerical aperture in air of 0.5 and is of material with a refractive index of 1.5. Within the optical device, the angles of the light range from −19.74° to +19.74° with respect to the length of the optical device. The output from the top surface 33 is desired to be symmetric in this example about the surface normal, as depicted in FIGS. 47 and 48. Since the desired output light distribution is symmetric a riser angle of 45° is selected making the output angle range ±30° of light exiting from top surface 33. Such a riser angle will lead to rays transmitted through the riser 32a at negative angles, i.e., angles below axis 37, as demonstrated in the graph of FIG. 51.

The rays at the falling prismatic surface 36a need to be captured and refracted back into the optical device. In FIG. 56A, optical device 10e in accordance with this example is shown, in which FIG. 56B shows a detailed cross-section of the first three ramp structures 32 and alternating falling structures 36. The effect on the light by structures 32 and 36 is shown by the illustrated light rays. At the first riser 32a two transmitted rays 48a and 48b are considered: one ray 48a originating from the extreme ray $\theta=-\theta_{max}$, and the other ray 48b striking the riser 32a at just under the critical angle and generating a transmitted ray at the riser angle $\theta_r$. These will determine the range of angles for the falling prismatic surface 36a. The extreme ray is transmitted through the 45° riser with an angle −4.7°. To capture this ray 48b the falling prismatic surface 36a extends to provide back surface 34a, which is below the level of original back surface 34. A prism angle of α=−9.3° refracts this ray 38b to θ=0° inside the optical device. However, the second ray 48a must also be considered. Solving Equation (61) for the falling prismatic surface angle α when $\theta_{trans}=\theta_r$ and $\theta_{ref}=\theta_{max}$ yields an angle α=16.3°. At this angle the original $\theta=-\theta_{max}$ ray 48b reenters the prism structure at an angle of −8.6°, well within the original NA of the light. For this example, the riser angle $\theta_r$ and falling prismatic surface angle α are constant over the entire length of the optical device. In other example of optical device 10e, riser and prism angles may be varied as desired for the particular illumination application.

The separation L to the next riser 32a is determined by several factors. In order to taper the base of the next falling structure 36 must be higher than the back surface 34. This requires that the lowest extreme ray 48c hit the second riser 32a at a location above the base of the riser 32a as shown by the variable h in FIG. 56B. The smaller the separation L is, the higher the strike location will be. If the height H of the second and subsequent risers 32a is equal to the height h then all the risers and spacings will be identical. If H is larger than h then the distance L will increase along the length of the optical device 10e. The risers 32a will increase in size and be spaced farther apart, as shown for example in the optical device 10e shown in FIG. 58.

The output light distribution in the example of FIG. 56 is shown in FIG. 57 for the case when H=h and the spacing between risers 32a is uniform along the entire length of the light guide. The graph of FIG. 57 shows the relative light distribution along the axis of the optical device in a plane next to the output top surface 33. The position x=0 marks the start of the backside surface structures 32 and 36. The light distribution is at a maximum at this position and gradually decreases down the length of the optical device. The uniformity of the light distribution can be improved by decreasing the riser spacing L as one moves down the device thus increasing the number of risers per unit length as more and more light is extracted, or by making H larger than h thereby increasing the surface area of the risers as one moves down the light guide, as shown for example in FIG. 58.

An example of optical device 10f will now be described which utilizes the additional rising surface 36c of FIGS. 55A-55B. FIG. 59A shows optical device 10f in accordance with this example, in which FIG. 59B shows a detailed cross-section of the first three ramp structures 32 and alternating falling structures 36 there between. All ramp and falling structures are identical and the space in between is constant. The output light distribution of this example is shown in FIG. 60. The graph shows the light distribution along the length of the optical device over the output top surface 33. This example shows better uniformity than the previous example and can be improved by a variation of the separation, L, of the risers 32a. The graph of FIG. 61 shows the light distribution results in which the separation L is reduced from a maximum value at the first riser 32a to a value of zero at the last riser 32a in a linear fashion. The other parameters of the example, namely the riser angle, riser length and secondary riser angle remain the same. This reduction in the separation between the risers 32a leads to a significant improvement in the light distribution uniformity. The output distributions shown in FIG. 61, as well as FIGS. 34A, 34B, 35A, 35B, 57 and 60, were simulated using optical modeling computer software, such as ASAP sold by Breault Research, Inc. of Tucson, Ariz.

In many applications it is desirable to increase the angular spread of the output light distribution beyond that which would normally be available from a particular light source and using a single riser angle. FIG. 49 shows that for a given light source numerical aperture and light guide refractive index, the range of output angles is limited by the riser angle as given by the expression in Equation (55). One can increase the output angular range by incorporating multiple riser angles, either individually by changing the angle of one riser in relation to its neighbors, or by segmenting each riser and giving each segment a slightly different angle.

Such segmenting of each riser surface 32a is shown in FIG. 62, in which riser 32a is divided into three segments 49a, 49b, 49c with progressively steeper and discrete angles. The design criteria establishing the relationships between the riser angle, output angle, prism face angle, and secondary riser angle now apply to each segment of each riser. The first segment 49a of the riser is the shallowest angle so that any transmitted rays emerging from this segment will have the largest positive slope angle and will be captured more easily by the falling prismatic surface 36a. This surface 36a therefore will not have to extend below the plane of the back surface as was the case for the first falling structure 36 of the example of FIG. 58.

Broadening the output angles can also be achieved by a continuous variation of the riser slope as shown in FIG. 63.

Instead of segmented risers with discrete slopes the risers 32a now become continuous curves 49d, the range of slopes determined by the desired range in the output angles of the out-coupled light.

Optionally, the bottom surface 34 (including structures 32 and 36) of optical devices 10e or 10f may have layer or coating of reflective material, such as a dielectric or metal. For example, the reflective material may be applied using a conventional metalization process, such as used in manufacture of mirrors or semiconductors. In using such reflective material, total internal reflection along the bottom surface 34 is no longer the design contrast as all light will be reflected, and thus the angle of the falling structures are not critical in the design of the optical device.

Referring to FIGS. 64A-C, an example of an optical device 10g in accordance with a seventh embodiment of the present invention is shown, which has a single body of optical material with top-side structures, denoted generally by reference numeral 50, of optical devices 10b-d, and bottom-side structures, denoted generally by reference numeral 51, of optical device 10e-f. Device 10g has a body 52 having a first body portion 52a with top-side structure 50 along top surface 53a, and a second body portion 53b with bottom-side structure 51 along bottom surface 53b. When inputted along end 54 light that is not distributed by the structures 50 of the first portion 52a is received by the second body portion 52b and then distributed by structures 51. Light 54 distributed from the first body portion 52a and light distributed from the second portion 52b body provide combined illumination 56 from the top surface 53a of device 10g. Although only two body portions 52a and 52b are shown, device 10g may have any number of successive portions from a input end for inputting light along the length of the device, in which at least one of said portions has a plurality of structures 51, and at least one other of the portions has a plurality of structures 52. As in prior embodiments of optical device 10b-10f, optical device 10g can provide along a predefined light distribution in accordance with the refractive index of the optical material of the device, and such parameters described earlier for selecting such light distribution for device 10b-10f.

The figures illustrating optical devices 10b-e show structures representing a repeating periodic pattern having a constant period along their respective top surfaces 14b-e. This may be desirable to obtain a uniform light distribution from these devices. However, in some applications a non-uniform distribution may be desirable, in which the period and/or height of structures may be different over all or part of the device. For example, FIG. 65 shows optical device 10d of FIG. 25 in which the height of ramp structures 22, and the period of ramp structures 22 with flat surfaces 24, vary along top surface 14d to control and modulate the light distribution from various regions of the device. Although in this example shows the period and height increasing proportionally along the length of the device from input end 16d, other non-uniform variations in period and/or height may similarly be used to control the intensity and distribution of the light exiting the device as desired for the particular application. Also, although the example is illustrated using optical device 10d, other optical device 10b,c,e may similarly have varied period and height of their respective front surface structures. Further, although the example of optical device 10e of FIG. 58 shows structures 32 and 36 having period and height increasing proportionally from input end 16d from end 38 to end 39, optical device 10f may also have structures 32 and 36 which similarly increase in period and height, or optical device 10e or 10f may have one or more structure 32 and 36 which vary in period and/or height to control the intensity and distribution of the light exiting the device as desired for the particular application.

Figure 66:
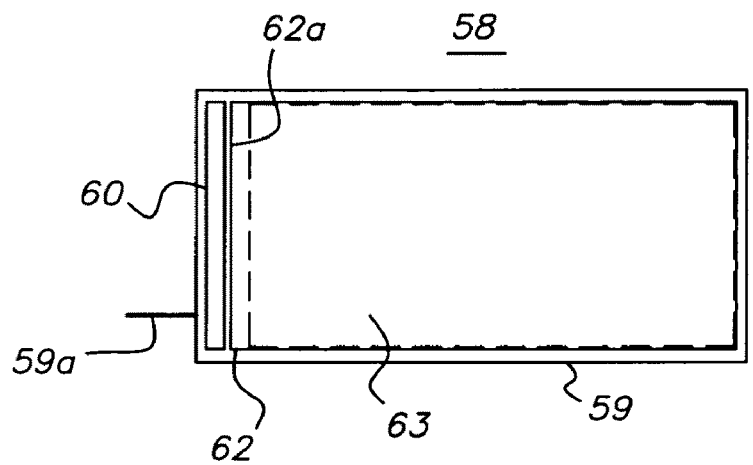

In application, light is injected along end into optical device 10a-g from one of a variety of sources such as a fiber optic cable, a fiber bundle, a light emitting diode (LED), or any other similar light source. A luminaire 58 with an extended light source is shown for example in FIG. 66. In FIG. 66, luminaire 58 has a housing 59 with an optical device 62 and extended light source 60 providing illumination along the width of optical device 62, which delivers such illumination for output from emission area 63 (denoted by dashed line) along device 62. For example extended light source 60 may represent a fluorescence tube baffled to provide light in the direction of the input face 62a of optical device 62. Optical device 62 represents one, or a combination, of optical devices 10b-g where the emission area is along the top surface of such device.

Figure 67:
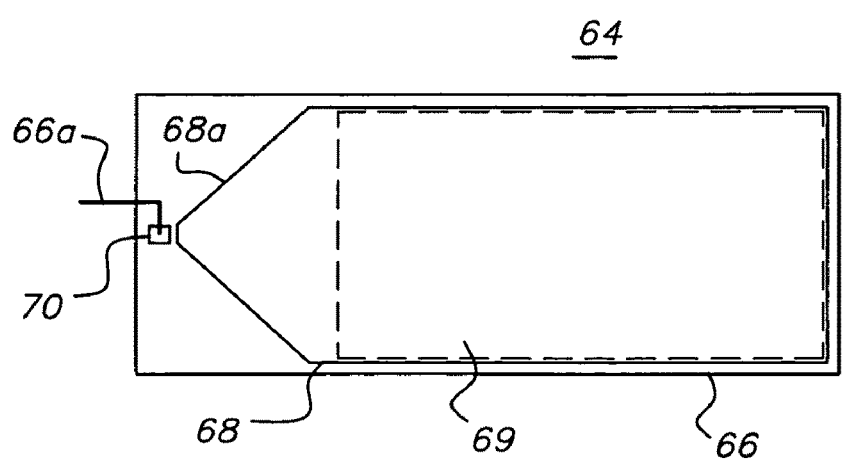

A luminaire 64 with a light emitting diode (LED) light source 70 is shown for example in FIG. 67. In FIG. 67, luminaire 64 has a housing 66 with optical device 68 and a LED light source 70 for delivering illumination for output from emission area 69 (denoted by dashed line) along device 68. The optical device 68 has a tapered input end 68a, which allows the illumination from small single LED source 70 to be spread out evenly over a larger width of the optical device. This may be useful for the purpose of general illumination, such as for illumination for a display. Input end 68a may be similar to input end 28c of FIG. 45. Optical device 68 represents one, or a combination, of optical devices 10b-g where the emission area is along the top surface of such device.

Figure 68:
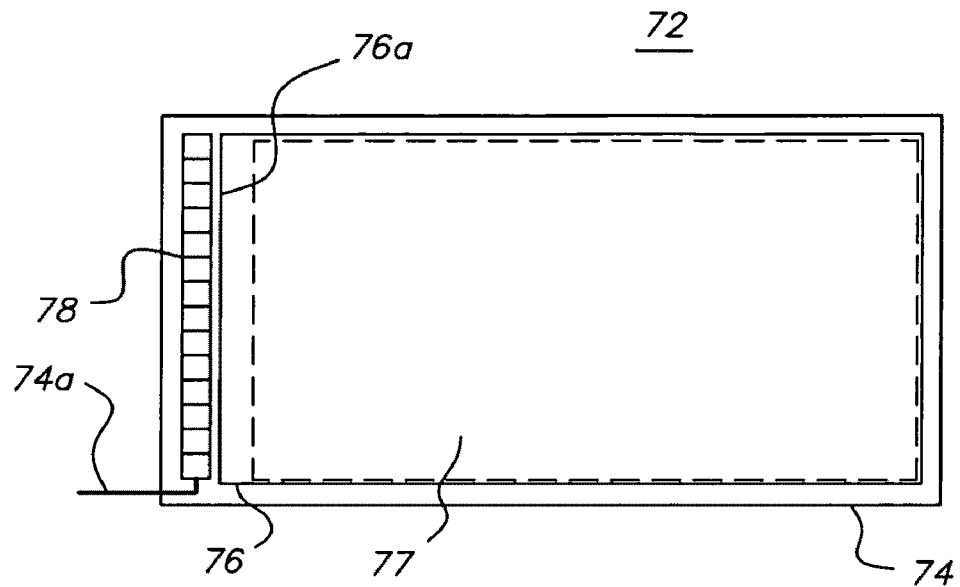

A luminaire 72 with an array of light sources is shown for example in FIG. 68. In FIG. 68, luminaire 72 has a housing 74 with an optical device 76 and an array of LED light sources 78 which provide even illumination over a width of the input face 76a of the optical device 76 for delivering illumination for output from emission area 77 (denoted by dashed line) along device 76. Preferably, optical device 76 tapers along the length of the device from its input face 76a, such that the gradual thickness reduction decreases the numerical aperture in this direction. The LEDs of array 78 can be of the same color, or multicolored, such as red (R), green (G), or blue (B) to provide color mixed white-light illumination for efficient architectural and display applications. Mixed RGB LED light sources may be more efficient than white light LEDs. Further, array 78 may be one or a two dimensional array of LEDs, or multiple banks of arrays of LEDs where each bank provides illumination of a different color channel, such as red (R), green (G), or blue (B) or combinations thereof to provided the desired color lighting effect. The luminaire 72 of this example, with such taper in thickness along its length from input face 76a, can provide narrower angle illumination in this direction, and thus the luminaire can represent a backlight unit for an LCD display in which the propagation direction is aligned with the vertical viewing directions so the decreased numerical aperture aligns with the decreased viewing angle needed in the vertical direction with most display devices. Optical device 76 represents one, or a combination, of optical devices 10b-g where the emission area is along the top surface of such device.

Figure 69:
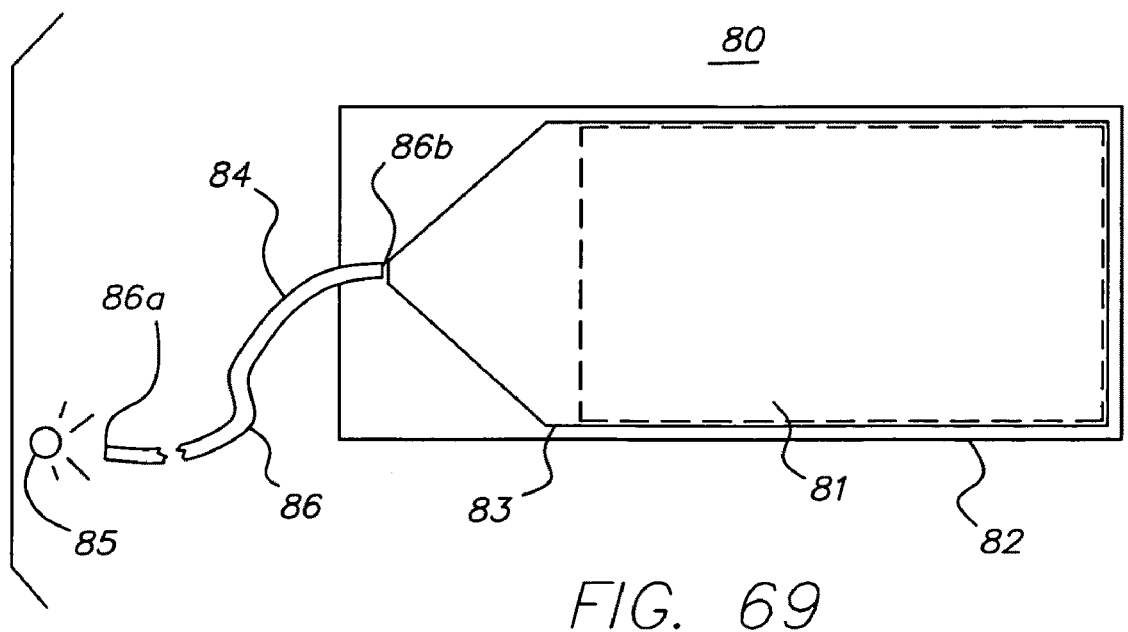

A luminaire 80 with a fiber optic light source is shown for example in FIG. 69. In FIG. 69, luminaire 80 has a housing 82 having an optical device 83 which receives light from the end of a fiber optic light source 84 representing a light (or lamp) source 85 and fiber optic 86 having an input end 86a and output end 86b extending to housing 82. The light from light source 85 is thus externally provided, such as from a remote location, to housing 82. The luminaire 80 of this example may be useful for remote-source lighting from solar, laser, or single lamp sources 84b. A single remote source can provide illumination to one or several one of luminaire 80 for general purpose distributed lighting. Optical device 83 represents one, or a combination, of optical devices 10b-g where the emission area 81 (denoted by dashed line) along the top surface of such device.

The housing 59, 66, 74, 82 of FIGS. 66-69 and the components therein are sized and shaped in accordance with the desired illumination application, and thus are not limited to that shown in the figures. In the case of housing 59, 66, 74, illumination source 60, 70, and 78, respectively, may receive power via an electrical connection via cable or connector 59a, 66a, or 74a, respectively. Such power may also be provided from a battery in the housing. Also, such luminaires 58, 64, 72, or 80 may be used without their respective housing, or be part of a larger housing or assembly with other electrical and/or optical components for the desired application, such as a LCD display.

As illustrated by FIGS. 66-69, any light source may be used to couple light from the light input end of the optical device 10a-g, and as such the optical device may be coupled with light source(s) as part of a an illumination apparatus, called herein a luminaire, in which light is coupled into the optical device with or without collimation in the direction perpendicular to the front and back surfaces of the optical device. For example, such illumination apparatuses may be a luminaire for propagating light in a predefined direction, a fluorescent light apparatus utilizing one or more fluorescent light sources, a LED light apparatus utilizing solid state LED sources, a laser light apparatus using light from laser source(s), an incandescence light or lighting apparatus utilizing incandescent light source(s), solar radiation apparatus, such as part of a skylight or window; a hybrid source, such as solar and solid-state LED source lighting apparatus, or from a remote source delivered through another light-guide or fiber optic from a remote, fluorescent, incandescent, LED, or solar source.

For example, in architectural lighting applications, optical devices 10a-g may part of a flat luminaire for wall-mounted or ceiling-mounted light, a luminaire for personal office workspace lighting, such as cubicle desktop lighting, replacement for ceiling-mounted fluorescent fixtures. Other applications may be illumination apparatuses for directed lighting, such as in emergence lighting, pathways in dark public places, such as theaters, museum art or special display objects, shelves, stairs by placing the light aimed at the step risers, clothing rod for closet illumination.

The optical device 10a-g may also be used for backlight illumination for a liquid crystal display, back-lighted signage using this technology, or channel-letter signage using the light-guide technology.

Optical device 10a-g may also be used to provide illumination for medical, dental, and veterinary devices and instrument, wrist-mounted wearable illumination sources, such as for surgery, or head mounted illumination for medical personnel. Other applications includes delivering light dosage for photodynamic therapy, delivering light to patient body parts for other types of light therapy, such as hair-growth and skin treatments, delivering precision lighting from LED sources, or to provide color mixing for precision color temperature lighting deliver for Circadian rhythm control through lighting.

Also, optical devices 10a-g may be used in vehicular lighting applications (such as or example, flat-panel lighting, such as vanity lights and dome lights, indirect lighting for aircraft, directed reading lights for aircraft and automobiles, and direct lighting for emergence egress on aircraft), personal lighting applications (such as for example, by incorporating an illumination source and the optical device into the a hat brim, head-mounted illumination sources, wearable light sources for wrist-mount or head mount for task laborers), tool lighting applications (such as for example, hand tools by incorporating the optical device and light source into tool handles, safety illumination for personal use by providing the light-guide into safety items, such as helmets and gloves, lighted rulers, levels, power-tool handles and shields), sport lighting applications (such as for example, illuminated sports equipment, such as basketball backboards, sports equipment sticks, such as baseball bats, hockey sticks, lacrosse sticks, and tennis rackets, or illuminated structural tubes for sports goals and nets such as hockey, football, and soccer), culinary lighting applications, (such as for example, illumination for barbecue utensils by incorporating the light-guide into the handles of the barbecue implements, or power culinary tool handles).

From the foregoing description, it will be apparent that there have been provided optical illumination guiding devices, as well as luminaires using such devices. Variations and modifications in the herein described optical devices and luminaires in accordance with the invention will undoubtedly suggest themselves to those skilled in the art. Accordingly, the foregoing description should be taken as illustrative and not in a limiting sense.

The invention claimed is:

1. A device for guiding illumination comprising:
a body having a first surface with a plurality of ramp structures and falling structures, a second surface in which said first surface and said second surface are along opposite sides of said body, and an optical axis substantially parallel to said second surface;
said ramp structures and said falling structures alternate with each other along said first surface, in which at least one of said ramp structures enables transmission of light from the ramp structure out of said body towards an adjacent one of said falling structures which receives the transmitted light back into the body, wherein light when received from one end of said body is totally or substantially internally reflected within said body unless transmitted from said at least one of said ramp structures out of and back into said body via an adjacent one of said falling structures until directed by reflection from one of said ramp structures to exit said body from said second surface; and
each one of said ramp structures meets the next one of said falling structures along said first surface from said one end of said body at an acute angled apex, each of said ramp structures represents a rising surface at a first acute angle with respect to said optical axis, and each of said falling structures represents a falling surface tilted at the acute angled apex forming a second acute angle with respect to the normal of said optical axis toward the rising surface of one of said ramp structures which preceded the falling surface along said first surface from said one end of said body.

2. The device according to claim 1 wherein said first surface has reflective material.

3. The device according to claim 1 further comprising a source for inputting light inputted into said one end of said device.

4. The device according to claim 3 wherein said source represents a lamp, a single LED, an LED array, or a fiber optic light source.

5. The device according to claim 3 wherein said source and said device are located in a housing.

6. The device according to claim 5 wherein said housing is mountable on a surface.

7. The device according to claim 1 wherein said device is located in a housing, and said source comprises a fiber optic with an input end external said housing for receiving illumination and an output end extending into said housing for delivering light to said device.

8. The device according to claim 1 wherein said body comprises multiple portions in which one of said portions has said ramp structures and said falling structure along said first surface of said one of said portions, and another of said portions has other ramp structures along said second surface providing illumination from said second surface of said another of said portions.

9. The device according to claim 1 wherein each of said ramp structures enables transmission of light from the ramp structure out of and back into said body via an adjacent one of said falling structures.

10. The device according to claim 1 wherein said second surface is flat.

11. The device according to claim 1 wherein between each one of the falling structures and the next one of said ramp structures in a direction from said one end along said first surface is at least a flat surface substantially parallel to said optical axis.

12. A device for guiding illumination comprising:
a body having a first surface with a plurality of ramp structures and falling structures, and a second surface in which said first surface and said second surface are along opposite sides of said body, and said ramp structures and said falling structures alternate with each other along said first surface, in which at least one of said ramp structures enables transmission of light from the ramp structure out of said body towards an adjacent one of said falling structures which receives the transmitted light back into the body, wherein light when received from one end of said body is totally or substantially internally reflected within said body unless transmitted from said at least one of said ramp structures out of and back into said body via an adjacent one of said falling structures until directed by reflection from one of said ramp structures to exit said body from said second surface, wherein each of said ramp structures along a first direction from said one end along said first surface comprises a rising surface in a second direction toward the second surface that is at a first acute angle with respect to a dimension substantially parallel to that portion of said second surface opposite that portion of said first surface having the rising surface, and each of said falling structures along said first direction from said one end along said first surface comprises a falling surface in a third direction away from the second surface that is at a second acute angle with respect to the normal of a dimension substantially parallel to that portion of said second surface opposite that portion of said first surface having the falling surface in which the falling surface in extending along said third direction at said second acute angle tilts toward the rising surface of one of said ramp structures that preceded the falling surface along said first surface from said one end of said body, wherein the rising surface of each of said ramp structures extends along said second direction until meeting at an acute angled apex the falling surface of the next one of said falling structures along said first surface from said one end, and from said acute angled apex the falling surface of each of said falling structures extends along said third direction.

13. The device according to claim 12 wherein said falling surface of each of said falling structures represents a prismatic surface.

14. The device according to claim 12 wherein the rising surface of each of the ramp structures is segmented into multiple surfaces of progressive steeper acute angles with respect to a dimension substantially parallel to that portion of said second surface opposite that portion of said first surface having the rising surface.

15. The device according to claim 12 wherein the rising surface of each of the ramp structures has a continuously varying slope.

16. The device according to claim 12 wherein between each one of the falling structures and the next one of said ramp structures in said first direction from said one end along said first surface is at least a flat surface substantially parallel to that portion of said second surface opposite that portion of said first surface having the flat surface.

17. The device according to claim 16 wherein the first surface is substantially parallel to said second surface from said one end to a first of said ramp structures, and the flat surface subsequent a first of said falling structures from said one end along said first surface is at a level further from said second surface than the first surface from said one end to the first of said ramp structures, and the flat surface subsequent each of said falling structures after a second of said falling structures from said one end along said first surface is at a level closer to said second surface than the previous flat surface, thereby reducing the thickness of the optical device.

18. The device according to claim 17 wherein each of said ramp structures and said falling structures increase in size proportionally along said first surface with the reducing of thickness of said optical device.

19. The device according to claim 16 wherein between each one of the falling structures and the flat surface subsequent the falling structure along said first direction from said one end along said first surface is another rising surface that is at an angle with respect to a dimension substantially parallel to that portion of said second surface opposite that portion of said first surface having said another rising surface.

20. An illumination apparatus comprising:
a light guiding device having a top surface and a bottom surface, and said bottom surface comprising alternating ones of up sloping structures and down sloping structures, and an intermediate structure between each of said down sloping structures and the next one of said up sloping structures, in which said intermediate structure has at least a flat surface substantially parallel to said top surface, and said up sloping structures direct light out of said top surface when light is received along one end of the device, wherein said top surface is the only one of said top and bottom surfaces which substantially outputs light when received by said device, said one end represents one of two ends of said device;
an optical axis between said ends, in which said top surface is substantially parallel to said optical axis; and
each of said up sloping structures represents a rising surface at a first acute angle with respect to said optical axis, and each of said down sloping structures represents a falling surface tilted toward the rising surface of the previous one of said up sloping structures from said one end of the device at a second acute angle with respect to the normal of said optical axis, wherein the rising surface of each of said up sloping structures meets at an acute angled apex the falling surface of the next one of said down sloping structures to enable the falling surface from said next one said down sloping structures to tilt towards the rising surface of the previous one of said up sloping structures from said one end of the device at said second acute angle with respect to the normal of said optical axis.

21. The apparatus according to claim 20 further comprising a housing having at least said light guiding device.

22. The apparatus according to claim 21 wherein said housing further has a light source for inputting light into said light guiding device.

23. The apparatus according to claim 21 wherein said housing is mountable on a surface.

24. The apparatus according to claim 22 wherein said light source represents a lamp, a single LED, an LED array, or a fiber optic light source.

25. The apparatus according to claim 20 further comprising a light source for inputting light into said light guiding device.

26. The apparatus according to claim 25 wherein said light source represents a lamp, a single LED, an LED array, or a fiber optic light source.

27. The apparatus according to claim 20 wherein said intermediate structure further comprises an up sloping surface followed by said flat surface.

28. The apparatus according to claim 20 wherein the flat surface of the intermediate structure between each of said down sloping structures and the next one of said up sloping structures is at the same level with respect to said top surface.

29. The apparatus according to claim 20 wherein the flat surface of the intermediate structure between each of said down sloping structures and the next one of said up sloping structures is at a different level with respect to said top surface.

30. The apparatus according to claim 20 wherein said falling surface of at least one of the down sloping structures represents a plurality of falling surfaces each at a different one of said second acute angle.

31. The apparatus according to claim 20 wherein the rising surface of at least one of the up sloping structures has one of multiple surfaces of different ones of said first acute angle, a single surface at said first acute angle, or a surface continuously varying in said first acute angle.

32. The apparatus according to claim 20 wherein the first acute angle of the rising surface of at least two of said up sloping structures are different from each other.

33. The apparatus according to claim 20 wherein at least one of said up sloping structures enables transmission of light from the up sloping structure out of said device towards an adjacent one of said down sloping structures which receives the transmitted light back into the device.

34. A light guiding device comprising:
two ends;
a first surface and a second surface opposite said first surface, in which said first and second surfaces extend between said two ends;
an optical axis between said ends, in which said top surface is substantially parallel to said optical axis; and
said first surface comprises alternating ones of up sloping structures and down sloping structures, said up sloping structures slope up towards said second surface, said down sloping structures slope away from said second surface, and one or more said up sloping structures each enables transmission of light from the up sloping structure out of said device towards an adjacent one of said down sloping structures which receives the transmitted light back into the device, wherein light when received from one of said ends is substantially maintained in said device until directed from one of said up sloping structures to exit from said second surface out of said device, and at least one of said up sloping structures meets at an acute angled apex the next one of said down sloping structures along said first surface from said one of said ends, said at least one of said up sloping structures is at a first acute angle with respect to said optical axis, and at least said next one of said down sloping structures is at a second acute angle with respect to the normal of said optical axis, and said at least next one of said down sloping surfaces slopes from the acute angled apex away from said second surface toward said at least one of said up sloping structures.

35. The device according to claim 34 wherein each of said up sloping structures represents a rising surface at said a first acute angle with respect to said optical axis, and each of said down sloping structures represents a falling surface at said a second acute angle with respect to the normal of said optical axis.

36. The device according to claim 34 wherein a first of said up sloping structures is provided followed by a first of said down sloping structures along a direction from one of said ends along said first surface.

37. The device according to claim 34 further comprising an intermediate structure between at least one of said down sloping structures and a next one of said up sloping structures, in which said intermediate structure has at least a flat surface substantially parallel to said second surface.

38. The device according to claim 37 wherein said intermediate structure has only said flat surface.

* * * * *